US012190685B2

(12) United States Patent
Berman

(10) Patent No.: US 12,190,685 B2
(45) Date of Patent: Jan. 7, 2025

(54) GAMING DEVICE HAVING POKER LOCK AND IMPROVE FEATURE

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 0 days.

(21) Appl. No.: 18/375,988

(22) Filed: Oct. 2, 2023

(65) Prior Publication Data

US 2024/0029523 A1 Jan. 25, 2024

Related U.S. Application Data

(63) Continuation of application No. 17/543,532, filed on Dec. 6, 2021, now Pat. No. 11,776,364, which is a continuation of application No. 16/694,163, filed on Nov. 25, 2019, now Pat. No. 11,195,381.

(60) Provisional application No. 62/771,018, filed on Nov. 23, 2018, provisional application No. 62/771,017, filed on Nov. 23, 2018, provisional application No. 62/771,020, filed on Nov. 23, 2018.

(51) Int. Cl.
*G07F 17/32* (2006.01)

(52) U.S. Cl.
CPC ...... *G07F 17/3293* (2013.01); *G07F 17/3211* (2013.01); *G07F 17/3258* (2013.01); *G07F 17/3262* (2013.01); *G07F 17/3267* (2013.01)

(58) Field of Classification Search
None
See application file for complete search history.

(56) References Cited

U.S. PATENT DOCUMENTS

2013/0310127 A1 11/2013 Berman
2017/0124799 A1 5/2017 Berman et al.

*Primary Examiner* — Damon J Pierce

(57) ABSTRACT

Embodiments of the present invention set forth systems, apparatuses and methods for providing a lock and improve feature in gaming devices. Accordingly, a gaming device can be configured to include a video poker game where items associated with cards in poker hand, or card positions where the cards in the poker hand are displayed, can be locked, held, stuck, or otherwise maintained and a secondary game event is played where additional items can be received. The items may provide credits, bonus opportunities, progressives, multipliers, or other types of awards, modifiers, or beneficial game enhancements.

20 Claims, 43 Drawing Sheets

GAMING DEVICE HAVING POKER LOCK AND IMPROVE FEATURE

RELATED APPLICATIONS

This application is a continuation of U.S. application Ser. No. 17/543,532, filed Dec. 6, 2021, now U.S. Pat. No. 11,776,364, which is a continuation of U.S. application Ser. No. 16/694,163, filed Nov. 25, 2019, now U.S. Pat. No. 11,195,381, which claims the benefit of Provisional Patent Application No. 62/771,020, filed on Nov. 23, 2018, Provisional Patent Application No. 62/771,018, filed on Nov. 23, 2018, and Provisional Patent Application No. 62/771,017, filed on Nov. 23, 2018, to all of which priority is claimed pursuant to 35 U.S.C. § 119(e) and which all are incorporated herein by reference in their entirety.

FIELD OF THE INVENTION

This disclosure relates generally to games, and more particularly to systems, apparatuses and methods for providing a gaming device with a poker lock and improve feature.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever-wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate a poker item feature on gaming devices.

In one embodiment, a gaming device includes a video poker game where items associated with cards in poker hand, or card positions where the cards in the poker hand are displayed, can be credits, bonus opportunities, progressives, multipliers, or other types of awards, modifiers, or beneficial game enhancements.

In another embodiment, a gaming device includes a video poker game where items associated with cards in poker hand, or card positions where the cards in the poker hand are displayed, can be locked, held, stuck, or otherwise maintained and a secondary game event is played where additional items can be received. The items may provide credits, bonus opportunities, progressives, multipliers, or other types of awards, modifiers, or beneficial game enhancements.

In yet another embodiment, a player may place additional wagers to activate card positions or card columns. If specific cards or sub-symbols associated with cards appear in an activated card position or column, the player may be awarded the credit value, multiplier value, or game modifier shown on the sub-symbols or that are part of a secondary paytable, or a secondary bonus feature may be initiated.

DETAILED DESCRIPTION

Figure 1:
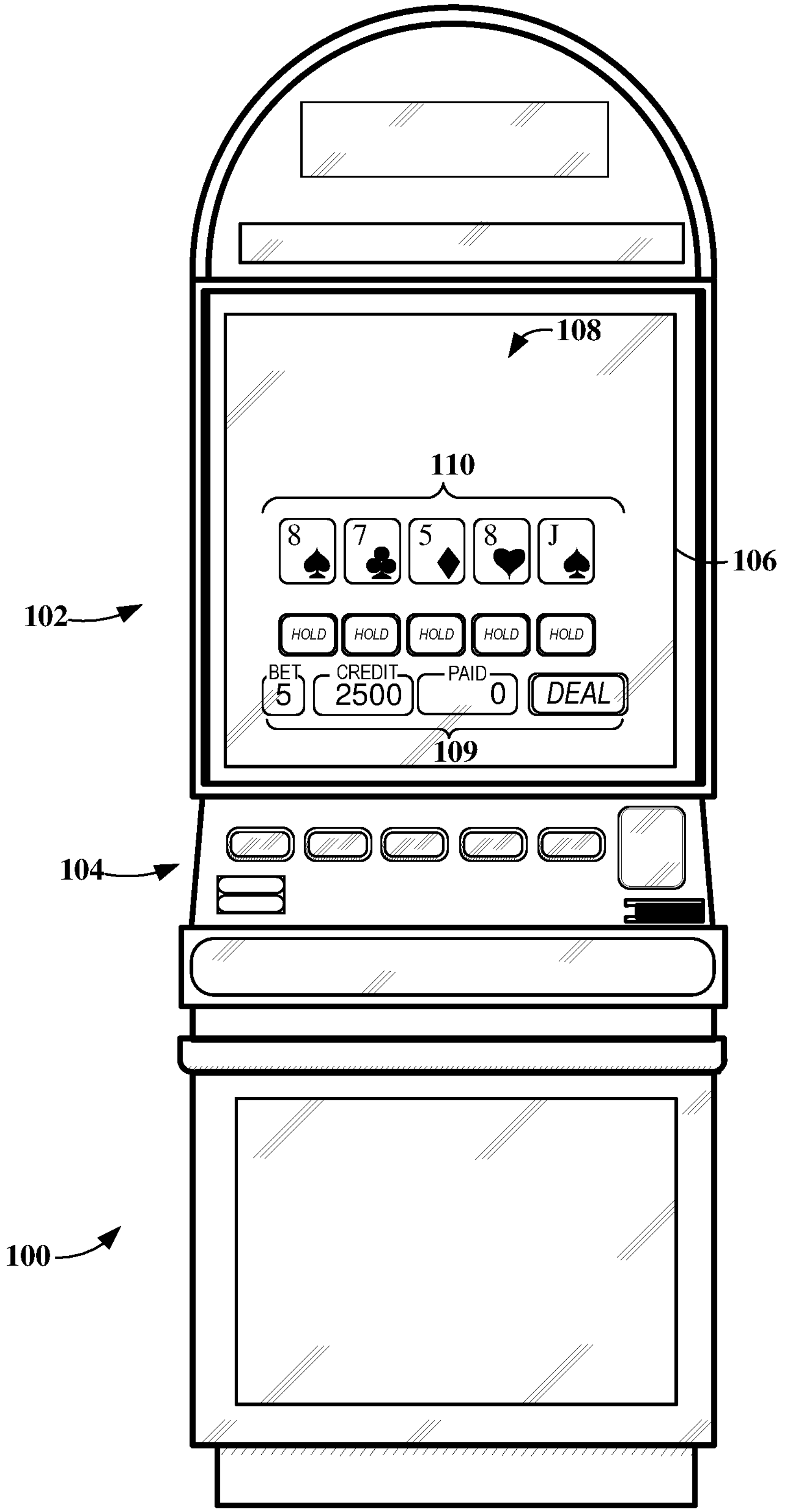
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for providing a lock and improve feature in gaming devices, which may, for example, enhance winning result opportunities in gaming activities. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. video poker game) is provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that utilizes operations to provide a lock and improve feature in gaming devices. In one embodiment, a gaming device includes a video poker game where items associated with cards in poker hand, or card positions where the cards in the poker hand are displayed, can be locked, held, stuck, or otherwise maintained and a secondary game event is played where additional items can be received. The items may provide credits, bonus opportunities, progressives, multipliers, or other types of awards, modifiers, or beneficial game enhancements.

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of these inventive techniques in other types of poker games, slot games, or other games of chance. Some of these other types of embodiments will be discussed below as variations to the examples illustrated. However, many other types of games can implement similar techniques and fall within the scope of this inventive concept.

Referring to the example gaming apparatus 100 shown in FIG. 1, the gaming apparatus includes a display area 102 (also referred to as a gaming display), and a player interface area 104, although some or all of the interactive mechanisms included in the user interface area 104 may be provided via graphical icons used with a touch screen in the display area 102 in some embodiments. The display area 102 may include one or more game displays 106 (also referred to as "displays" or "gaming displays") that may be included in physically separate displays or as portions of a common large display. Here, the game display 106 includes a primary game play portion 108 that displays game elements and symbols 110, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity. In video poker embodiments, for example, the user interface 104 may include five physical buttons that correspond to displayed card positions and allow a player to hold (or un-hold) particular cards in a draw poker hand. The user interface 104 may also include a physical "Deal/Draw" button that allows a player to initiate a new game by having cards dealt to the card positions or draw replacement cards after having the opportunity to hold any of the dealt cards. In other poker games, keno games, slot games, or other games of chance different button panels or configurations may be used.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player loyalty information to identify a user or player of the gaming device. This mechanism may be card reader, biometric scanner, keypad, or other input device. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The game display 106 in the display area 102 may include one or more of an electronic display, a video display, a mechanical display, and fixed display information, such as paytable information associated with a glass/plastic panel on the gaming machine 100 and/or graphical images. The symbols or other indicia associated with the play of the game may be presented on an electronic display device or on mechanical devices associated with a mechanical display. Generally, the display 106 devotes the largest portion of viewable area to the primary gaming portion 108. The primary gaming portion 108 is generally where the visual feedback for any selected game is provided to the user. The primary gaming portion 108 may render graphical objects such as cards, slot reels, dice, animated characters, and any other gaming visual known in the art. The primary gaming portion 108 also typically informs players of the outcome of any particular event, including whether the event resulted in a win or loss.

In some of the example embodiments illustrated herein, the primary gaming portion 108 may display a grid (or equivalent arrangement) of playing cards 110 forming a hand. Here, the grid includes a row of five playing cards 110 forming a video poker hand, which represents a portion of a game play event. For example, if the game play event is a video draw poker game, the gaming device 100 may deal five cards, allow the user to select which cards to hold, deal replacements for the cards not held, and determine a payout based on the final cards in the hand. The illustration and description of five-card-draw poker is for purposes of example and not of limitation; the present invention may be applicable to numerous other card games, such as stud poker or hold 'em poker, as well as other types of gaming activities and apparatuses, such as slot machines, dice, coins, etc.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual cards for holding prior to draw of new cards. The game display 106 of the display area 102 may include other features that are not shown, such as paytables, navigation controls, etc.

In other example embodiments, the primary gaming portion 108 may display a grid (or equivalent arrangement) of game elements or game element positions (also referred to as "reel stop positions" herein). Although not shown in FIG. 1, the grid may include three rows and five columns of game elements, which may form a game outcome of a game play event from which prizes are determined. In some slot machine examples, each column may display a portion of a game reel. The game reels may include a combination of game symbols in a predefined order. In mechanical examples, the game reels may include physical reel strips where game symbols are shown in images fixed on the reel strips. Virtual reel strips may be mapped to these physical reel positions shown on the reel strips to expand the range or diversity of game outcomes. In video slot examples, reel strips may be encoded in a memory or database and virtual reels may be used for the game reels with images representing the data related to the reel strips. In other slot machine embodiments, each reel stop position on the grid may be associated with an independent reel strip. In yet other slot machine embodiments, reels and/or reel strips may not be used at all in determining the symbols shown in the game element positions of the grid. For example, a symbol may be randomly selected for each game element position, or the symbols may be determined in part by game events occurring during game play, such as displayed elements being replaced by new game elements or symbols. Numerous variations are possible for implementing slot-type game play.

Figure 2:
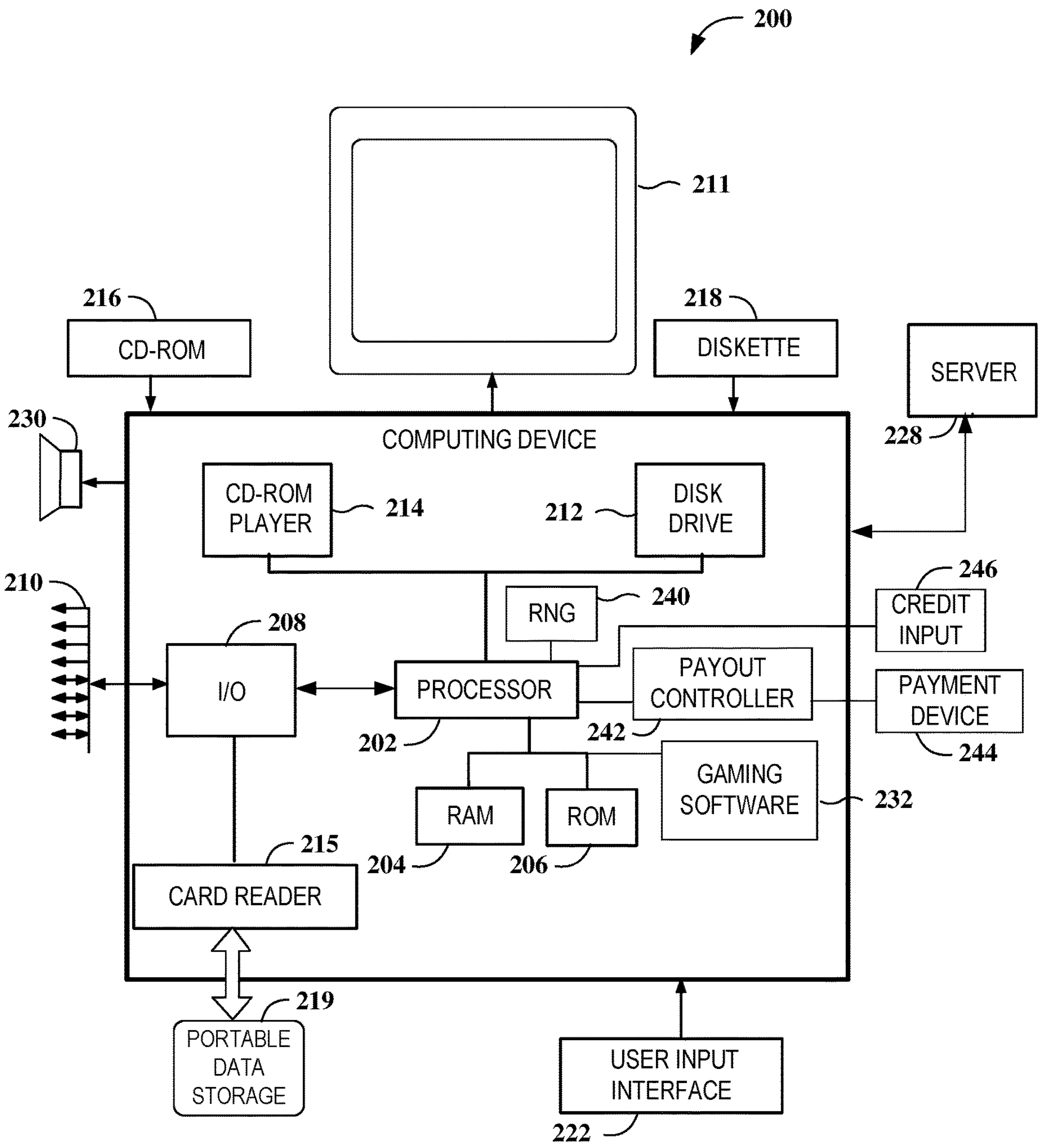
FIG. 2 is a block diagram illustrating a computing arrangement according to embodiments of the invention

Although FIG. 1 illustrates a particular implementation of some of the embodiments of this invention in a casino or electronic gaming machine ("EGM"), one or more devices may be programmed to play various embodiments of the invention. The present invention may be implemented, as shown in FIG. 1, as a casino gaming machine or other special purpose gaming kiosk as described herein, or may be implemented via computing systems operating under the direction of local gaming software, and/or remotely-provided software such as provided by an application service provider (ASP). Casino gaming machines may also utilize computing systems to control and manage the gaming activity, although these computing systems typically include specialized components and/or functionality to operate the particular elements of casino gaming machines. Additionally, computing systems operating over networks, such as the Internet, may also include specialized components and/or functionality to operate elements particular to these systems, such as random number generators. An example of a representative computing system capable of carrying out operations in accordance with the invention is illustrated in FIG. 2.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 200 of FIG. 2 is an example computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions in accordance with the present invention typically includes a central processor (CPU) 202 coupled to random access memory (RAM) 204 and some variation of read-only memory (ROM) 206. The ROM 206 may also represent other types of storage media to store programs, such as programmable ROM (PROM), erasable PROM (EPROM), etc. The processor 202 may communicate with other internal and external components through input/output (I/O) circuitry 208 and bussing 210, to provide control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to the display 211, which represents a display on which the gaming activities in accordance with the invention are presented. The display 211 represents the "presentation" of the game information in accordance with the invention, and may be a mechanical display showing physical spinning reels, a video display, such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, or inputting data to identify a player for a player loyalty system. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs may be implemented using hardware, software operable in connection with the processor 202, or some combination of hardware and software. The present invention is operable using any known RNG, and may be integrally programmed as part of the processor 202 operation, or alternatively may be a separate RNG controller 240. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 indicating a payout is to be made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout device 244 may also be provided in gaming machine embodiments, where the payout device 244 serves as the mechanism providing the payout to the player or participant. In some embodiments, the payout device may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency. In yet other embodiments, the payout device 244 may send a signal via the network server 228 or other device to electronically provide a credit amount to an account associated with the player, such as a credit card account or player loyalty account. The computing arrangement 200 may also include accounting data stored in one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, etc., for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payout device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described hereinabove. For example, the software 232 may present, by way of the display 211, representations of symbols to map or otherwise display as part of a slot-based game having reels. However, in other embodiments, the principles of this concept may be applied to poker games or other types of games of chance. One or more aligned positions of these game elements may be evaluated to determine awards based on a paytable. The software 232 may include instructions to provide other functionality as known in the art or as described and shown herein.

In some embodiment, a gaming device includes a video poker game where items associated with cards in poker hand, or card positions where the cards in the poker hand are displayed, can be locked, held, stuck, or otherwise maintained and a secondary game event is played where additional items can be received. The items may provide credits, bonus opportunities, progressives, multipliers, or other types of awards, modifiers, or beneficial game enhancements. In some embodiments, the items may be sub-symbol overlays that are associated with cards. In other embodiments, the items may be particular cards out of the one or more decks of cards being used in the game event. In yet other embodiments, the items may be associated with a particular card position (or positions) on the game grid. Alternatively, the items may be located outside of the game grid and may or may not be associated with the game event being played on the game grid.

The items may be associated with credit values, multiplier values, progressive awards, wild symbols or cards, bonus triggers, wheels, dice, or other awards or modifiers that enhance the game play of the underlying base or primary game. Although several embodiments are illustrated with a video poker base game, other embodiments could have a base game that utilizes spinning reels (slot game), keno, bingo, stud poker, hold 'em poker, or any other game of chance.

In one example, the items may be sub-symbols that are associated with multipliers. The multipliers could be used on one or more current poker hands, or could be applied on future poker hands. In another example, the items may be sub-symbols that are associated with credit values. The credit values may be immediately awarded during the current game or may be traded-in for the chance at a future multiplier, bonus initiation, or progressive award. In yet another example, multiple types of sub-symbols may be used. For example, multipliers could be applied on future poker hands in subsequent games that are wagered on, while credits are paid on the current hand.

In some embodiments, the items may be awarded during both a deal and draw part of a draw poker game, where any items received on the deal are maintained and additional items could be acquired during the draw phase of the game. In some embodiments, items with credit values may be awarded during the deal phase of the draw poker game and items associated with multipliers may be awarded during the draw phase of the draw poker game. Any credits won during the deal phase would be multiplied by the sum (or product, or largest, or random one) of the multipliers awarded during the draw phase of the draw poker game. In other examples, items may be associated with only credits, multipliers, or other awards/modifiers during both the deal and draw phases of the poker game. If the items are sub-symbol overlays associated with particular cards in the deck, a second deck or other technique may be used to ensure that held cards have the same chance of being associated with a sub-symbol on the draw as any replacement cards so that the player does not have to alter a hold-draw strategy during the poker play.

In other embodiments, the items may be "Wild" symbols that make the underlying card wild. In other embodiments, the items may be other cards, where the better of the two cards (or both cards) can be used to generate the optimum poker hand. In some of these embodiments, the sub-symbol card may result in a "split card" with multiple indicia being utilizes in one associated card position.

In some embodiments, the items could be persistent where they stay and are available until they are used. For example, if a sub-symbol item was associated with a multiplier, but the current hand was not a winning poker hand, the multiplier may be saved until a winning poker hand is achieved. Alternatively, the items could be persistent and stay until they cannot be used. For example, if a sub-symbol item was associated with a multiplier and the current hand was a winning poker hand, the multiplier may be saved and used on subsequent poker games until a non-winning poker hand is received.

In some embodiments, the items may be sub-symbol wheels that are associated with particular cards or card positions on the game grid. Here, when a wheel is received during a game, the wheel may be spun to award credits, multipliers, wild cards, extra cards, etc. In other embodiments, the items may be sub-symbol dice that are associated with particular cards or card positions on the game grid. Here, when a die is received during a game, the die may be rolled to award credits, multipliers, wild cards, extra cards, etc.

In some embodiments, the items are associated with specific cards. In one embodiment, each card position on the grid may receive a random one of the face cards along with any other card that is dealt to that particular card position. For example, an Ace of Spades may be randomly allocated to the second card position in a five-card draw poker game. Suppose on the deal, the player receives a King of Diamonds, an 8 of Hearts, a 5 of Clubs, a 2 of Diamonds, and an Ace of Diamonds. The player may hold the Ace of Diamonds knowing that they can use the bonus Ace of Spades at the second card location to form at least a pair of Aces. In other embodiments, the bonus cards may automatically form a multi-indicia card. Here, the player may need to hold both the 8 of Hearts/Ace of Spades in the second card position and the Ace of Diamonds in the fifth card location to ensure they receive at least a pair of Aces on the draw. Many additional variations are possible.

In other embodiments, particular cards may be awarded for randomly selected ones of the card positions according to a set of rules. For example, this set of rules may have the particular card chosen for randomly selected card position to be a copy of the card dealt to that card position, be a card of the same suit that is one up in rank or one below in rank from the card dealt to that card position, randomly choose a card from the set of rules, or use another manner of selecting the particular card for that card position.

In other embodiments, the items could be randomly awarded based on a mystery trigger, or items could be provided based receiving a winning hand (or minimum-level winning hand, such as a full house or better) in a previous poker game. In yet other embodiments, a sub-symbol wheel trigger may be used, where one of the sections of the wheel is associated with the bonus trigger (the other sections of the wheel may be credit awards, multipliers, etc.).

In some embodiments, a player may need to receive a minimum number of items to trigger a secondary lock and improve feature. In other embodiments, a player may need to receive a particular item or combination of items to trigger the lock and improve feature. In yet other embodiments, the player may have to get an item (or specific type of item) in a particular location to trigger the lock and improve feature.

In some embodiments, a bonus bet may be needed to be eligible for the bonus feature. This bonus bet may be structured as a 5+1, 5+2, 5+3, 5+4, 5+5, etc. where the bonus bet is the second number. Hence, in a 5+5 embodiment, the player would bet five credits on the poker hand and be paid according to a 5-credit paytable, while paying an additional 5 credits (10 credit total wager) to also be eligible for the bonus. In other embodiments, no bonus bet may be needed.

This feature could be implemented in single-hand poker, multi-hand poker, Keno game, Bingo, spinning reel games, etc. In multi-hand poker embodiments, a lock and improve feature could be implemented with 3 hands, 5 hands, 10 hands, 25 hands, 50 hands, 100 hands, or any other number of hands. In some of these embodiments, the chances of hitting the feature may go up as there are many more card positions where items may be associated. However, the bonus bet to be eligible for the feature may also go up, which could cover the cost of increased frequency of triggering the bonus feature. In other embodiments, the lock and improve feature could be implemented across multiple denominations. Here, the awards associated with the items may simply scale with the denomination being played. In embodiments, where there are progressive jackpots, the progressive award values may stay the same, but the chance of being awarded them could fluctuate with the denomination being used. For example, if a player was playing at a penny denomination, they may be 100 times less likely to win a particular progressive award as a player playing a dollar denomination, even though both players are playing for a, for example, $10,000 progressive jackpot. Fixed jackpot award values, may however, be scaled to the denomination being played. Hence, a mini jackpot may be $10.00 for a penny player, but $1000.00 for a dollar player.

In one example embodiment, a player may be playing a 3-hand multi-play poker game with a wager of 5+5 (five credits wagered on each hand plus 5 credits wagered per each hand for bonus eligibility) for a total wager of 30 credits per gaming event. Here, every card has a chance to be associated with a sub-symbol overlay, where each sub-symbol could be associated with a credit value or a progressive indicator. If a player received 6 sub-symbols during play in the 15 card positions, it would trigger a lock and improve bonus. In the lock and improve bonus, each card position that is not associated with a sub-symbol may be randomly spun (card flip, or other animation to show you had a chance of a sub-symbol appearing at that card position) to try for a sub-symbol at that position. The player may receive 3 tries or spins to get all positions associated with a sub-symbol. Each time the player receives a new sub-symbol, the player may reset a "Remaining Spins" meter to 3 spins. Hence, the bonus ends when the player spins three times in a row without receiving a new sub-symbol, or has each card position associated with a sub-symbol. Here, if the player gets all 15 card positions associated with a sub symbol, the player wins a Mega Jackpot. In this example, the game may have a 4 level jackpots (top 2 may be progressive, and the bottom 2 would be fixed awards presented as jackpots), such as according to the following reset values:

| | |
|---|---|
| Mega | $20k |
| Major | $500 |
| Minor | $250 |
| Mini | $50 |

In other embodiments, a bonus event associated with items associated with cards or other game symbols may be triggered (by, for example, receiving a predefined number of them in the game grid during a gaming event) and locked or otherwise held in their respective positions while one or more additional base game events are played. In one example embodiment, a gaming device includes a video poker game where sub-symbol overlay items are randomly associated with cards or card positions. Here, if a predetermined number of overlay items are received during a game event (e.g., if a multi-hand poker game of three hands, six or more overlay items may be required to trigger the bonus event), the overlay items may be locked or held relative to the card positions where they appear and a counter may be presented showing a predetermined number of games in which the overlay items will be held. In this example embodiment, one or more additional poker base games may be wagered on where the overlay items are held, where additional items can be received in these additional one or more poker games. Additionally, when the one or more additional poker games have been played, the bonus event may conclude and the received items may be evaluated to provide a bonus amount, modifier, or other award. In some embodiments, one or more of the overlay items may be evaluated and used during the one or more additional poker base games. For example, if an overlay item is associated with a multiplier, that multiplier may be used on one (or more) of the additional poker games. Alternatively, in another example, if an overlay item is associated with a multiplier, the multiplier may be held until the end of the bonus event and then used on the final poker base game during the bonus event, or may be used on poker base games after the bonus event has concluded.

As discussed above, the overlay items in this embodiment may be associated with credit values, progressive award indicators, multipliers, bonus cards, wild symbols, etc. In some embodiments related to the above example, if the overlay items are associated with credit values or progressive awards, those credits and/or progressive awards may be awarded at the conclusion of the bonus event. Additionally, in some embodiments, receiving one or more additional overlay items during the bonus event (i.e., prior to the counter showing the remaining number of games at zero) may reset the counter or add additional games to the counter.

In yet other embodiments, a player may need to wager additional credits or coins to activate each card location or card column in order to be eligible for a bonus opportunity occurring in those card locations or card columns. For example, if a specific card (e.g., an Ace, a royal, or other predetermined card) or an item (such as a sub-symbol overlay) appears in an active card location or card column, the player may win credits, multipliers, game modifiers, or other awards, or trigger a secondary bonus feature. On the other hand, if a player receives a predetermined card (or card type) or item in a non-activated card position or card column, the player does not win any additional award or feature.

In some embodiments, credits appear on a specific card (or on a sub-symbol overlay associated with a card) in a location where a player will have had to place an additional wager on to activate that location in order for the player to win. In other embodiments, the specific cards or sub-symbols may be associated with multipliers or progressives, or could cause the card to become a wild card, a "split card" with multiple card indicia, or have another type of game modifier. In some embodiments, if a progressive is shown, the player would win the specified progressive. If, on the other hand, multipliers are won, the multipliers could be used on the current hand or on the next one or more subsequent poker hands.

In some embodiments, a bonus bet may be needed to be eligible for the bonus feature. This bonus bet may be structured as a 5+1, 5+2, 5+3, 5+4, 5+5, etc. where the bonus bet is the second number. Hence, in a 5+5 embodiment, the player would bet five credits on the poker hand and be paid according to a 5-credit paytable, while paying an additional 5 credits (10 credit total wager) to also be eligible for the bonus. In one example embodiment, the player may place a 5+1 bet to activate the first card position in a five-card poker hand, place a 5+2 bet to activate the first and second card positions in the five-card poker hand, place a 5+3 bet to activate the first, second, and third card positions in the five-card poker hand, place a 5+4 bet to activate the first, second, third, and fourth card positions in the five-card poker hand, and place a 5+5 bet to activate all of the card positions in the five-card poker hand. In other embodiments, no bonus bet may be needed.

This feature could be implemented in single-hand poker, multi-hand poker, Keno game, Bingo, spinning reel games, etc. In multi-hand poker embodiments, a lock and improve feature such as is discussed above could be implemented with 3 hands, 5 hands, 10 hands, 25 hands, 50 hands, 100 hands, or any other number of hands. In some of these embodiments, the chances of hitting the feature may go up as there are many more card positions where items may be associated. However, the bonus bet to be eligible for the feature may also go up, which could cover the cost of increased frequency of triggering the bonus feature. In other embodiments, the lock and improve feature could be implemented across multiple denominations as discussed above.

In one example embodiment, a player may be playing a single hand poker game where the player wagers 5 credits for the poker hand and another 5 credits for each card position that they want to activate (hence, up to a 30-credit total bet). When the cards are dealt to the poker hand (and drawn if it is a draw poker game), sub-symbols may appear on the cards where the sub-symbols have a credit value or progressive name (e.g., Grand, Major, Minor, Mini). Every card may have a chance to receive a sub-symbol (i.e., the sub symbols can be dependent on cards, although a second deck or other technique could be used to ensure that each card whether held or replaced in draw poker could receive a sub-symbol on the draw), or the sub-symbols could be independent of any particular card and just be randomly selected to appear or not at each card position. Here, for each location that has a sub symbol player may win credits or a specified progressive from, for example, the following:

| 4 Level Progressive | |
|---|---|
| Grand | $10k |
| Major | $500 |
| Minor | $250 |
| Mini | $50 |

In a second example embodiment, a multi-hand poker game with three hands may be played where a player wagers 5 credits for each poker hand and 5 credits for each card position (or 15 credits for each card column) for up to a total wager of 90 credits. When the cards are dealt to the poker hand (and drawn if it is a draw poker game), sub-symbols may appear on the cards where the sub-symbols have a credit value or progressive name (e.g., Grand, Major, Minor, Mini). Every card may have a chance to receive a sub-symbol (i.e., the sub symbols can be dependent on cards, although a second deck or other technique could be used to ensure that each card whether held or replaced in draw poker could receive a sub-symbol on the draw), or the sub-symbols could be independent of any particular card and just be randomly selected to appear or not at each card position. Here, for each location that has a sub symbol player may win credits or a specified progressive from, for example, the following:

| 4 Level Progressive | |
|---|---|
| Grand | $10k |
| Major | $500 |
| Minor | $250 |
| Mini | $50 |

In a third example embodiment, a multi-hand poker game with three hands may be played where a player wagers 5 credits for each poker hand and 5 credits for each card column for up to a total wager of 40 credits. When the cards are dealt to the poker hand (and drawn if it is a draw poker game), sub-symbols may appear on the cards where the sub-symbols have a credit value or progressive name (e.g., Grand, Major, Minor, Mini). Every card may have a chance to receive a sub-symbol (i.e., the sub symbols can be dependent on cards, although a second deck or other technique could be used to ensure that each card whether held or replaced in draw poker could receive a sub-symbol on the draw), or the sub-symbols could be independent of any particular card and just be randomly selected to appear or not at each card position. Here, for each location that has a sub symbol player may win credits or a specified progressive from, for example, the following:

| 4 Level Progressive | |
|---|---|
| Grand | $10k |
| Major | $500 |
| Minor | $250 |
| Mini | $50 |

The following figures show some embodiments of gaming devices with the lock and improve feature. However, many other embodiments are possible.

Figure 3:
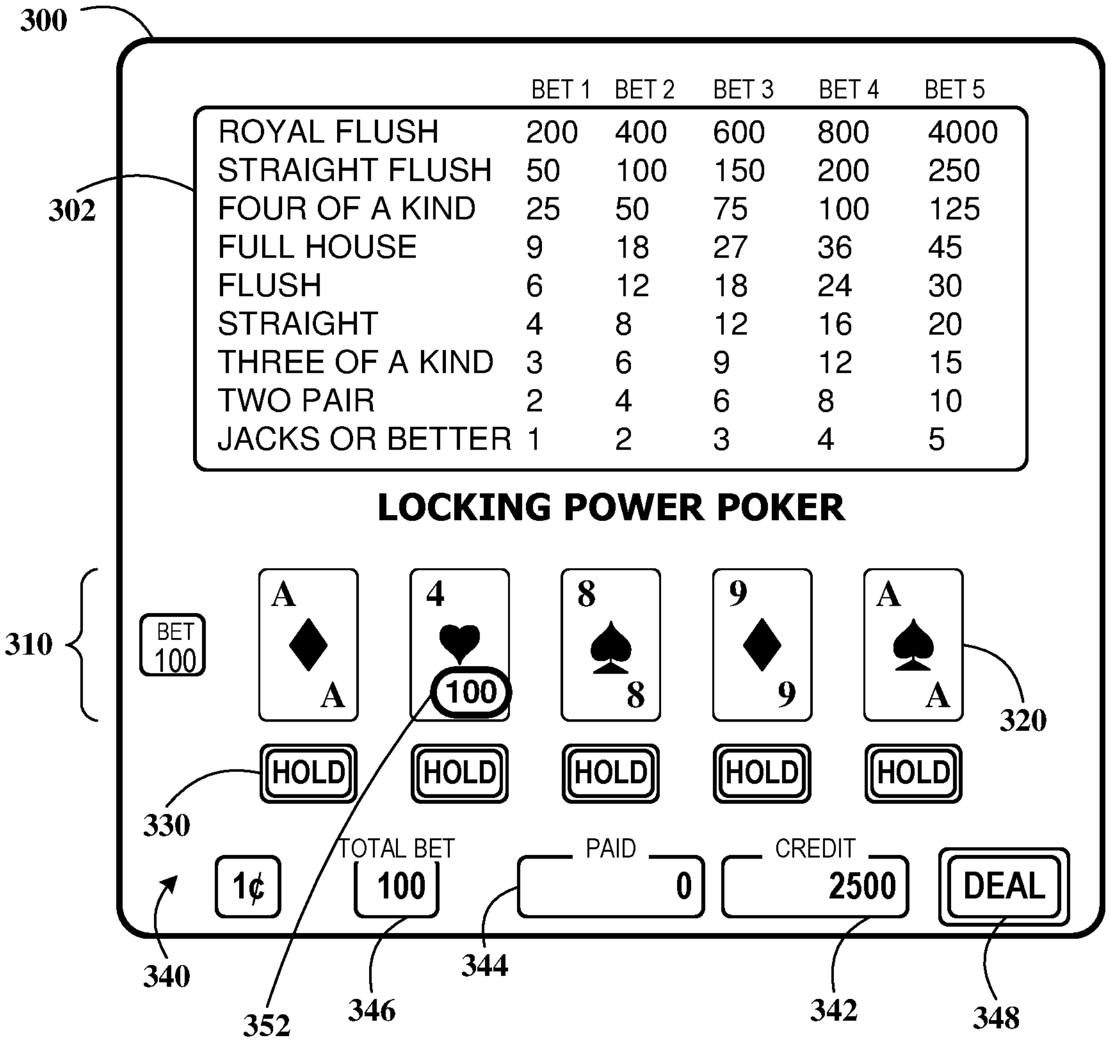
FIG. 3 is a detail diagram of a gaming device display showing a lock and improve feature according to embodiments of the invention.

FIG. 3 is a detail diagram of a gaming device display showing a lock and improve feature according to embodiments of the invention. Referring to FIG. 3, a gaming display 300 of a gaming device includes a game play area showing a game grid of card positions that allow for presentation of virtual playing cards 320 in poker hands 310, a game paytable 302, and a user interface or operations area 340. The user interface area 340 may include various meters and buttons, such as a "Credit" meter 342, a "Paid" indicator 344, a "Total Bet" meter or indicator 346, multiple "Hold" buttons 330 associated with the card positions of the poker hand 310, and a "Deal" or "Draw" button 348. In other poker games, or other types of games of chance, the game play area and/or the player interface area 340 may be different. In this embodiment, sub-symbol items 352 can be associated with the playing cards 320 or the card positions in the game grid, where the cards are displayed in a poker hand 310. In this embodiment, the sub-symbol item 352 is an overlay that is associated with a credit award value of "100" credits. In other embodiments, the sub-symbol item 352 may include a multiplier, a progressive award name, a bonus card, or another type of prize or game modifier.

Although FIG. 3 shows a draw poker game, other embodiments may use a stud poker base game with the sub-symbol items 352. Additionally, in other embodiments, multi-hand poker games, various other poker games, blackjack games, slot games, or other games of chance may be used. In some embodiments, if a sub-symbol 352 is received during the play of the base poker game, the player is immediately awarded what is indicated on the sub-symbol. In embodiments where a credit value is shown on the sub-symbol 352 (such as is shown in FIG. 3), the player would be awarded that credit value in addition to any awards based on the evaluation of the poker hand 310. In embodiments where a multiplier value is shown on the sub-symbol 352, the multiplier value may be used on the current game to multiply any awards based on the evaluation of the poker hand 310, and/or may be used on one or more future poker games to multiply awards in those future poker games. In embodiments where a game modifier is shown on the sub-symbol 352, the game modifier may be used during the current game, and/or may be used on one or more subsequently played poker games.

Figure 4A:
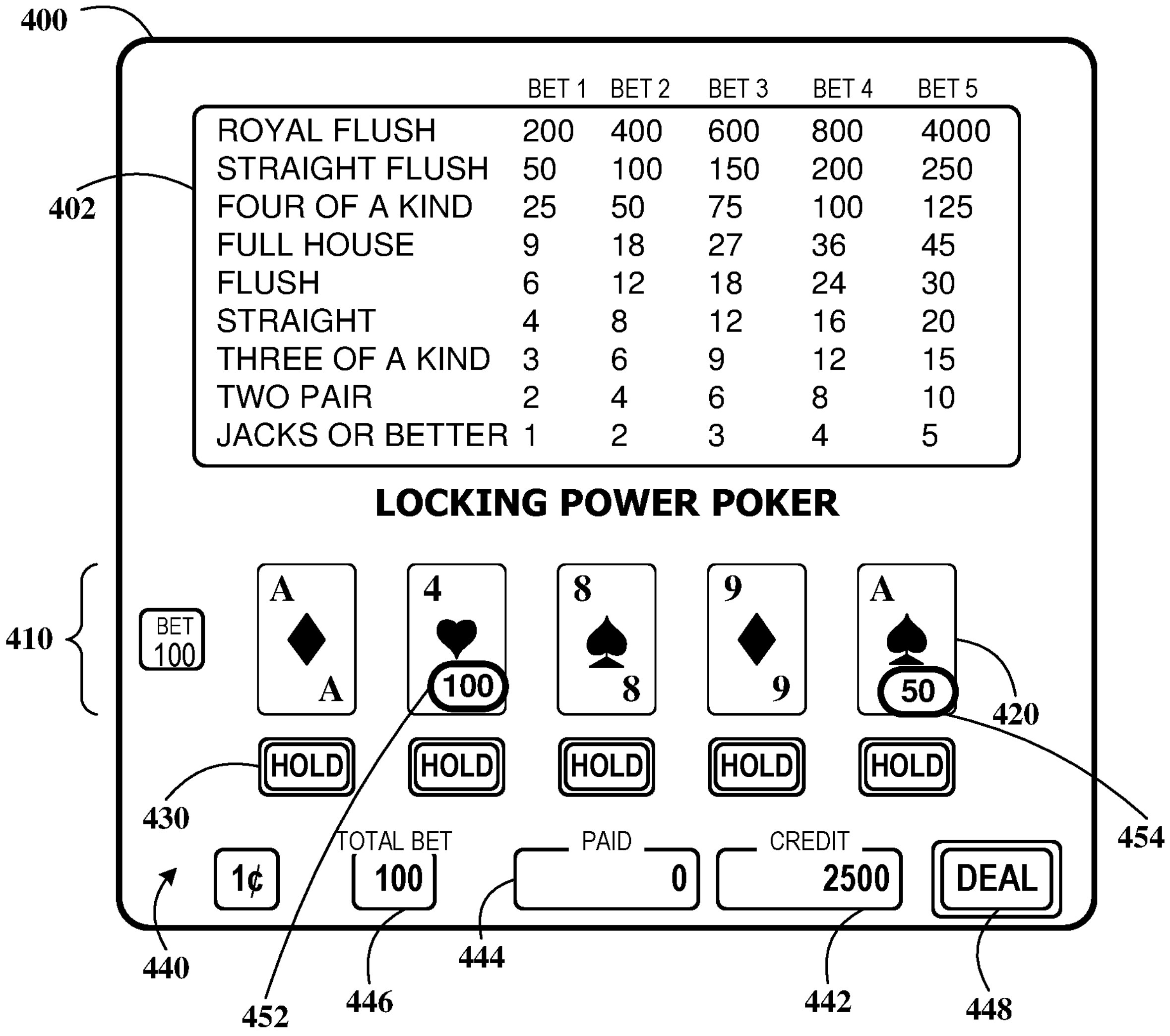
FIGS. 4A, 4B, and 4C are detail diagrams of a gaming device display showing a game progression according to embodiments of the invention.
Figure 4B:
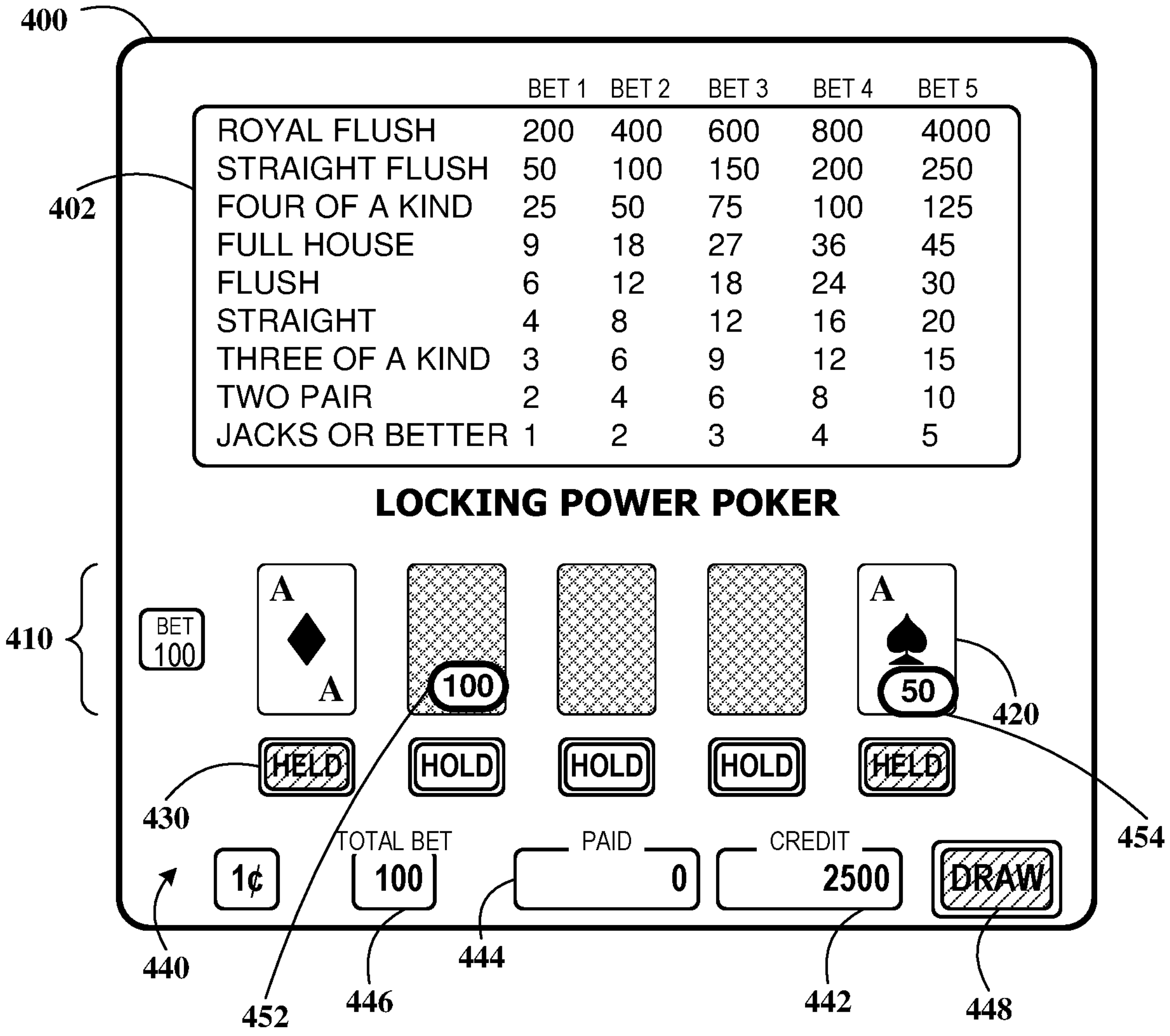
Figure 4C:
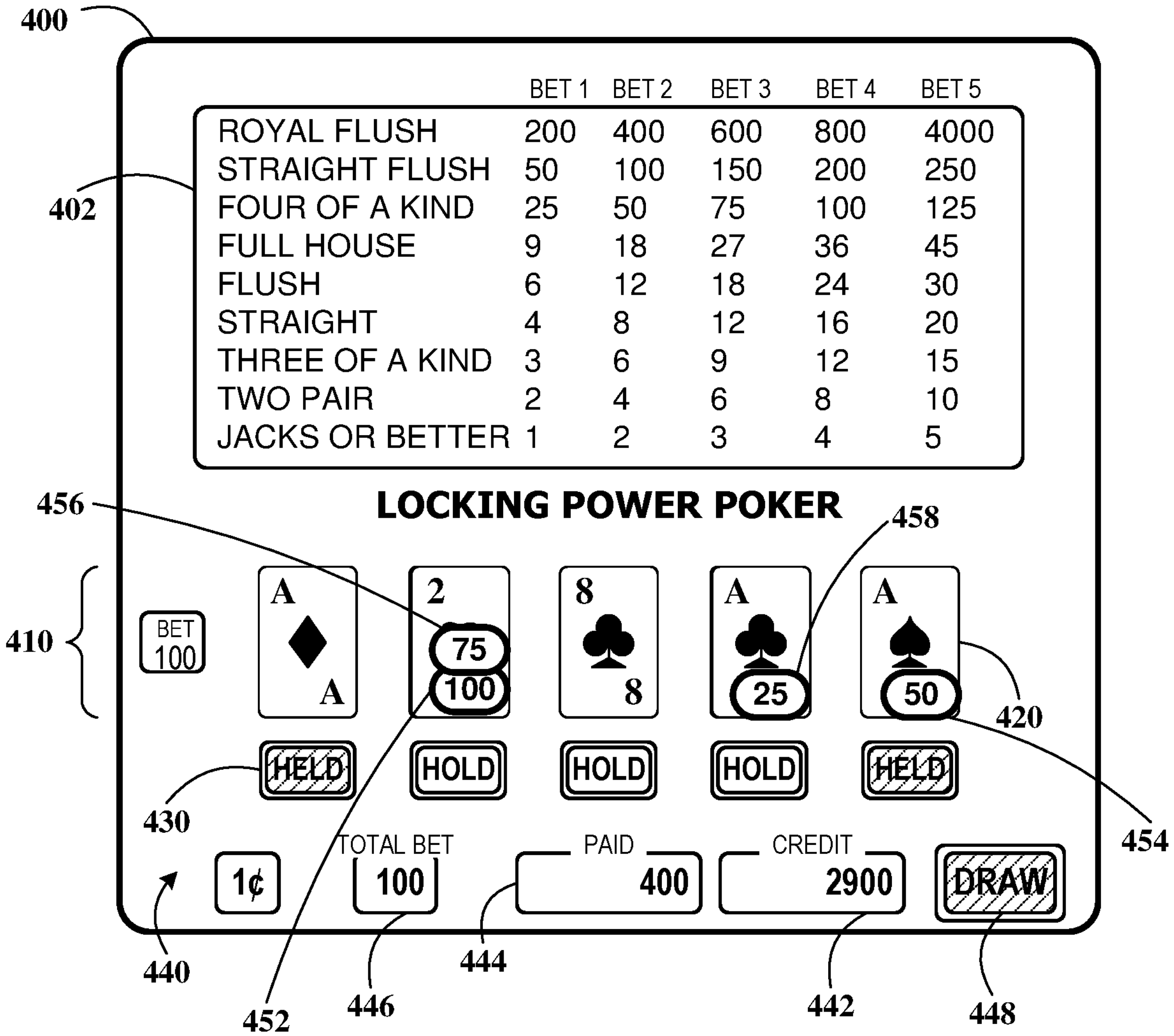

FIGS. 4A, 4B, and 4C are detail diagrams of a gaming device display showing a game progression according to embodiments of the invention. Referring to FIG. 4A, a gaming display 400 of a gaming device includes a game play area showing a game grid of card positions that allow for presentation of virtual playing cards 420 in poker hands 410, a game paytable 402, and a user interface or operations area 440. The user interface area 440 may include various meters and buttons, such as a "Credit" meter 442, a "Paid" indicator 444, a "Total Bet" meter or indicator 446, multiple "Hold" buttons 430 associated with the card positions of the poker hand 410, and a "Deal" or "Draw" button 448. In other poker games, or other types of games of chance, the game play area and/or the player interface area 440 may be different. Here, sub-symbols 452, 454 may be associated with cards 420 or card positions in the game grid, where cards can be displayed in the poker hand 410. In some embodiments, the sub-symbols 452, 454 may be randomly assigned to particular cards in the virtual deck of cards prior to a random deal of the cards to the form the poker hand 410. In draw poker embodiments, a sub-symbol 452, 454 that is received on the deal may be kept at a particular card 420 location irrespective of whether the card it was initially associated with is held or discarded. Hence, in these embodiments, there is no change in poker strategy for holding or discarding the initial dealt cards 420. In other embodiments, a second deck may be used for the draw portion of the draw poker game to determine if sub-symbols 452, 454 appear on any of the held or replacement cards 420 in generating the final poker hand 410.

In other embodiments, one or more random determinations may be done during a game event to determine if the sub-symbols 452, 454 will be associated with a particular card position in the game grid. Here, the sub-symbols may act as overlays that are shown on top of the virtual cards 420 when they are dealt out to form the poker hand 410. In embodiments where a draw poker game is played, a second group of one or more random determinations may be done after a draw is made. Here, the second group of random determinations may randomly determine if a sub-symbol appears in a card position irrespective of whether the initially dealt player card 420 is held or not prior to the draw.

Referring to FIG. 4B, the sub-symbols 452, 454 are maintained with a card position regardless if an associated card 420 is held or not. Here, the player has held the Ace of Diamonds and the Ace of Spades. As the Ace of Spades was associated with 50 credit sub-symbol 454, the sub-symbol is kept along with the Ace of Spades. The 100 credit sub-symbol, however, was associated with a 4 of Hearts that did not get held. However, since the sub-symbol maintained its associate with the second card position in the poker hand 410, the 100 credit sub-symbol is maintained with its respective card position.

Referring to FIG. 4C, the replacement cards 420 have been drawn after the hold and draw. Here, two additional sub-symbols 456, 458 have been received on the draw. As shown in FIG. 4C, in some embodiments additional sub-symbols may be drawn for any card position, even card positions that already are associated with a sub-symbol from the deal. In this case, a 75 credit sub-symbol 456 is randomly associated with the second card position in the poker hand 410 even though the second card position is already associate with a 100 credit sub-symbol 420 from the deal. In some embodiments, the player will be awarded the value of all of the sub-symbols received at the end of the game event (such as shown in FIG. 4C, where the player is awarded 150 credits for the 3-of-a-kind Aces, and 250 credits for the four sub-symbols 452, 454, 456, 458 received, which is shown in the Paid meter 444. In other embodiments, a player may only be awarded the top valued sub-symbol for any particular card position (hence would only be awarded for the 100 credit sub-symbol 452 in the second card position). In yet other embodiments, the player may only be award for the largest-valued sub-symbol received for the entire poker hand (hence the player would only receive the 100 credit sub-symbol 452 and not the other three sub-symbols 454, 456, 458).

In still other embodiments, the player may have to receive a certain number of sub-symbols on the poker hand 410 to be awarded their value. For example, a player may have to receive 3 or more sub-symbols in a poker game to be eligible to win the combined value associate with the received sub-symbols. In other embodiments, the player may have to place additional wagers to activate each of the card positions to be eligible to win any awards associated with sub-symbols that are received in those card positions.

Figure 5A:
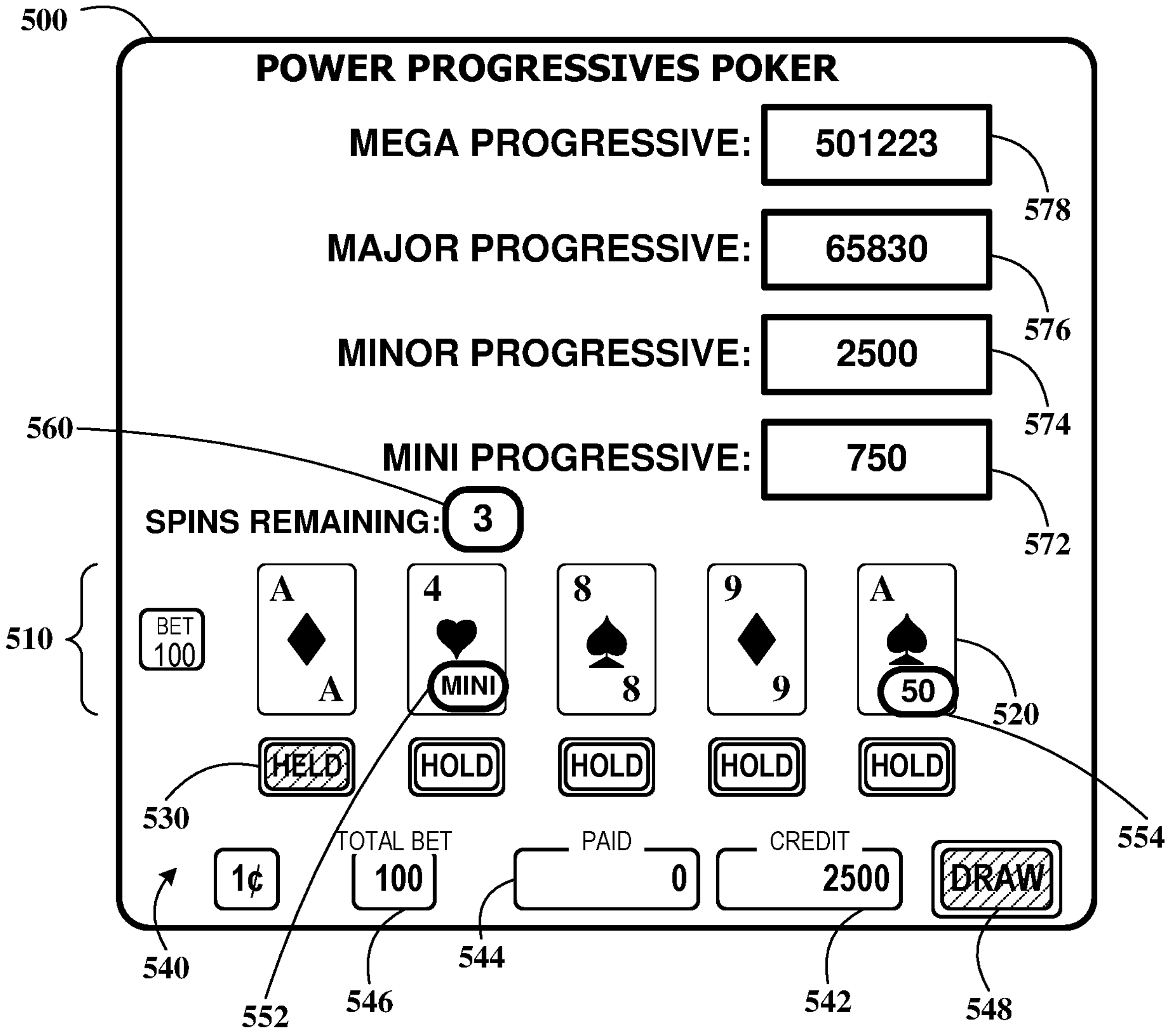
FIGS. 5A, 5B, 5C, 5D, and 5E are detail diagrams of a gaming device display showing a game progression according to embodiments of the invention.

FIGS. 5A, 5B, 5C, 5D, and 5E are detail diagrams of a gaming device display showing a game progression according to embodiments of the invention. Referring to FIG. 5A, a gaming display 500 of a gaming device includes a game play area showing a game grid of card positions that allow for presentation of virtual playing cards 520 in poker hands 510, a multi-level progressive with multiple progressive meters 572, 574, 576, 578, and a user interface or operations area 540. The user interface area 540 may include various meters and buttons, such as a "Credit" meter 542, a "Paid" indicator 544, a "Total Bet" meter or indicator 546, multiple "Hold" buttons 530 associated with the card positions of the poker hand 510, and a "Deal" or "Draw" button 548. In other poker games, or other types of games of chance, the game play area and/or the player interface area 540 may be different. In this embodiment, the multi-level progressive includes a top progressive award ("Mega Progressive") 578, a second level progressive award ("Major Progressive") 576, a third level progressive award ("Minor Progressive") 574, and fourth level progressive award ("Mini Progressive") 572.

In this example embodiment, a single draw poker hand 510 may have items or sub-symbols 552, 554 associated with the virtual cards 520, or the card positions in the game grid, where random cards are displayed as a poker hand 510. Here, if a minimum number of sub-symbols 552, 554 are received during the poker gaming event (during the deal only, or during both the deal and the draw), a bonus event is triggered. In this example embodiment, the minimum number of items 552, 554 that need to be received to trigger the bonus event is two. As shown in FIG. 5A, as two of these sub-symbol items 552, 554 are received, the bonus event is triggered. In some embodiments, the triggering of the bonus event may simply award the values or modifiers associated with each of the sub-symbol items 552, 554. In this illustrated embodiment, however, the player may have a predefined number of chances to obtain extra sub-symbol items 552, 554 and improve his or her bonus award. A bonus spin meter 560 may show a number of chances or spins the player has to receive additional sub-symbol items 552, 554. In some embodiments, the number indicated by the meter 560 is the total number of chances a player has to receive additional bonus items 552, 554. In other embodiments, the number of chances shown on the bonus spin meter 560 may be reset to a predetermined number (the same as the starting number of chances, or a different number) or may be increased based on what happens during the bonus event. For example, if another bonus item 552, 554 is received during one of the additional chances, the bonus spin meter 560 may be reset to 3 chances or spins.

In these example embodiments, the remaining cards 520 that are not currently associated with a sub-symbol 552, 554 are "re-spun" where the card values stay the same (but may animate in a flipping or other motion) while a random determination is made as to whether sub-symbols will respectively be associated with each of those particular card positions. Here, as the cards 520 are spinning or flipping, some of the cards (for example the Ace of Diamonds in the first card position) flipping by may be associated with a sub-symbol bonus item 552, 554 and some of the cards spinning or flipping by are not associated with any sub-symbol bonus item. The items 552, 554 may further specify one of the progressive awards 572, 574, 576, 578, or a player may win one of the progressives if they receive a sub-symbol at each card position before they are out of any remaining spins shown on the bonus spin meter 560.

Figure 5B:
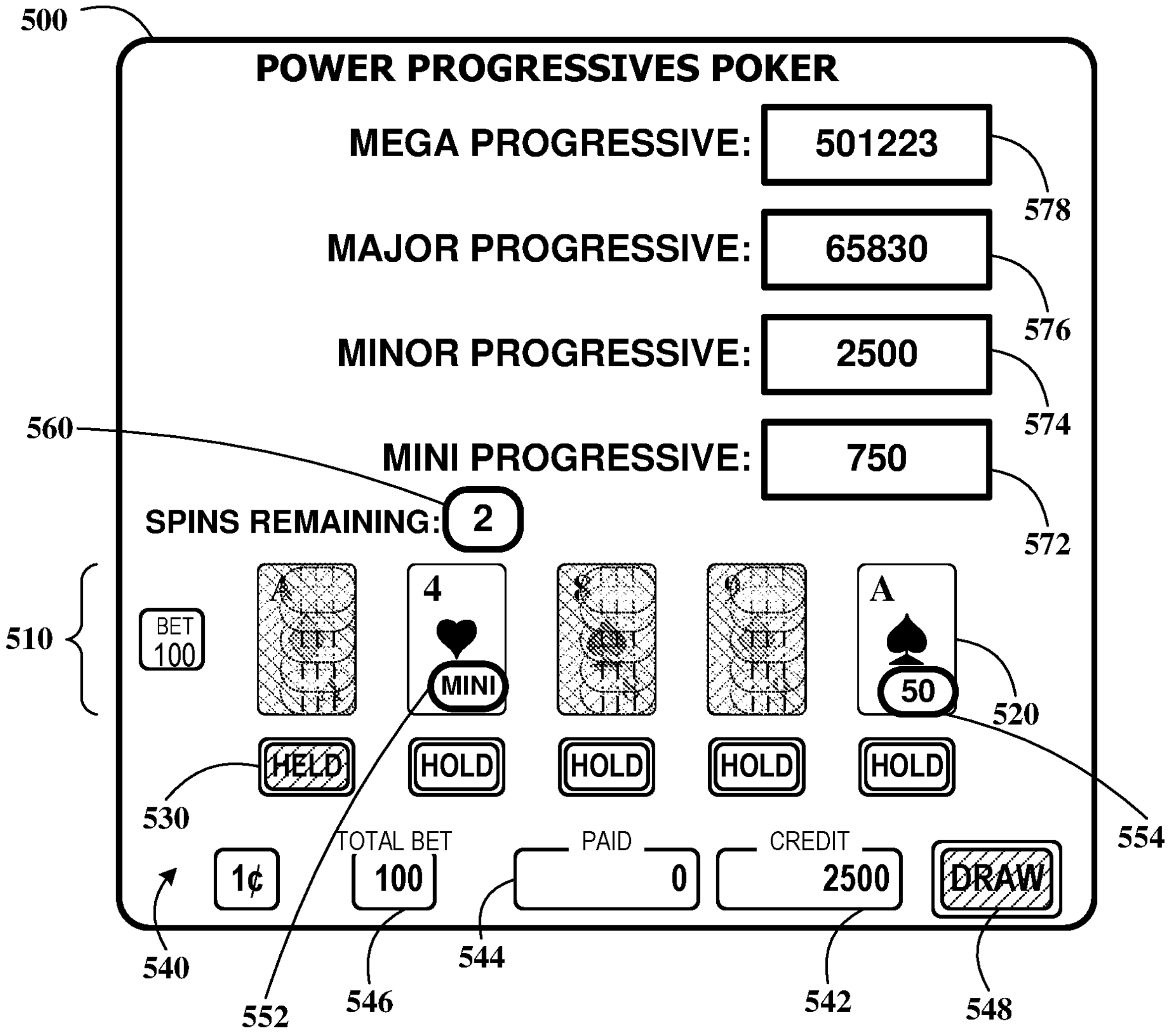
Figure 5C:
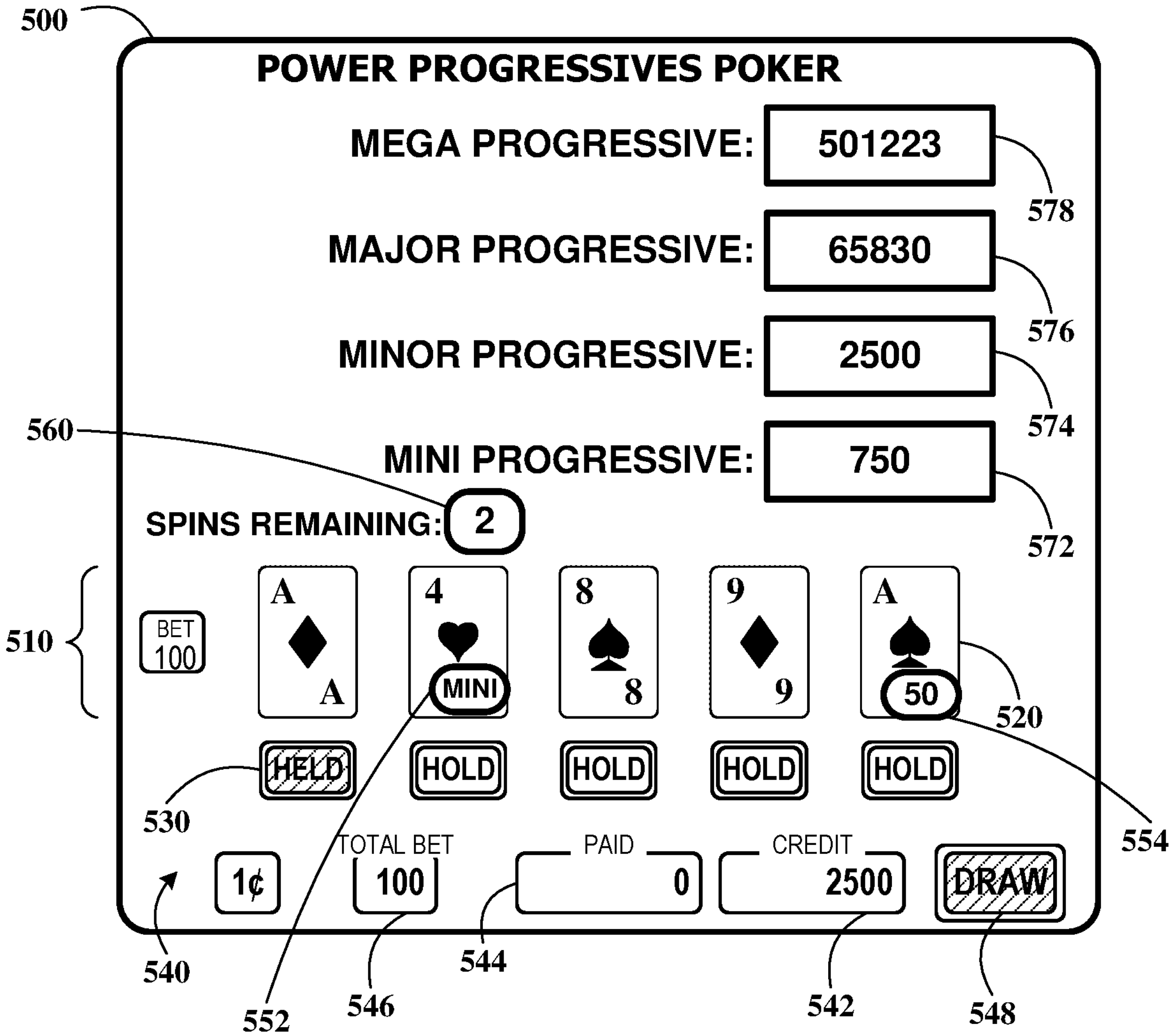
Figure 5D:
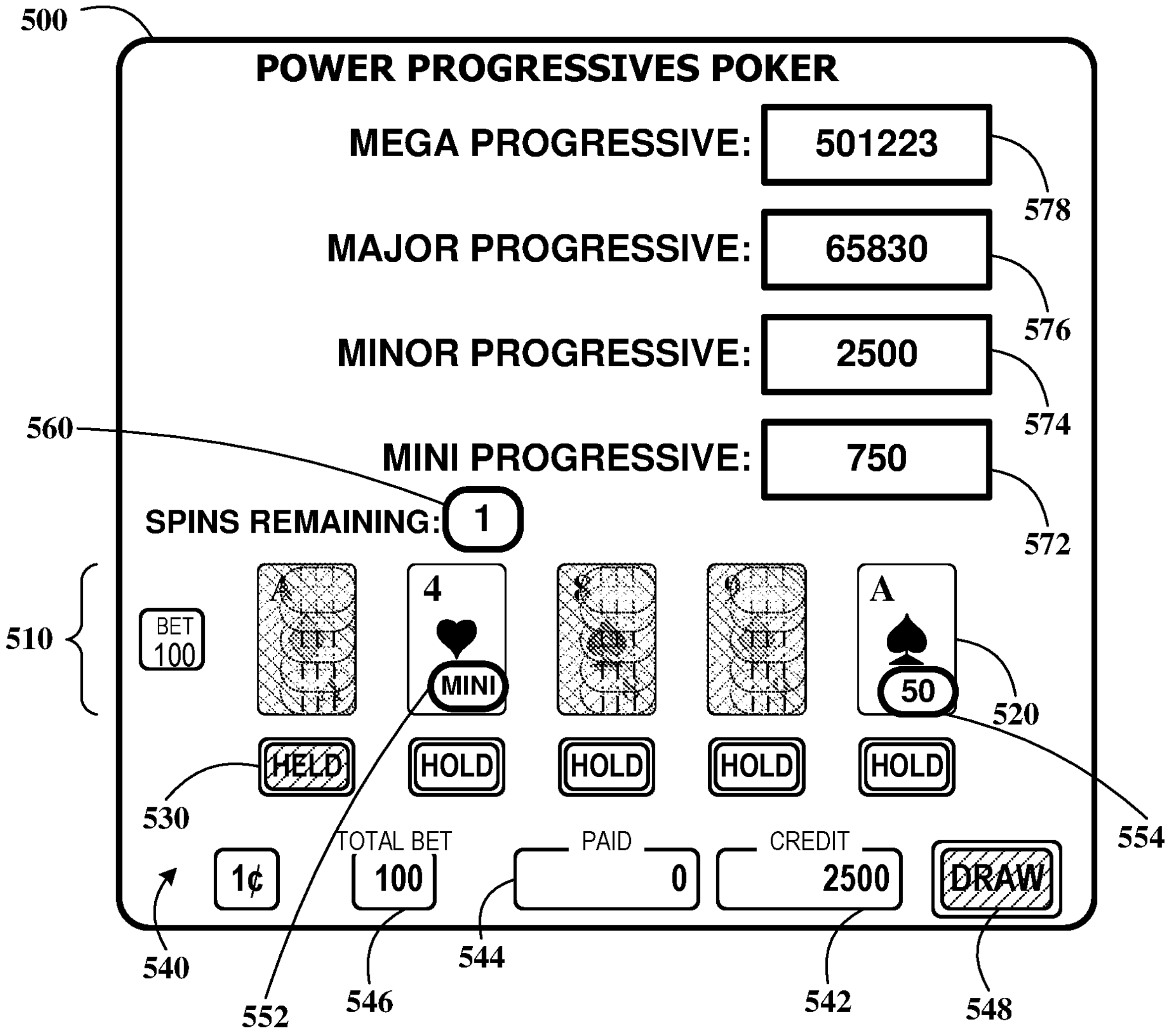
Figure 5E:
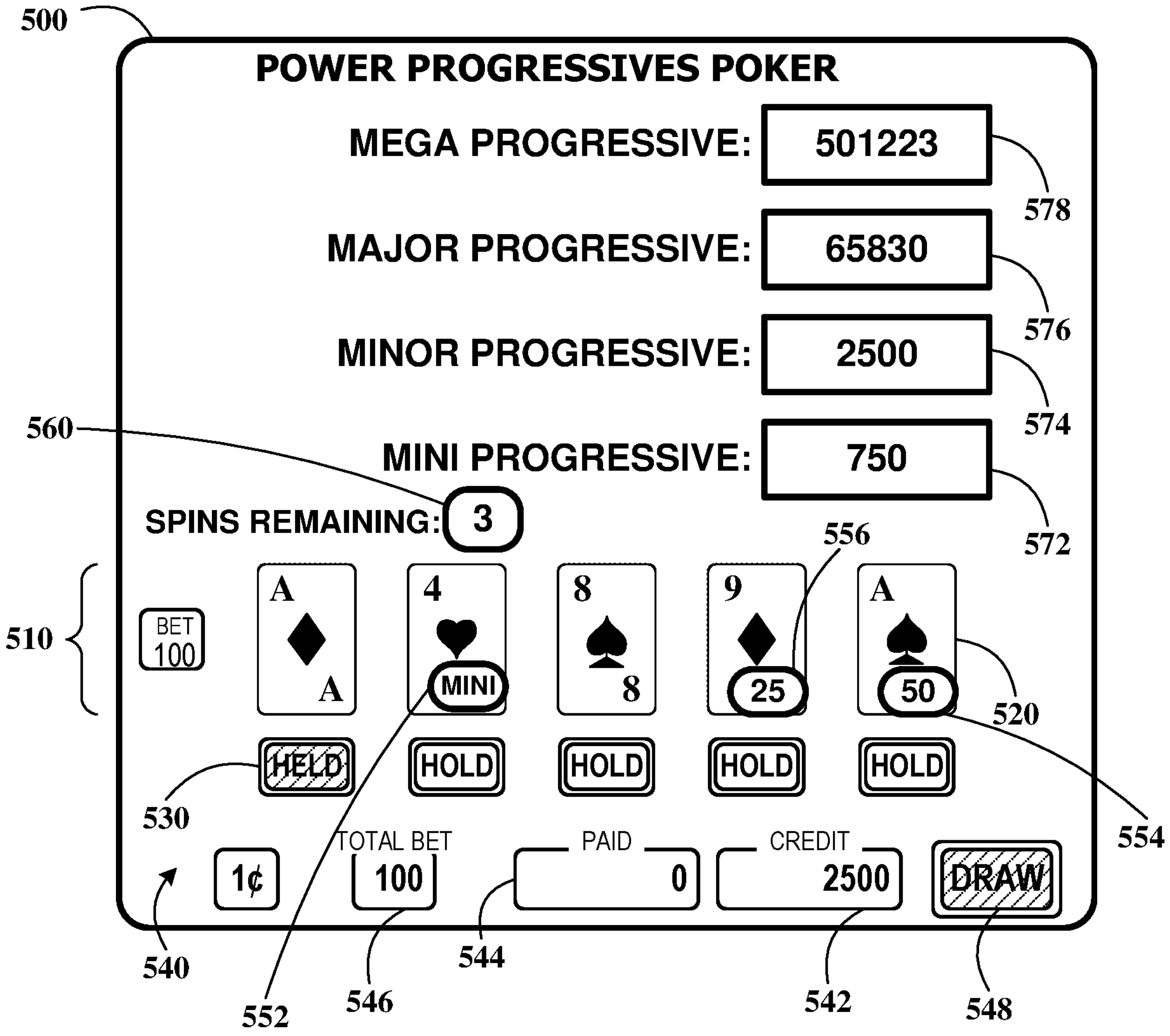

Referring to FIG. 5B, the first, third, and fourth card positions (i.e., the card positions not associated with one of the received bonus sub-symbol items 552, 554 are re-spun, and the number of remaining chances shown on the bonus spin meter 560 is decremented to 2. Referring to FIG. 5C, the first re-spin of the cards is complete and no additional bonus items 552, 554 were received. Note that the Ace of Diamonds in the first card position, 8 of Spades in the third card position, and 9 of Diamonds in the fourth card position have not changed in card rank or suit (i.e., they are still the same cards as when the bonus event was triggered). Referring to FIG. 5D, the first, third, and fourth card positions (i.e., the card positions not associated with one of the received bonus sub-symbol items 552, 554 are again re-spun, and the number of remaining chances shown on the bonus spin meter 560 is decremented to 1. Referring to FIG. 5E, the second re-spin of the cards is complete and a third sub-symbol bonus item 556 has been received at the fourth card position. As one or more additional sub-symbol bonus items 552, 554, 556 was received, the number of remaining spins or chances is reset to "3" on the bonus spin meter 560. Here, the player has three more chances to receive one or more additional bonus items. If the player runs out of chances or receives a bonus item at each card position, the bonus event will end and the player will be awarded each of the values shown on the received bonus items. As shown in FIG. 5E, the player will win at a minimum 75 bonus credits and the "Mini Progressive" award of 750 credits, although the player could potentially win more. FIGS. 6A, 6B, 6C, 6D, 6E, 6F, 6G, 6H, 6I, 6J, and 6K are detail diagrams of a gaming device display showing a game progression according to embodiments of the invention. FIGS. 6A-6K illustrate an example embodiment that uses similar rules to the example embodiment illustrated in FIGS. 5A-5E except that the poker game shown in FIGS. 6A-6K is a multi-hand poker game where 3 poker hands are played during a single game event. Here, six or more bonus items need to be received in the 15 card positions to trigger the bonus event. In other embodiments, more or less poker hands (such as five hands, ten hands, 50 hands, 100 hands, etc.) could be played and/or more or less bonus items may need to be received to trigger the lock and improve bonus feature.

Figure 6A:
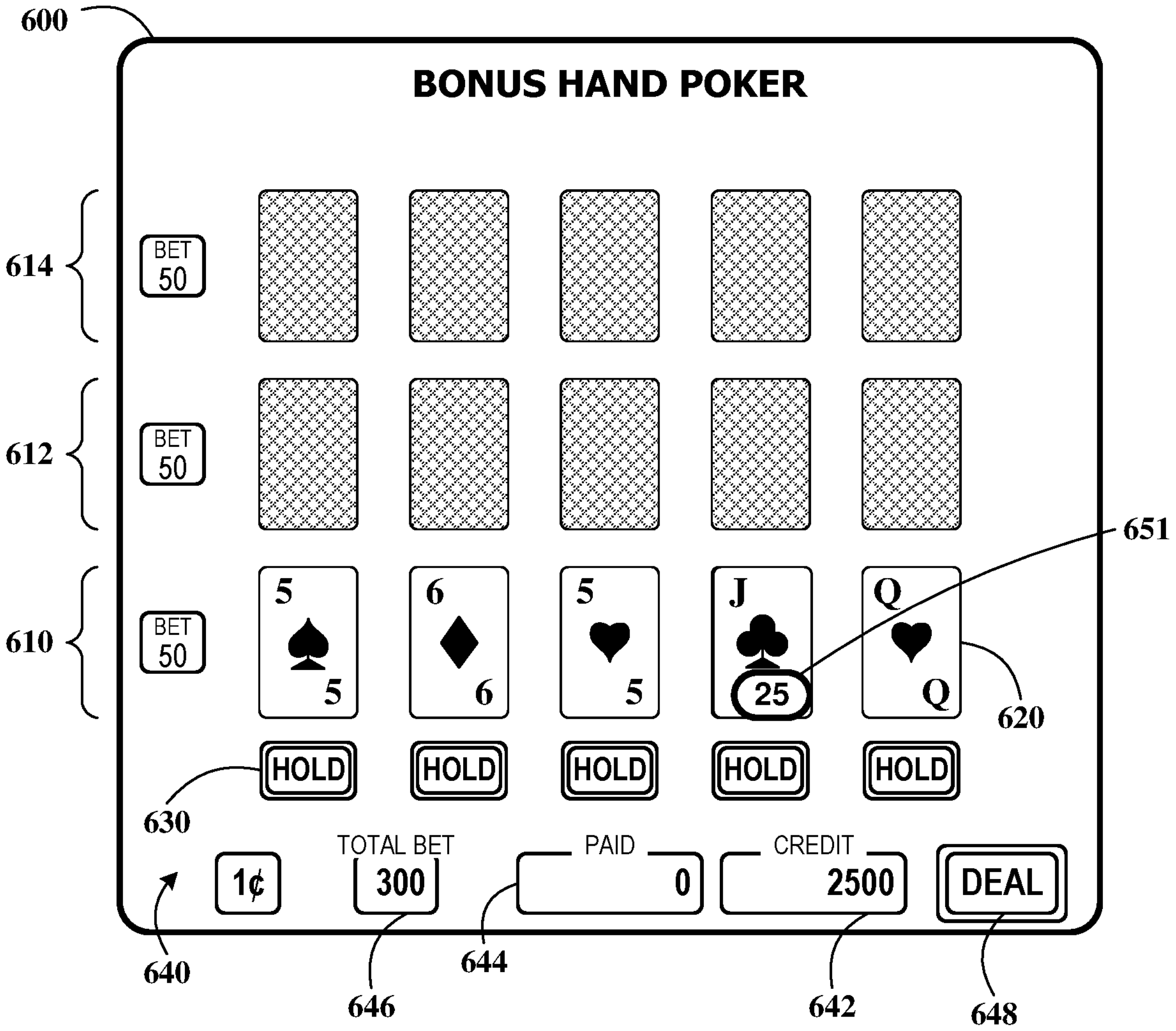
FIGS. 6A, 6B, 6C, 6D, 6E, 6F, 6G, 6H, 6I, 6J, and 6K are detail diagrams of a gaming device display showing a game progression according to embodiments of the invention.

Referring to FIG. 6A, a gaming display 600 of a gaming device includes a game play area showing a game grid of card positions that allow for presentation of virtual playing cards 620 in three poker hands 610, 612, 614, and a user interface or operations area 640. The user interface area 640 may include various meters and buttons, such as a "Credit" meter 642, a "Paid" indicator 644, a "Total Bet" meter or indicator 646, multiple "Hold" buttons 630 associated with the card positions of the poker hands 610, 612, 614, and a "Deal" or "Draw" button 648. In other poker games, or other types of games of chance, the game play area and/or the player interface area 640 may be different. In this embodiment, the first poker hand 610 is the hand where the initial cards 620 are dealt. Thereafter, these initially dealt cards 620 can be held where the held cards are replicated in the second poker hand 612 and third poker hand 614, and then replacement cards and drawn for each non-held card in the first poker hand 610 and for the remaining card positions in the second poker hand 612 and third poker hand 614. As shown in FIG. 6A, the player has received a bonus item 651 in the first poker hand 610 based on the deal.

Figure 6B:
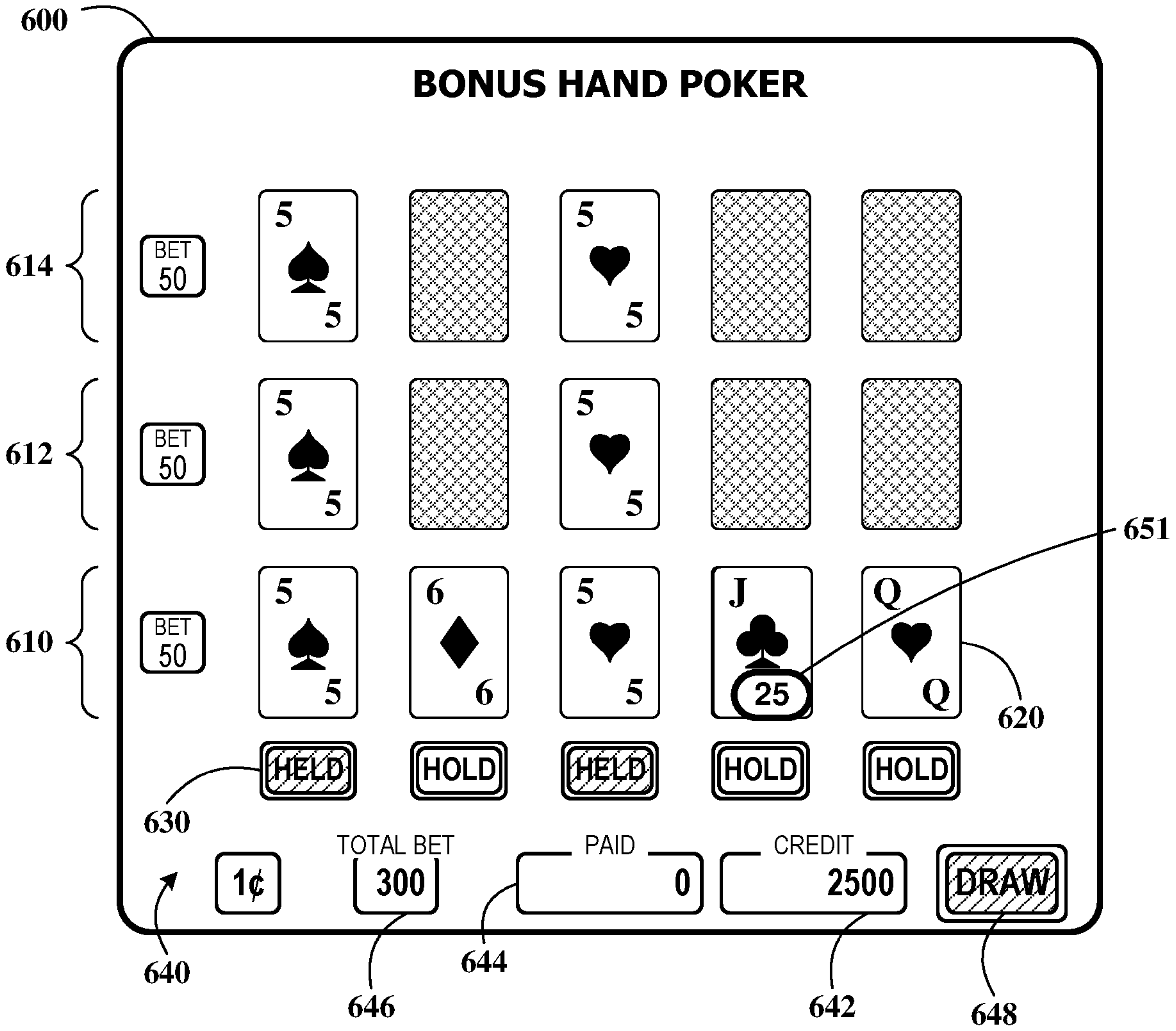

Referring to FIG. 6B, the player has held the 5 of Spades in the first card position and the 5 of Hearts in the third card position of the first poker hand 610, and has activated the Draw button 648. Here, the cards held in the first poker hand 610 were replicated in the associated card positions in the second poker hand 612 and third poker hand 614. When the draw button 648 is activated, it is determined whether any of the held cards that was not associated with a bonus item 651 are now associated with a bonus item. This is the case so that the player strategy in holding cards 620 is not affected by which cards or card positions are associate with bonus items 651. In other embodiments, additional bonus items may be revealed in the second or third poker hand 612, 614 prior to holding cards in the first hand 610, or after the cards in the first hand have been held, but before the Draw button 648 has been activated.

Figure 6C:
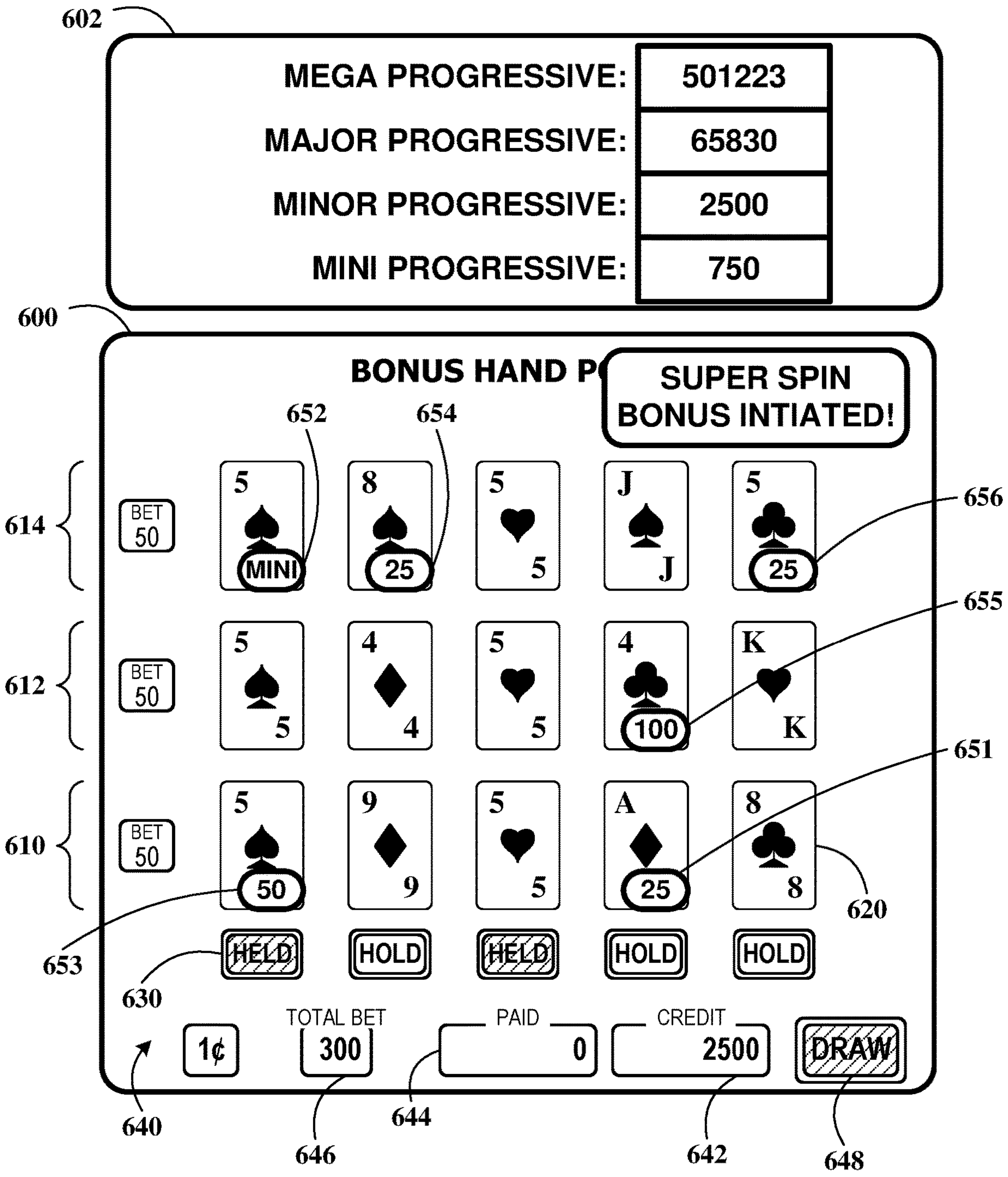

Referring to FIG. 6C, replacement cards have been provided to the non-held positions in the first poker hand 610, the second poker hand 612, and the third poker hand 614. Note that the bonus item 651 that was received on the deal was maintained with the card position after the draw even though the card 620 associated with that card position was not held. Note also, that even though the 5 of Spades in the first poker hand 610 has held and was not initially associated with a bonus item, it is now associated with a bonus item 653 after the draw. In addition, four other bonus items 652, 654, 655, 656 are received in the second or third poker hands 612, 614. As the total number of bonus items has reached the predetermined number of six, a bonus event has been triggered. As one of the bonus items 652 specifies a Mini Progressive award, a progressive display 602 is also shown. This progressive display 602 may be shown even when the bonus event is not active or triggered.

Figure 6D:
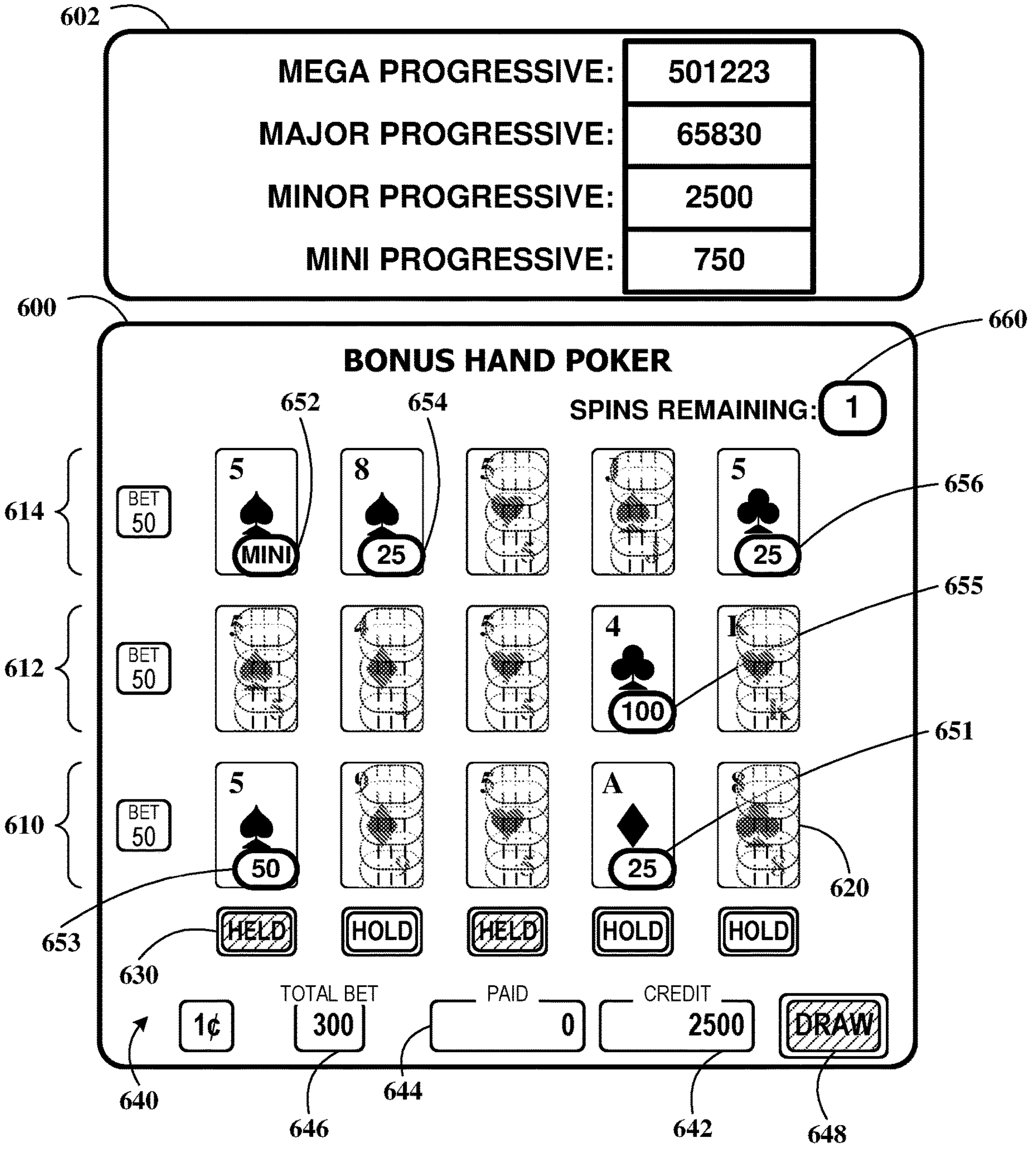

Referring to FIG. 6D, a bonus spin meter 660 is displayed to show the number of remaining bonus spins a player has in the bonus event to receive additional bonus items 651-656. In this embodiment, the player receives two bonus spins to received additional bonus items 651-656, but the player may get additional opportunities to win bonus items as the number of spins resets to two if a player receives one or more additional bonus items during a bonus spin in the bonus event. As shown in FIG. 6D, the card positions that are not associated with a bonus item 651-656 are "re-spun" where versions of the respective cards at each card position being spun are shown with one of a number of bonus items or without a bonus item.

Figure 6E:
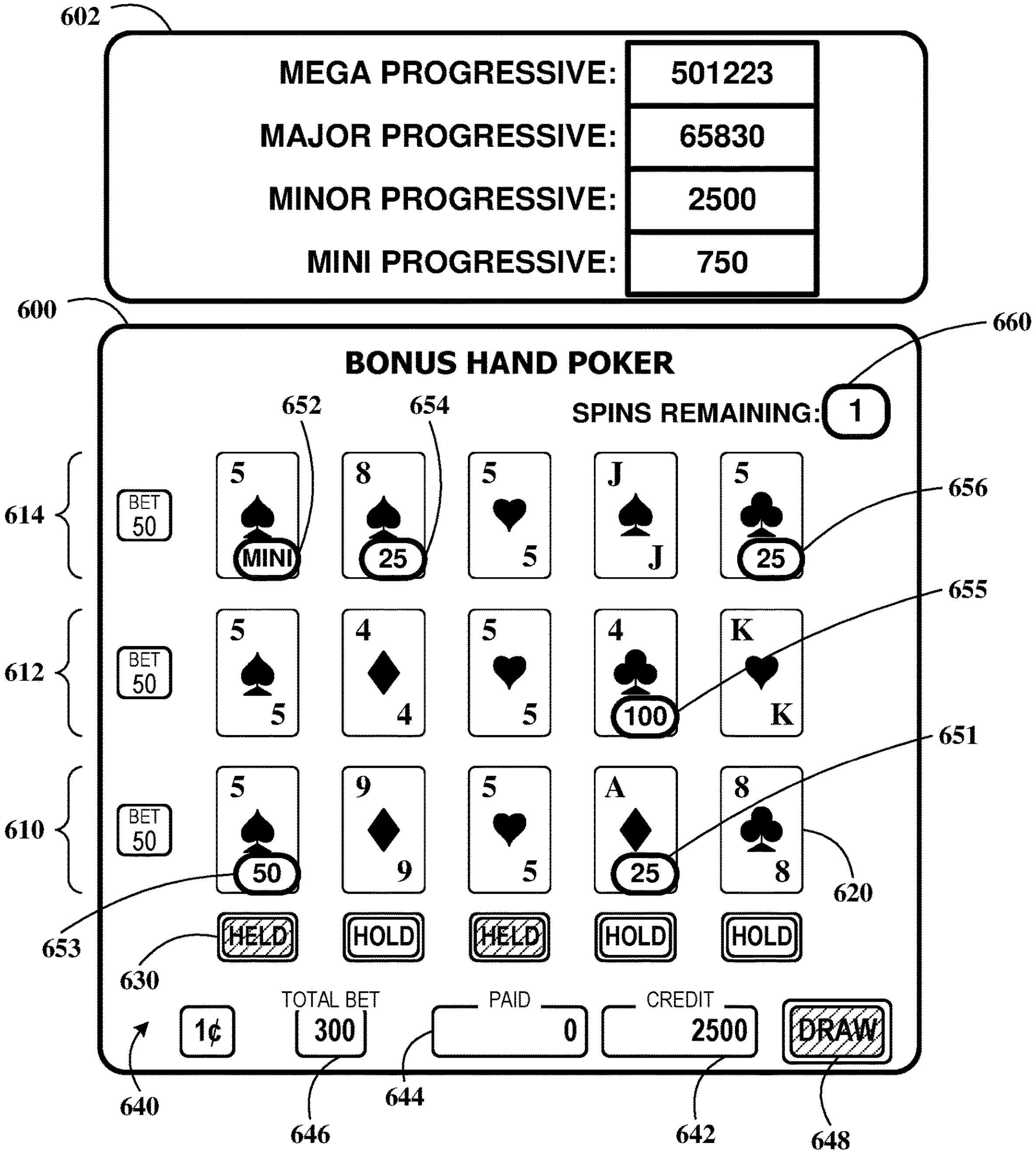
Figure 6F:
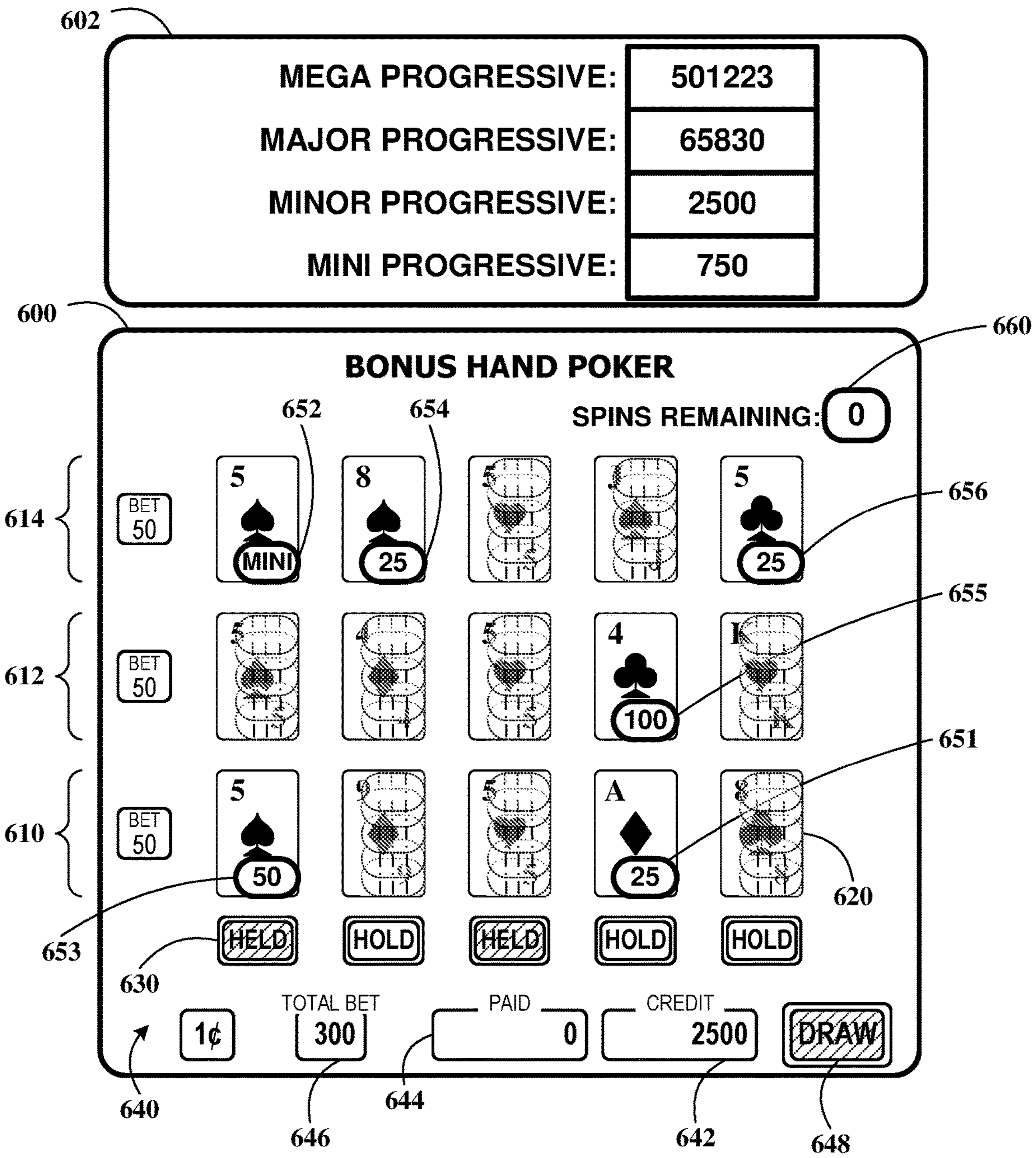
Figure 6G:
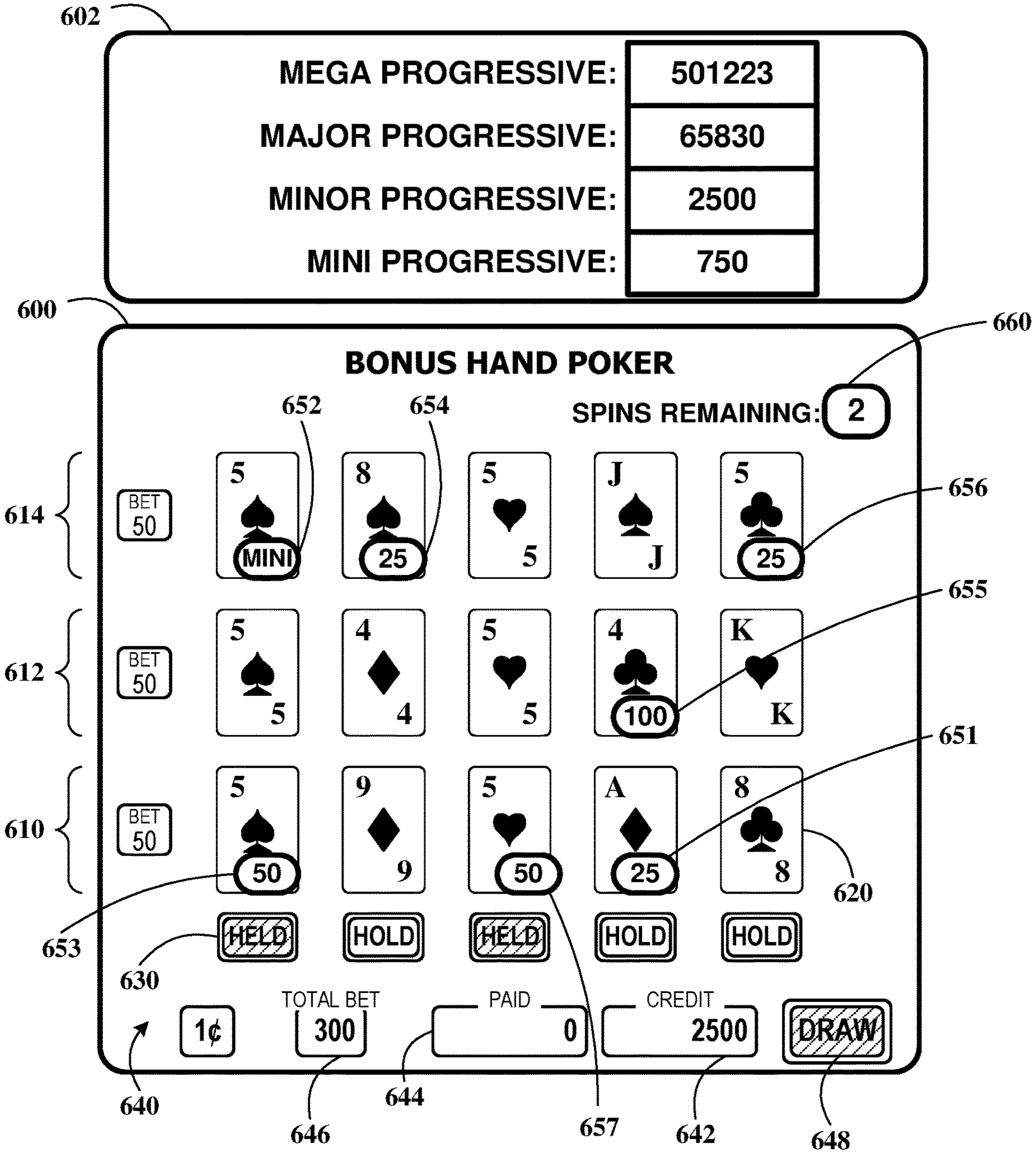
Figure 6H:
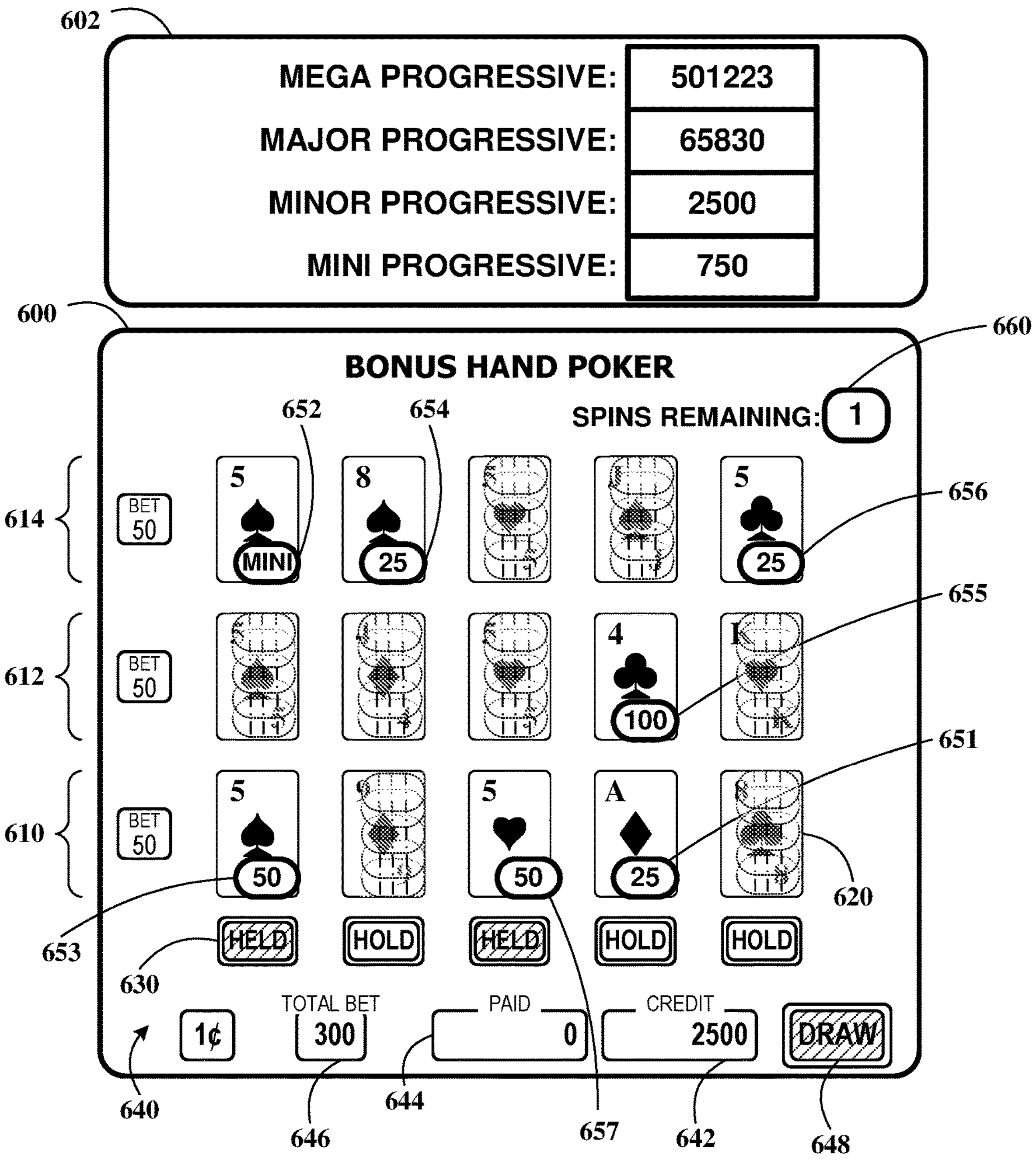
Figure 6I:
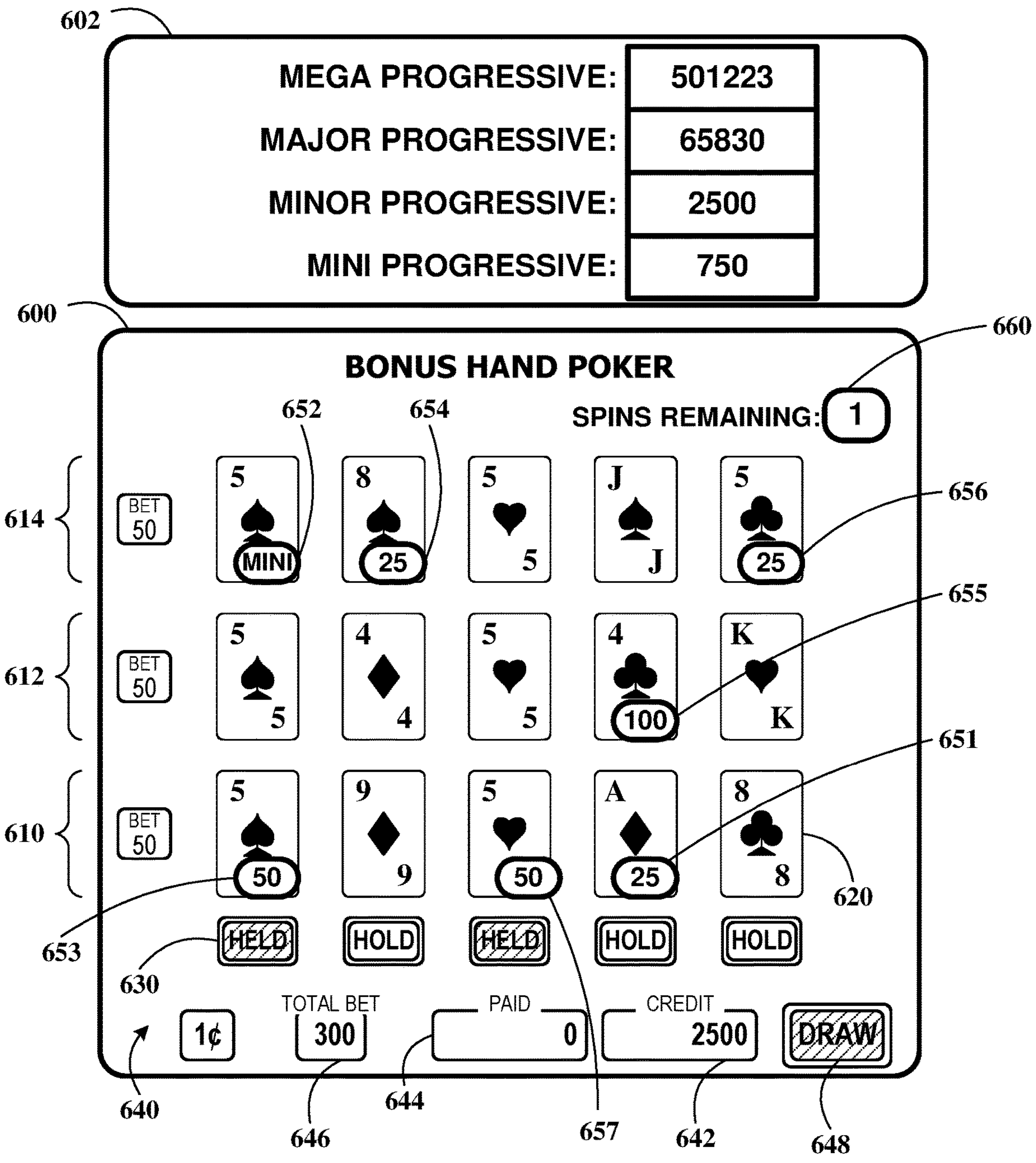
Figure 6J:
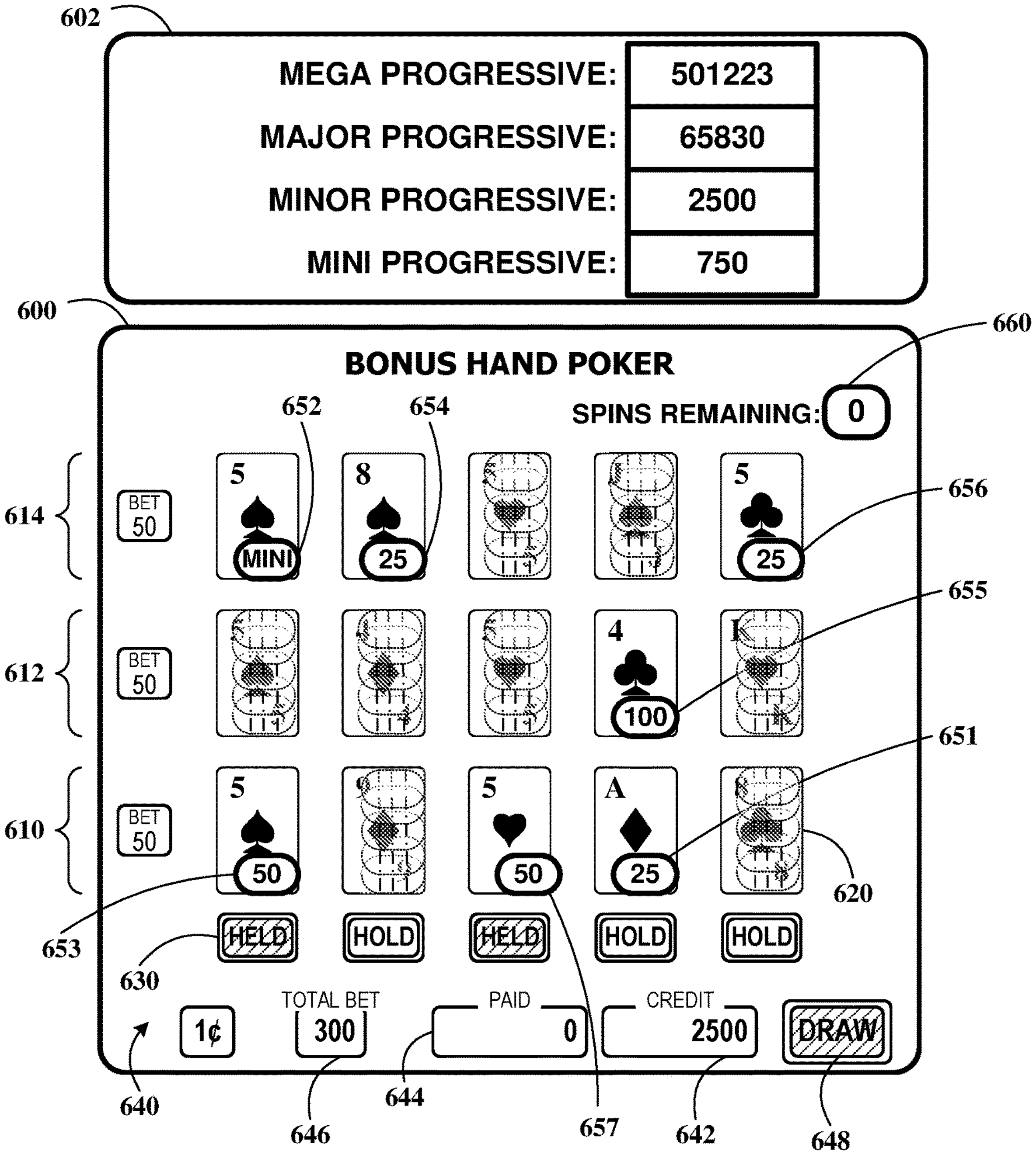
Figure 6K:
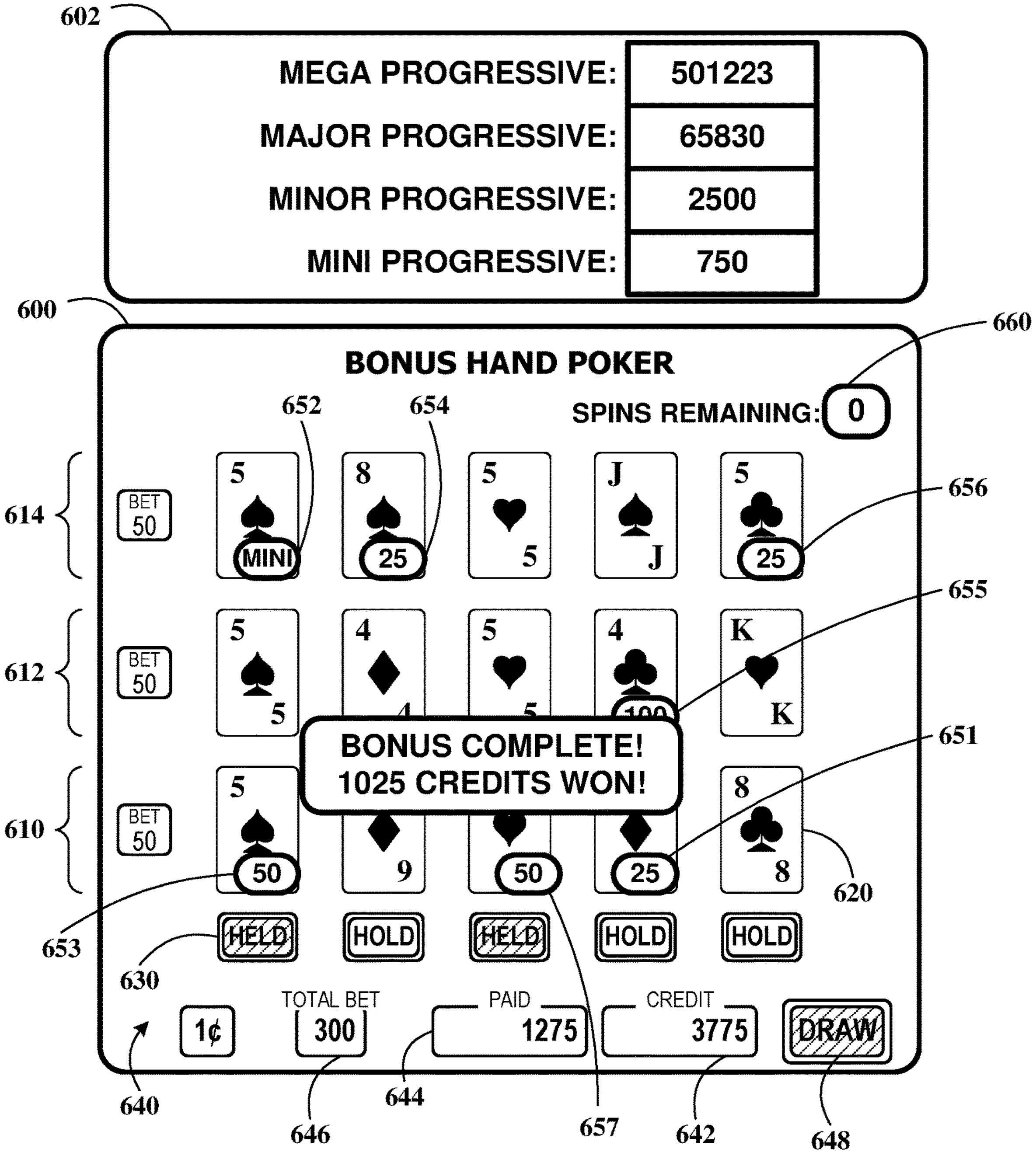

Referring to FIG. 6E, the first bonus spin has been completed, and no additional bonus items 651-656 are received. Referring to FIG. 6F, the second bonus spin is initiated, and the number of remaining spins shown on the bonus spin meter 660 is decremented. Referring to FIG. 6G, the second bonus spin is completed and a seventh bonus item 657 is received. As a new item was received during the bonus spin, the number of remaining spins shown on the bonus spin meter 660 has been reset to "2." Referring to FIG. 6H, the third bonus spin is initiated, and the number of remaining spins shown on the bonus spin meter 660 is decremented. Referring to FIG. 6I, the third bonus spin has been completed, and no additional bonus items 651-657 are received. Referring to FIG. 6J, the fourth bonus spin is initiated, and the number of remaining spins shown on the bonus spin meter 660 is decremented. Referring to FIG. 6K, the fourth bonus spin has been completed, and no additional bonus items 651-657 are received. As there are no more bonus spins remaining on the bonus spin meter 660, the bonus event is complete and the sum of the credits associated with the received bonus items 651-657 are awarded to the player and are provided along with any awards associated with the evaluation of the first, second, and third poker hands 610, 612, 614, which is shown on the Paid meter 644.

Figure 7:
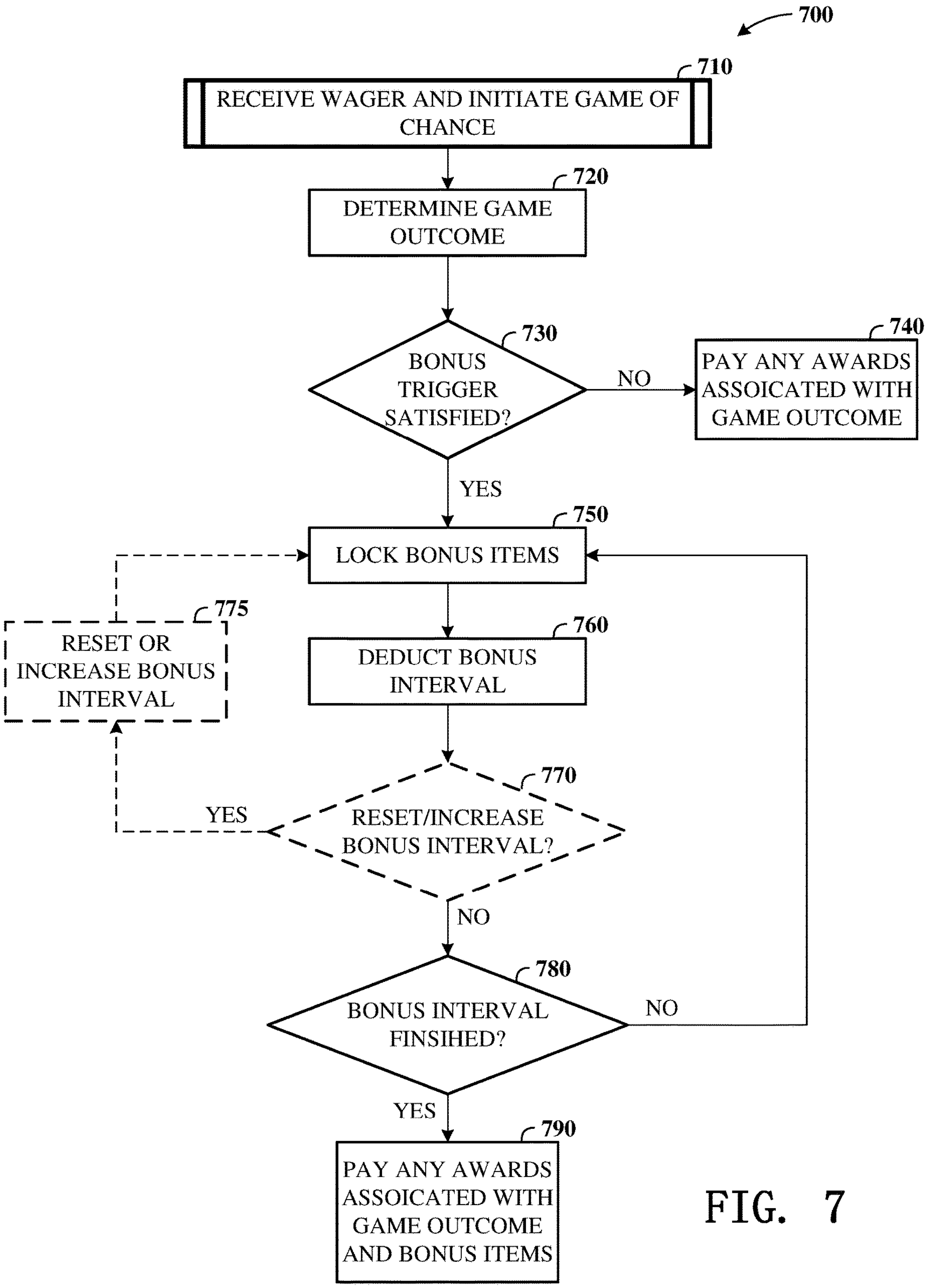
FIG. 7 is a flow diagram showing a method of operating a gaming device according to embodiments of the invention.
Figure 11:
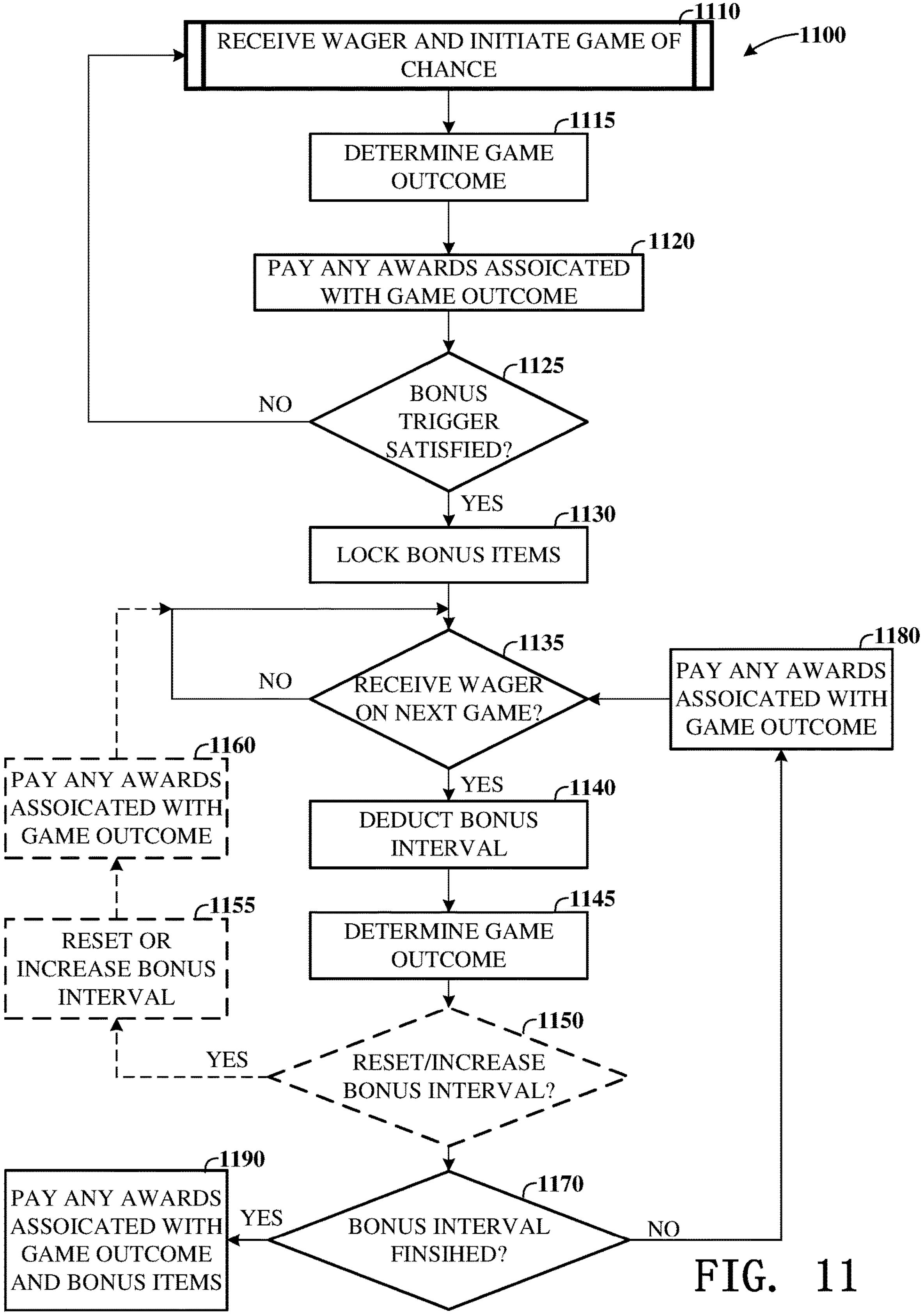
FIG. 11 is a flow diagram showing a method of operating a gaming device according to embodiments of the invention.

FIGS. 7 and 11 are flow diagrams representing methods in which a gaming device and/or gaming system can be operated according to embodiments of the invention. Although various processes are shown in a particular order in these flow diagrams, the order of these processes can be changed in other embodiments without deviating from the scope or spirit of this concept. Hence, the order of the processes shown is for illustrative purposes only and is not meant to be restrictive. Additional game processes may also be included between various processes even though they are not shown in these flow diagrams for clarity purposes. Further each of the processes may be performed by components in a single game device, such as by a game processor, or may be performed in part or whole by a remote server or processor connected to the gaming device via a network. Each process may be encoded in instructions that are stored in a memory, a computer-readable medium, or another type of storage device. Note that these example methods are just some embodiments of how the steps of a game operation can be implemented. As discussed and shown above, many variations exist which may require additional, fewer, or different processes to complete.

Referring to FIG. 7, flow 700 begins at process 710 where a signal is received indicating that a wager has been placed on a gaming event, and the gaming event is initiated. As discussed above, the gaming event may be a poker gaming event, or may be a different type of game of chance. In process 720, the game outcome for the gaming event is determined. In process 730, it is determined if a bonus trigger is satisfied. In some embodiments, this determination includes whether a minimum number of bonus items are received on a game grid based on the outcome of the gaming event. If the bonus event has not been triggered, flow 700 proceeds to process 740 where any awards associated with the game outcome are provided to the player.

If a bonus event was triggered, as determined in process 730, flow 700 proceeds to process 750 where the received bonus items on the bonus grid are locked relative to the card or game symbol position in the game grid with which they are associated. In process 760, a bonus interval is deducted. Here, if a bonus event is a singular event that sums or otherwise uses the values or modifiers associated with the received bonus items, process 760 merely specifies that the bonus event is complete for purposes of presenting bonus items. In other embodiments with multiple chances and receiving additional bonus items or improving upon the items currently received, this bonus interval may specify the number of changes available in the bonus event, the time in which the bonus event is active, the number of additional games played that the bonus event is active, or another metric reflecting opportunities in receiving additional bonus items or improving upon bonus items that have already been received.

In optional process 770, it is determined if something in the bonus event has reset or increased the bonus interval. For example, as discussed above, receiving one or more additional bonus items may cause the bonus interval to reset. If the bonus interval is to be reset or increased as determined in optional process 770, flow 700 proceeds to optional process 775 to reset or increase the bonus interval before returning to process 750 where additional bonus items may randomly be associated with positions or symbols in a game grid and locked into place. If optional process 770 is not utilized or if it is determined in process 770 that the bonus interval is not to be reset or increased, flow 700 proceeds to process 780 where it is determined if the bonus interval is finished. For example, if the number of re-spins shown on a bonus spin meter has reached zero. If the bonus interval has not finished, flow 700 returns to process 750 where additional bonus items may randomly be associated with positions or symbols in a game grid and locked into place. If, on the other hand, the bonus interval is finished as determined in process 780, flow 700 proceeds to process 790 where awards associated with the received bonus items and any evaluation of the game grid are provided to the player.

Figure 8A:
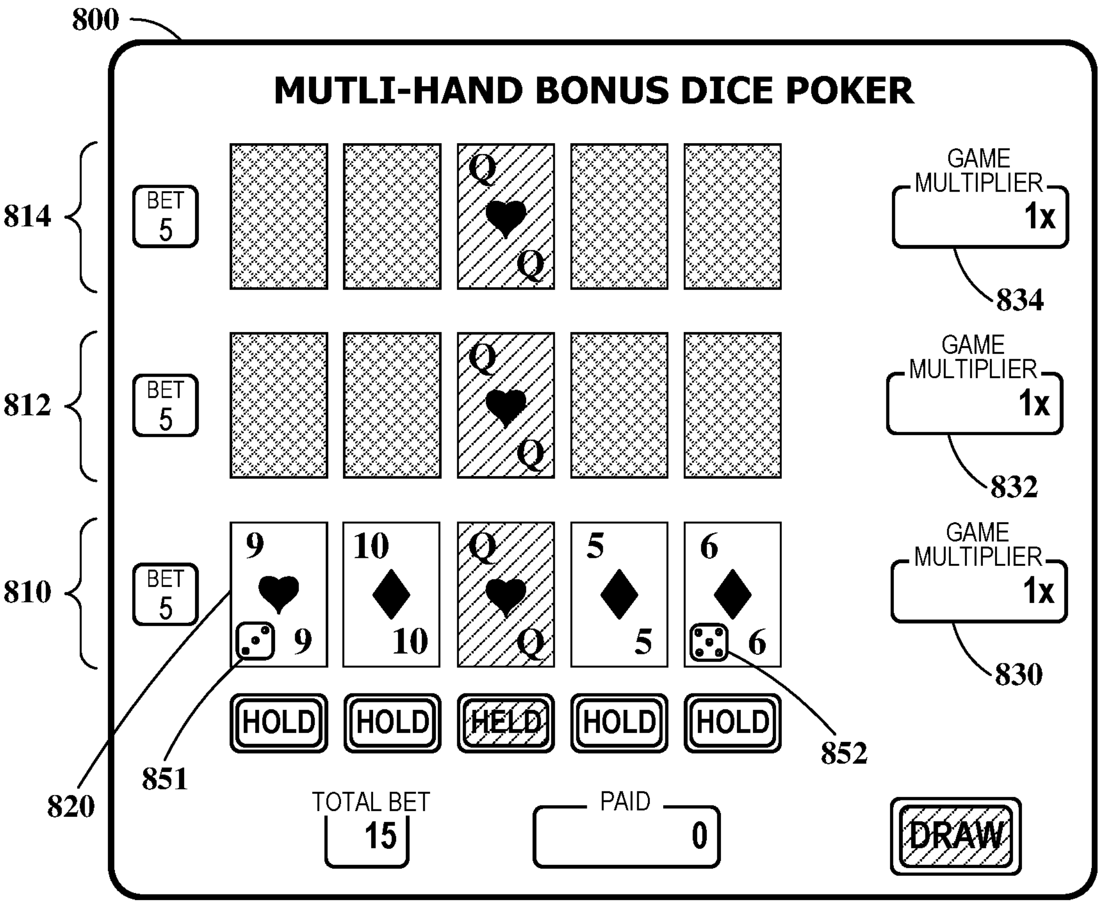
FIGS. 8A and 8B are detail diagrams of a gaming device display showing a game progression according to embodiments of the invention.
Figure 8B:
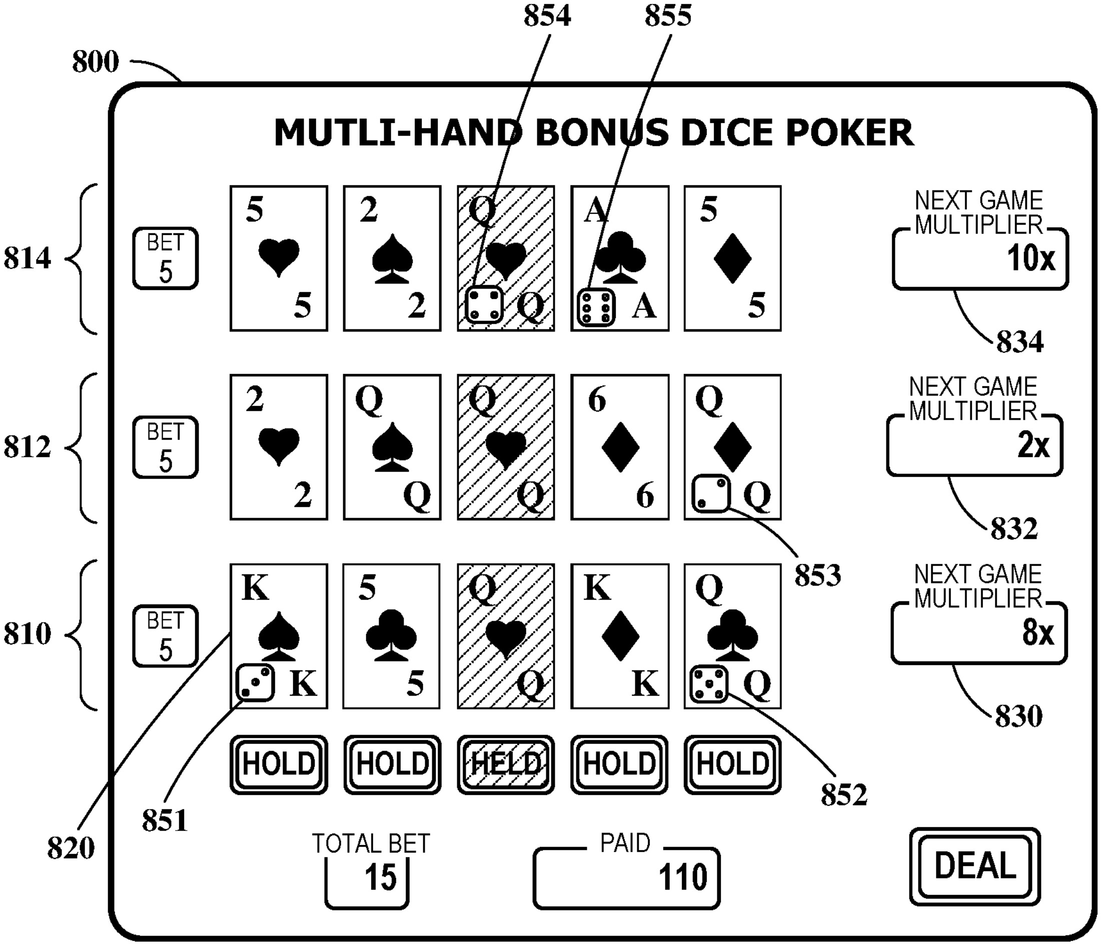

FIGS. 8A and 8B are detail diagrams of a gaming device display showing a game progression according to embodiments of the invention. Referring to FIG. 8A, a gaming display 800 of a gaming device includes a game play area showing a game grid of card positions that allow for presentation of virtual playing cards 820 in three poker hands 810, 812, 814, and a user interface or operations area that includes various meters and buttons. Here, a first multiplier meter 830 is associated with the first poker hand, 810, a second multiplier meter 832 is associated with the second poker hand 812, and a third multiplier meter 834 is associated the third poker hand 814. The multiplier meters 830, 832, 834 in this embodiment show multiplier values that can be won and used on a present poker game and used on the associated poker hand 810, 812, 814 in one or more subsequent poker games if a bonus condition is satisfied, which in this case is receiving four or more bonus dice items. In other poker games, or other types of games of chance, the game play area and/or the player interface area may be different.

In this embodiment, dice sub-symbols 851, 852 are received and can trigger a bonus event where they provide multipliers for a current and/or for one or more subsequent poker gaming events. The player may lock and improve the number of sub-symbols present during a draw phase of the poker game, or during a secondary bonus feature if a bonus trigger is satisfied.

Referring to FIG. 8B, the replacement cards after the draw are shown for the first poker hand 810, second poker hand 812, and third poker hand 814. Here, more than four bonus dice items 851, 852, 853, 854, 855 have been received, so the player is awarded a multiplier that is used to multiply any wins in the current gaming event and can be used in a subsequent gaming event. Here, the combined number of pips displayed on bonus dice sub-symbols received for a particular poker hand will result in multiplier that can be used for that current hand and in a subsequent poker gaming event for that poker hand. Hence, as shown in FIG. 8B, the first multiplier meter 830 shows that the next game multiplier for the first poker hand 810 will be an “8×” since the player has received a first bonus dice 851 showing a side with 3 pips and a second bonus dice 852 showing a side with 5 pips. Similarly, the second multiplier meter shows a “2×” associated with the bonus dice item 853 received in the second poker hand 812, and the third multiplier meter shows a “10×” associated with the bonus dice items 854, 855 received in the third poker hand 814.

Since the bonus event was triggered here by receiving four or more bonus dice items 851-855, the player receives the bonus multipliers for the current hands as well as for the next hands as indicated in the multiplier meters 830, 832, 834. In other embodiments, the bonus dice items 851-855 may be locked and can be improved upon by the receipt of additional bonus dice items in subsequent poker games. In some embodiments, the multipliers shown on the multiplier meter may be accumulated over multiplier poker games when triggered and then used only on the next poker game after the bonus event has ended. In other embodiments, the multiplier values may be used on each poker hand in poker gaming events until the bonus event ends.

Figure 9A:
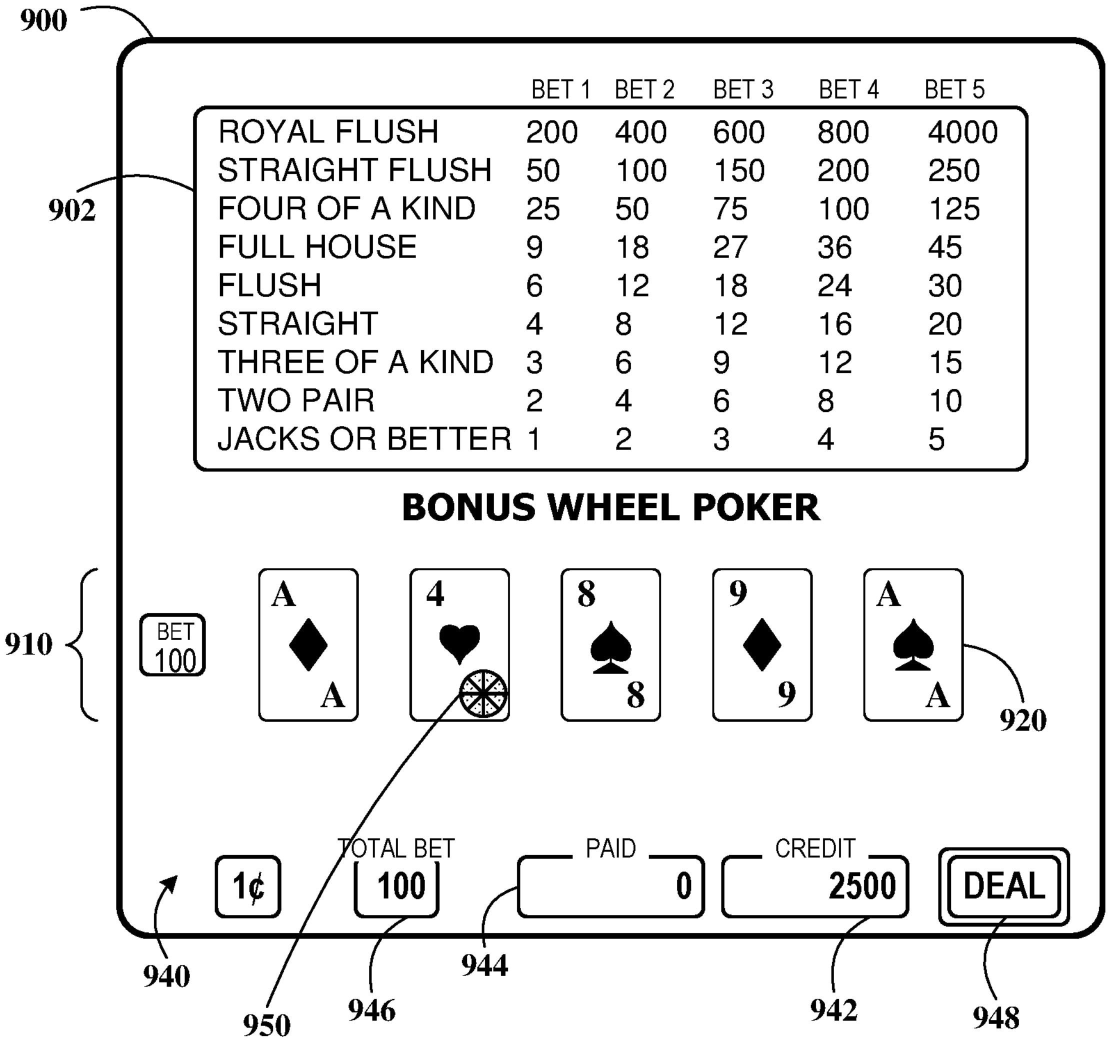
FIGS. 9A, 9B, 9C, 9D, 9E, and 9F are detail diagrams of a gaming device display showing a game progression according to embodiments of the invention.

FIGS. 9A, 9B, 9C, 9D, 9E, and 9F are detail diagrams of a gaming device display showing a game progression according to embodiments of the invention. Referring to FIG. 9A, a gaming display 900 of a gaming device includes a game play area showing a game grid of card positions that allow for presentation of virtual playing cards 920 in poker hands 910, a game paytable 902, and a user interface or operations area 940. The user interface area 940 may include various meters and buttons, such as a “Credit” meter 942, a “Paid” indicator 944, a “Total Bet” meter or indicator 946, multiple “Hold” buttons 930 associated with the card positions of the poker hand 910, and a “Deal” or “Draw” button 948. In other poker games, or other types of games of chance, the game play area and/or the player interface area 940 may be different. Here, a wheel sub-symbol 950 can appear on one or more cards 920 where a wheel with credit values, multipliers, or a bonus trigger appear on sections of the wheel. If the bonus trigger is received on the wheel, a secondary bonus feature using a lock and improve (or hold and respin) may be used to try and win progressive jackpot awards. As shown in FIG. 9A, a wheel sub-symbol 950 is received during a poker gaming event.

Figure 9B:
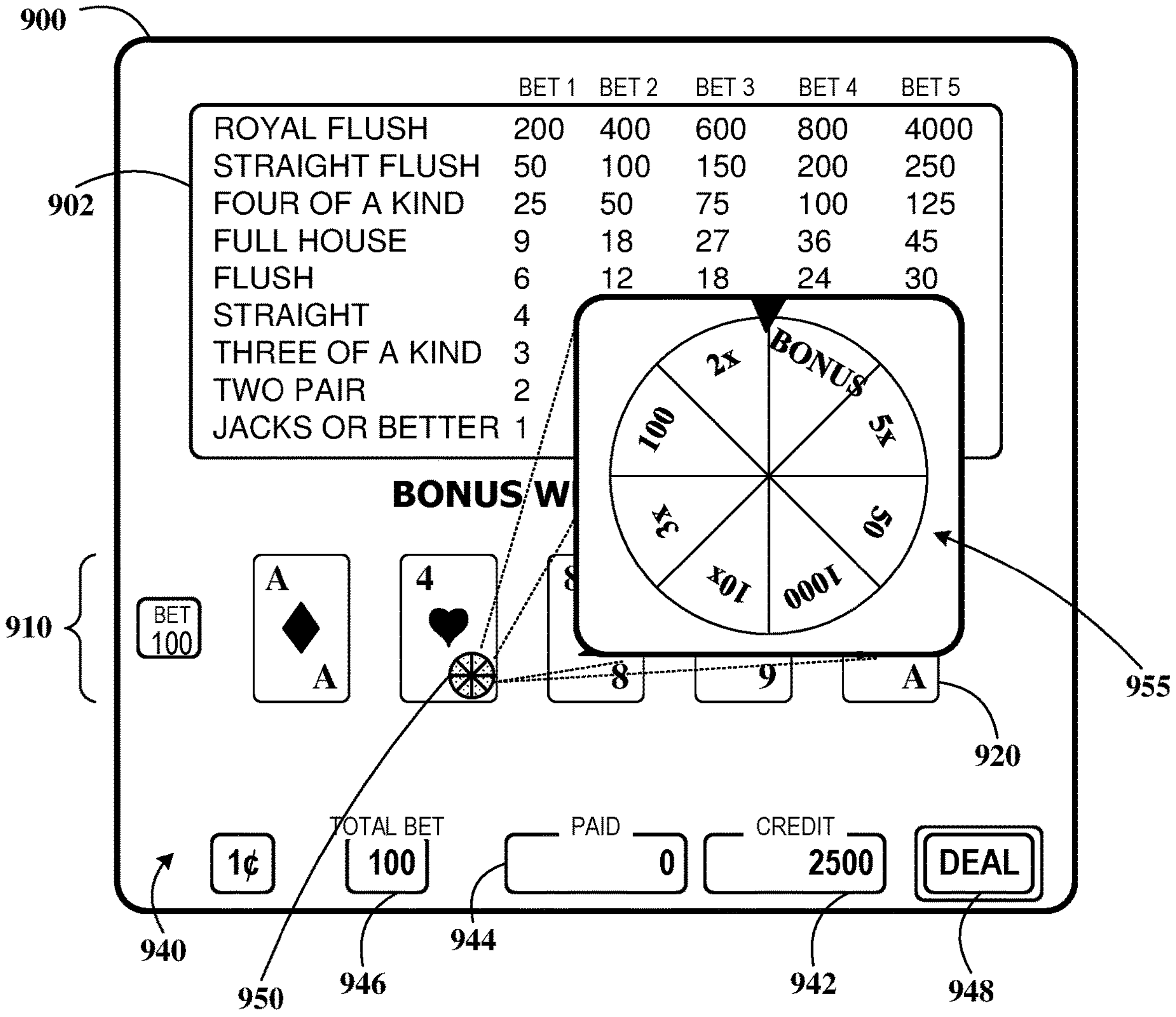
Figure 9C:
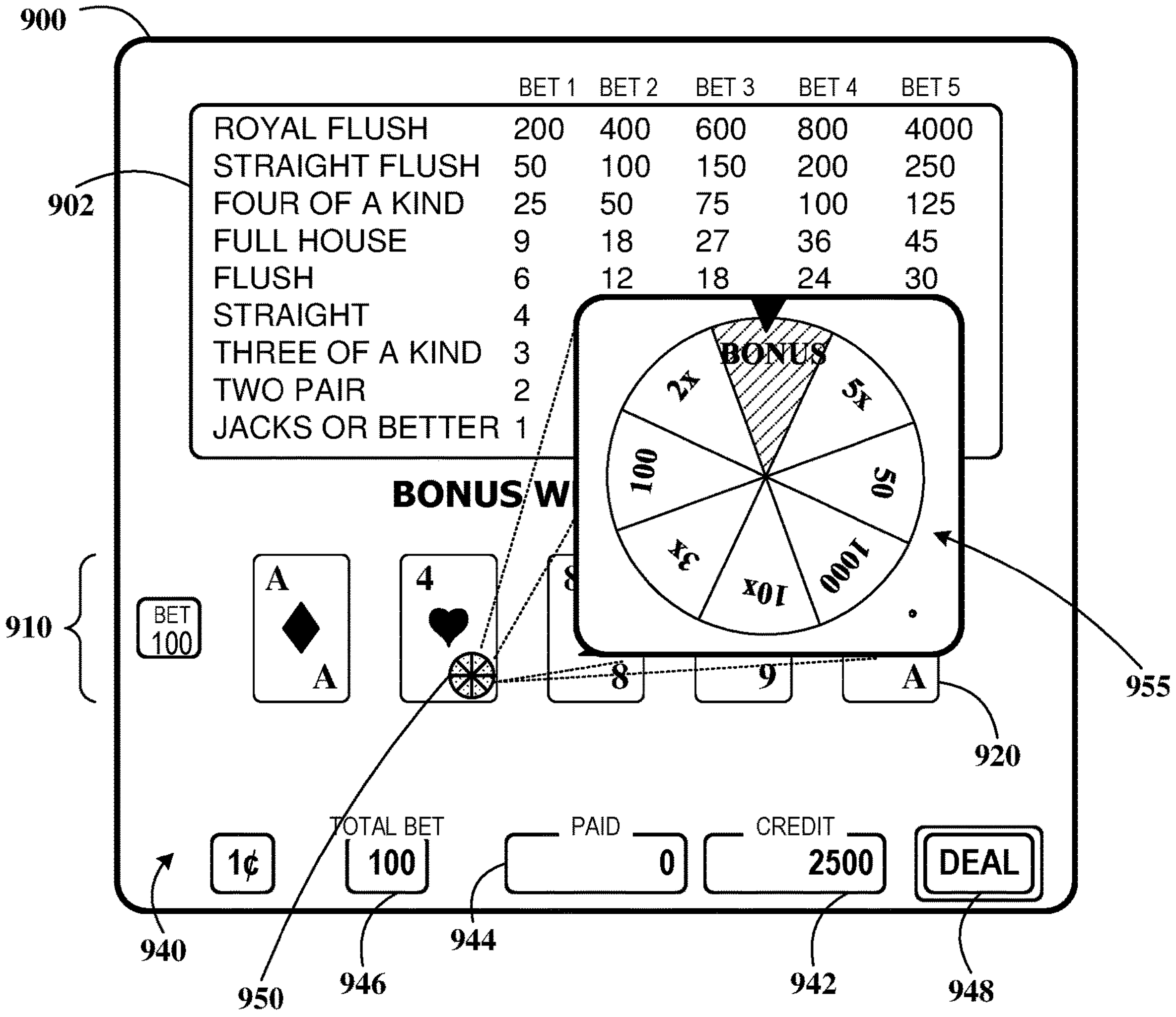
Figure 9D:
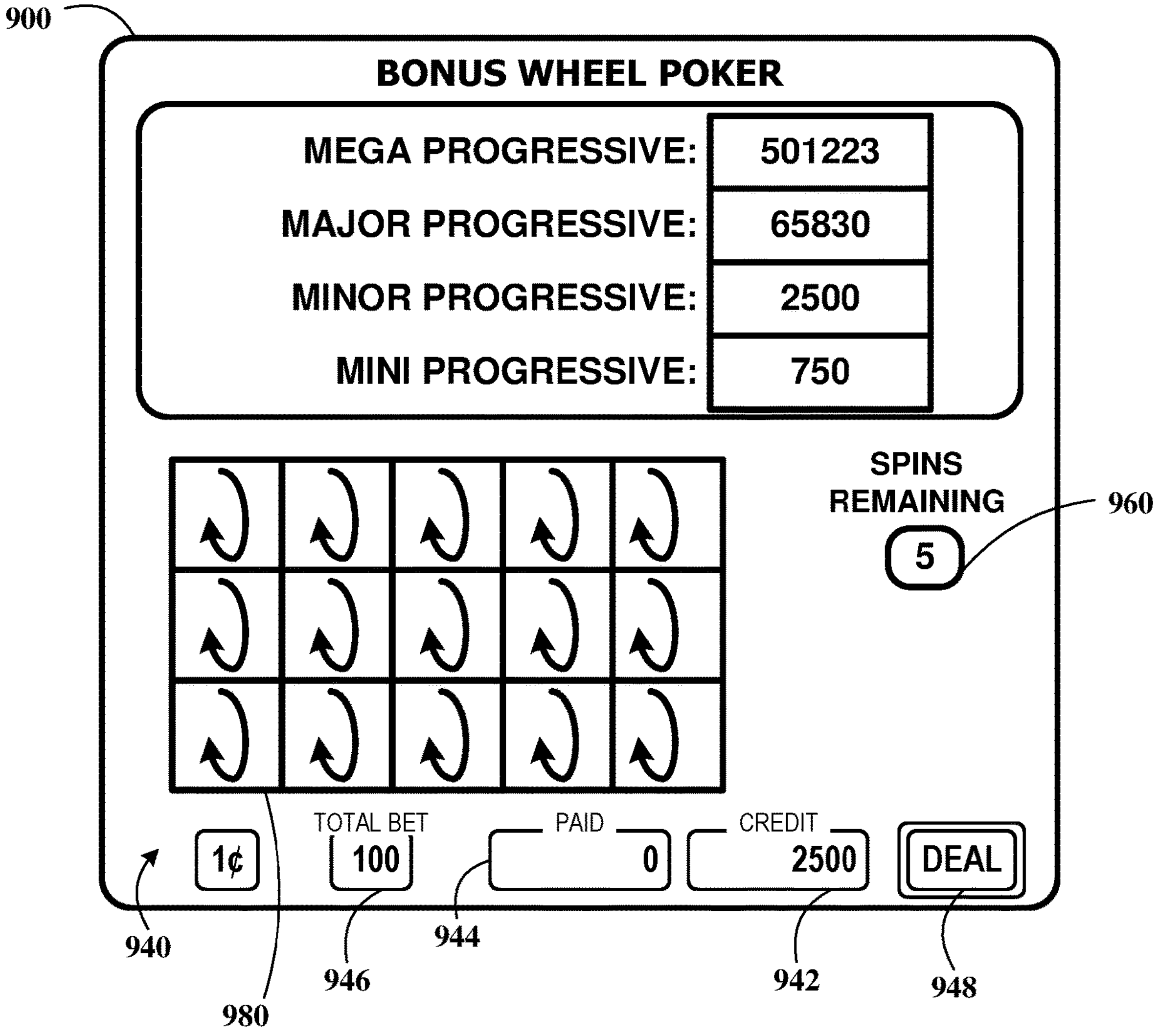
Figure 9E:
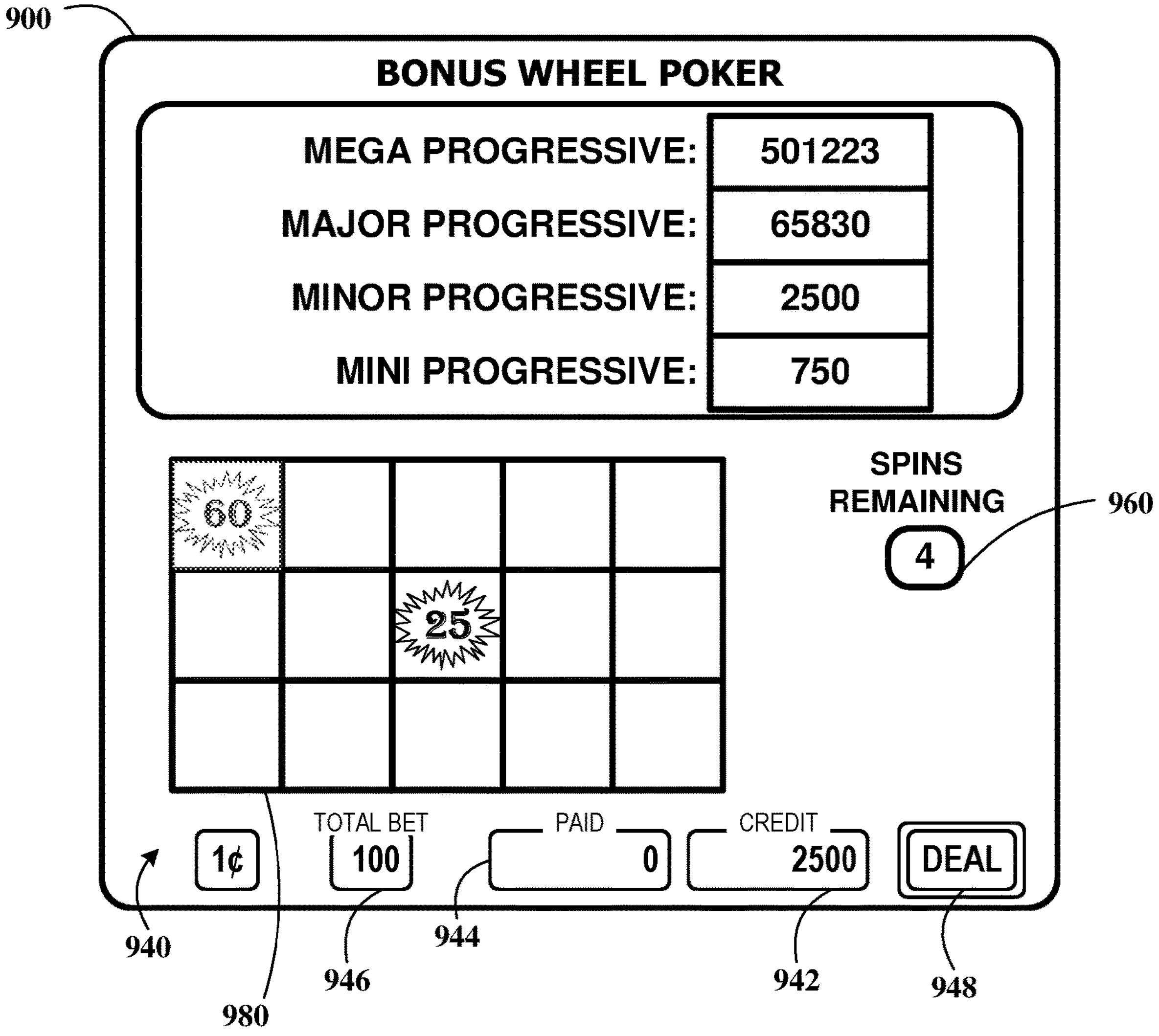
Figure 9F:
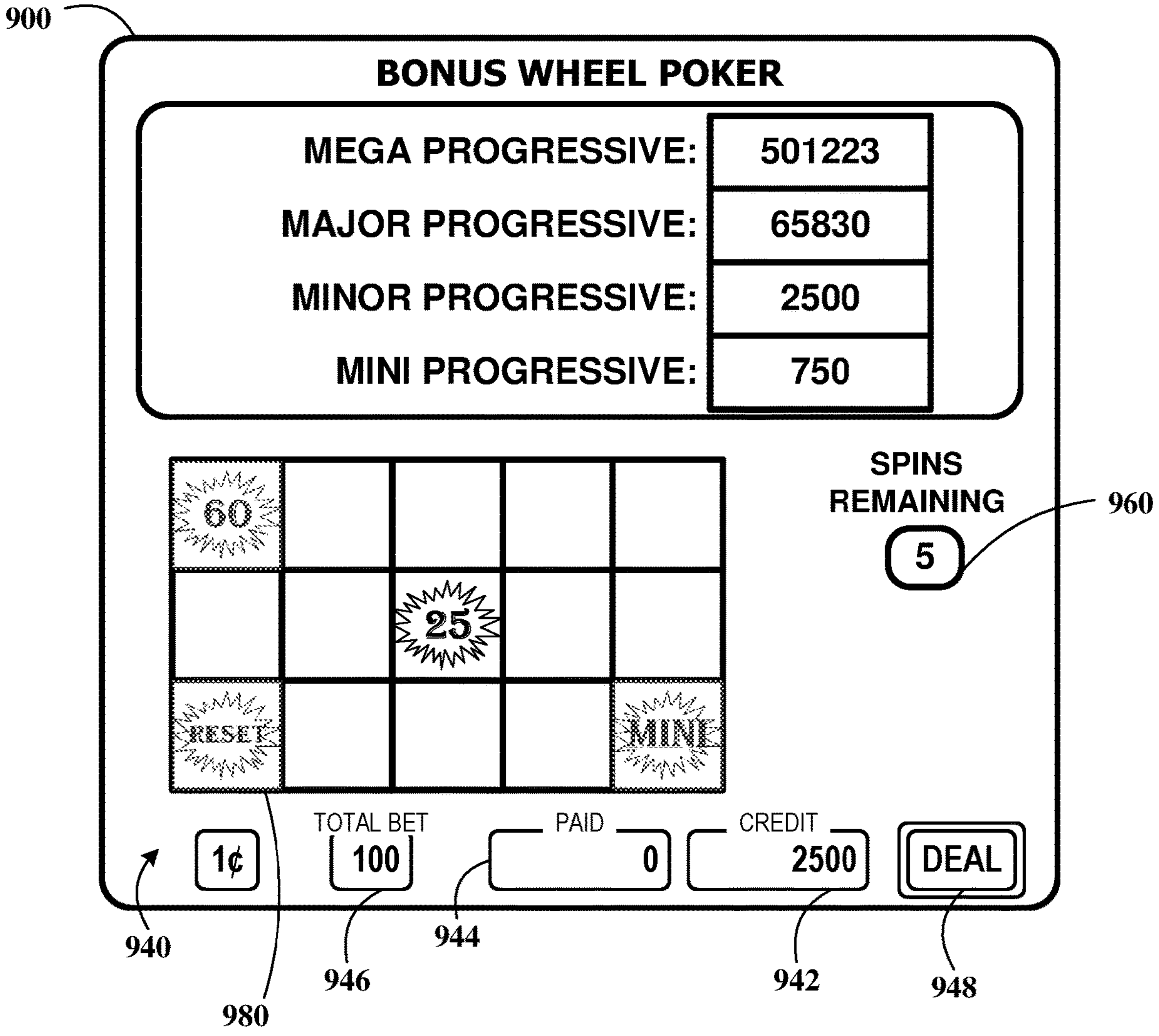

Referring to FIG. 9B, a bonus wheel 955 is displayed as a result of the receiving the wheel sub-symbol 950 in the poker gaming event. Referring to FIG. 9C, the bonus wheel 955 is spun where a player can win bonus credits, a bonus multiplier that can multiply any awards from the evaluated poker hand 910 in the current game (or in a subsequent poker gaming event), or a bonus slice that triggers a lock and re-spin bonus. Here, the bonus wheel 955 lands on the bonus slice. Thus, as shown in FIG. 9D, a lock and spin bonus is shown on the game display 900, that includes a bonus grid 980 and a bonus spin meter 960 showing the number of remaining spins a player has. Referring to FIG. 9E, on the first bonus spin the player receives two credit value items that are then locked on the bonus grid. In addition, the bonus spin meter 960 is decremented. Referring to FIG. 9F, on the second bonus spin, the player receives two other bonus items including a “Mini Progressive” item and a “Reset” item, which resets the bonus spin meter 960 back to five remaining bonus games. Although this embodiment shows a wheel sub-symbol icon 950 triggering a bonus wheel 955 where the lock and re-spin bonus could be won, other embodiments may use other mechanisms to award the second screen lock and re-spin bonus in a poker or other game of chance.

FIGS. 10A, 10B, 10C, 10D, 10E, 10F, 10G, 10H, and 10I are detail diagrams of a gaming device display showing a game progression according to embodiments of the invention. FIGS. 10A-10I illustrate an example embodiment that is similar to the example embodiment illustrated in FIGS. 6A-6K except that the poker game shown in FIGS. 10A-10I holds the bonus items in card positions while the player continues to play and wager on poker base games during the bonus period. The bonus period here, is the period where the player can accumulate additional bonus items. At the end of the bonus period, the player is awarded all of the accumulated bonus items. Here, six or more bonus items need to be received in the 15 card positions to trigger the bonus event. In other embodiments, more or less poker hands (such as five hands, ten hands, 50 hands, 100 hands, etc.) could be played and/or more or less bonus items may need to be received to trigger the lock and improve bonus feature.

Figure 10A:
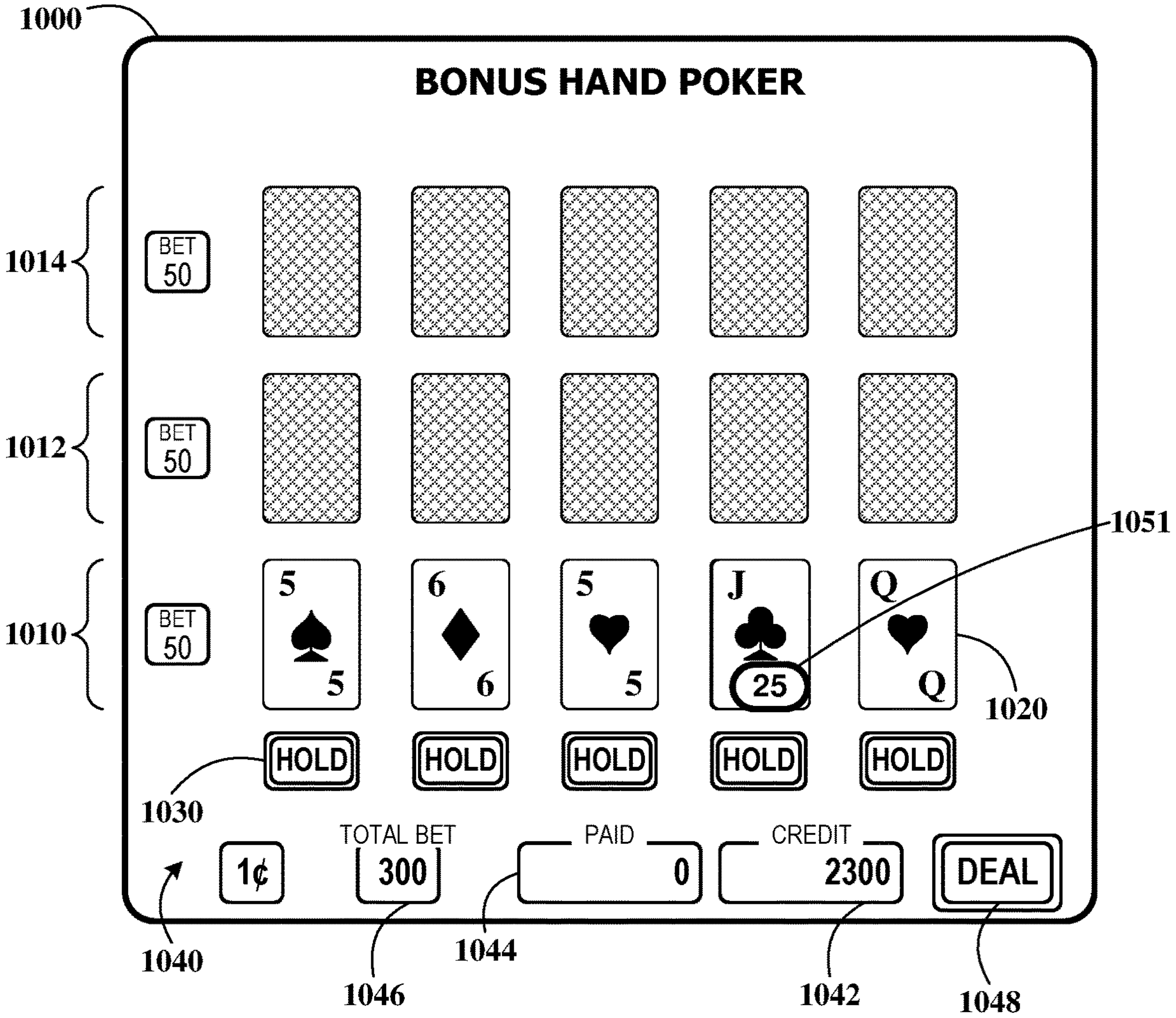
FIGS. 10A, 10B, 10C, 10D, 10E, 10F, 10G, 10H, and 10I are detail diagrams of a gaming device display showing a game progression according to embodiments of the invention.

Referring to FIG. 10A, a gaming display 1000 of a gaming device includes a game play area showing a game grid of card positions that allow for presentation of virtual playing cards 1020 in three poker hands 1010, 1012, 1014, and a user interface or operations area 1040. The user interface area 1040 may include various meters and buttons, such as a "Credit" meter 1042, a "Paid" indicator 1044, a "Total Bet" meter or indicator 1046, multiple "Hold" buttons 1030 associated with the card positions of the poker hands 1010, 1012, 1014, and a "Deal" or "Draw" button 1048. In other poker games, or other types of games of chance, the game play area and/or the player interface area 1040 may be different. In this embodiment, the first poker hand 1010 is the hand where the initial cards 1020 are dealt. Thereafter, these initially dealt cards 1020 can be held where the held cards are replicated in the second poker hand 1012 and third poker hand 1014, and then replacement cards and drawn for each non-held card in the first poker hand 1010 and for the remaining card positions in the second poker hand 1012 and third poker hand 1014. As shown in FIG. 10A, the player has received a bonus item 1051 in the first poker hand 1010 based on the deal.

Figure 10B:
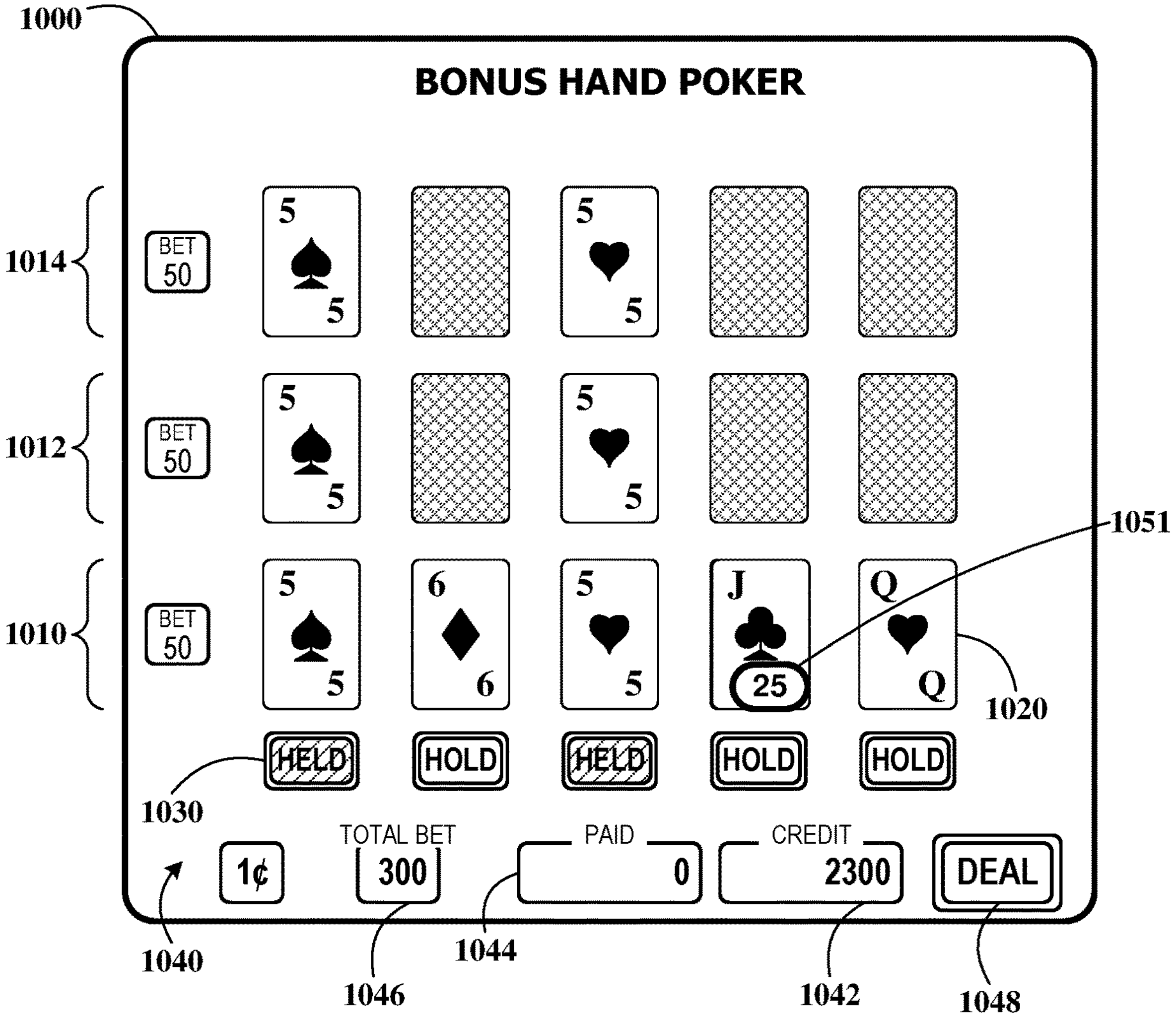

Referring to FIG. 10B, the player has held the 5 of Spades in the first card position and the 5 of Hearts in the third card position of the first poker hand 1010, and has activated the Draw button 1048. Here, the cards held in the first poker hand 1010 were replicated in the associated card positions in the second poker hand 1012 and third poker hand 1014. When the draw button 1048 is activated, it is determined whether any of the held cards that was not associated with a bonus item 1051 are now associated with a bonus item. This is the case so that the player strategy in holding cards 1020 is not affected by which cards or card positions are associate with bonus items 1051. In other embodiments, additional bonus items may be revealed in the second or third poker hand 1012, 1014 prior to holding cards in the first hand 1010, or after the cards in the first hand have been held, but before the Draw button 1048 has been activated.

Figure 10C:
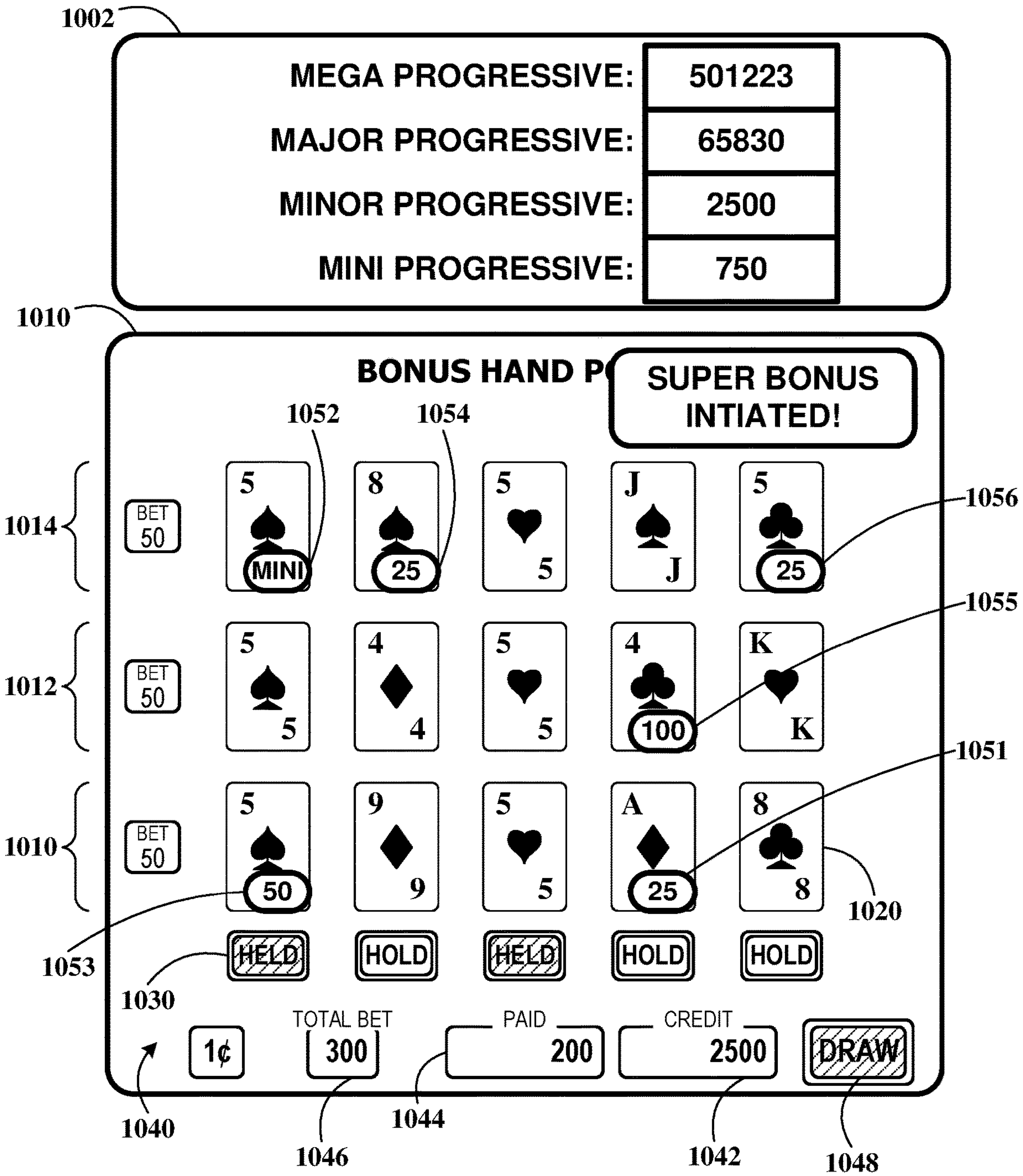

Referring to FIG. 10C, replacement cards have been provided to the non-held positions in the first poker hand 1010, the second poker hand 1012, and the third poker hand 1014. Note that the bonus item 1051 that was received on the deal was maintained with the card position after the draw even though the card 1020 associated with that card position was not held. Note also, that even though the 5 of Spades in the first poker hand 1010 has held and was not initially associated with a bonus item, it is now associated with a bonus item 1053 after the draw. In addition, four other bonus items 1052, 1054, 1055, 1056 are received in the second or third poker hands 1012, 1014. As the total number of bonus items has reached the predetermined number of six, a bonus event has been triggered. As one of the bonus items 1052 specifies a Mini Progressive award, a progressive display 1002 is also shown. This progressive display 1002 may be shown even when the bonus event is not active or triggered.

Figure 10D:
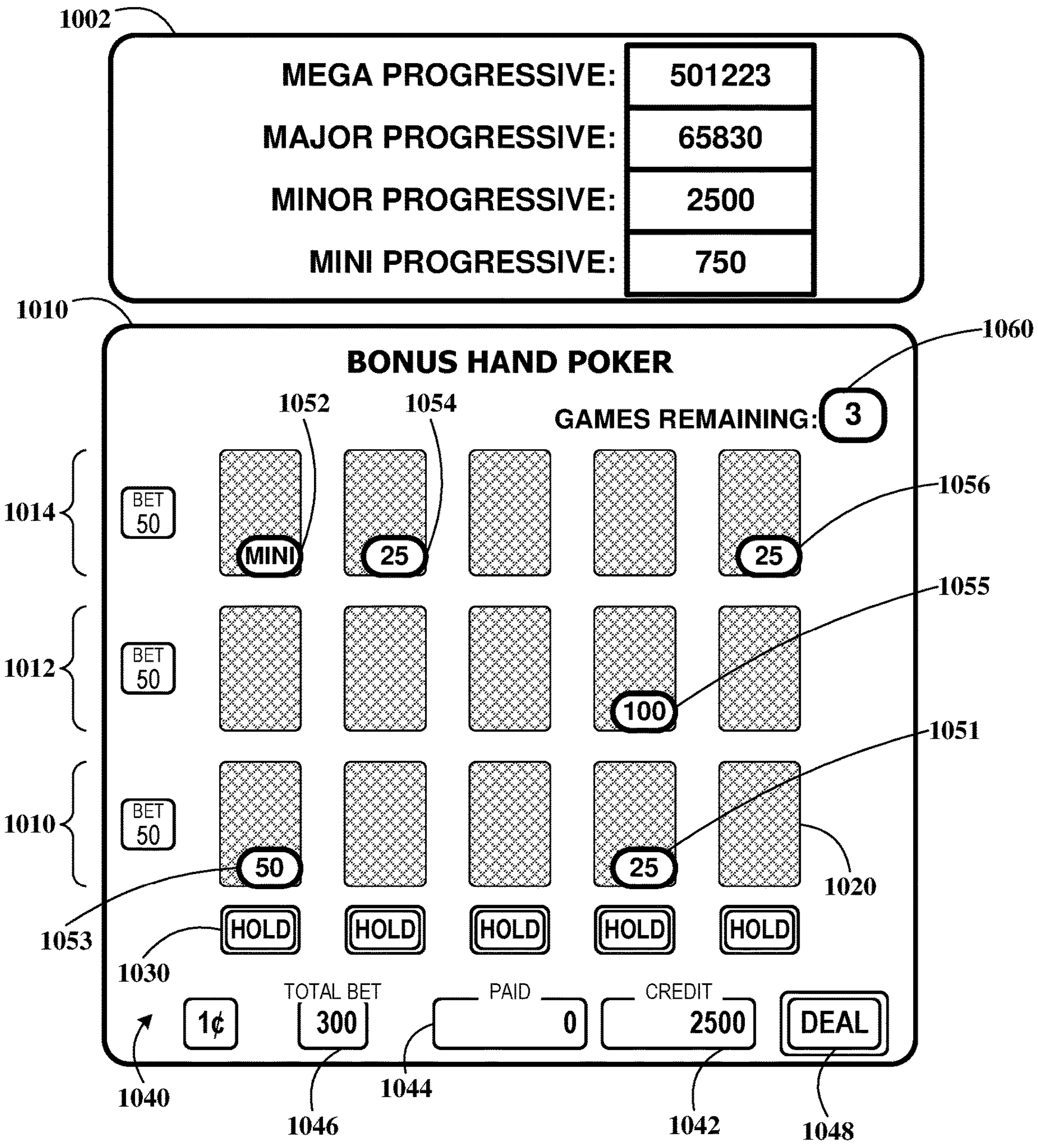

Referring to FIG. 10D, a bonus spin meter 1060 is displayed to show the number of remaining bonus spins a player has in the bonus period to receive additional bonus items 1051-1056. In this embodiment, the player receives three bonus spins to received additional bonus items 1051-1056, but the player may get additional opportunities to win bonus items as the number of spins resets to three if a player receives one or more additional bonus items during a game event in the bonus period. As shown in FIG. 10D, the player has placed another wager on a second poker gaming event, but since the bonus period was triggered as previously discussed, the bonus items 1051-1056 are locked in their respective card positions during the second poker gaming event.

Figure 10E:
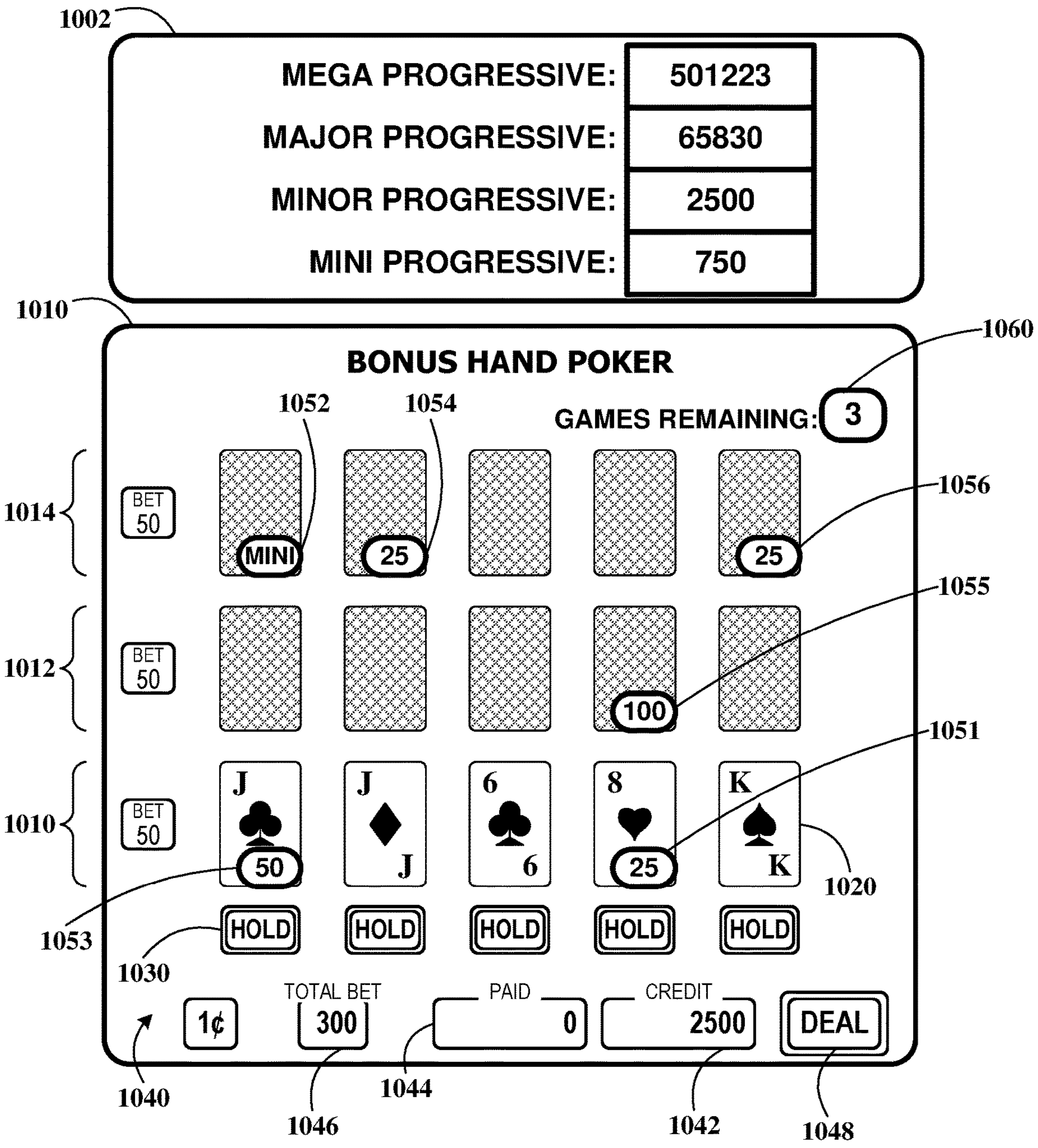
Figure 10F:
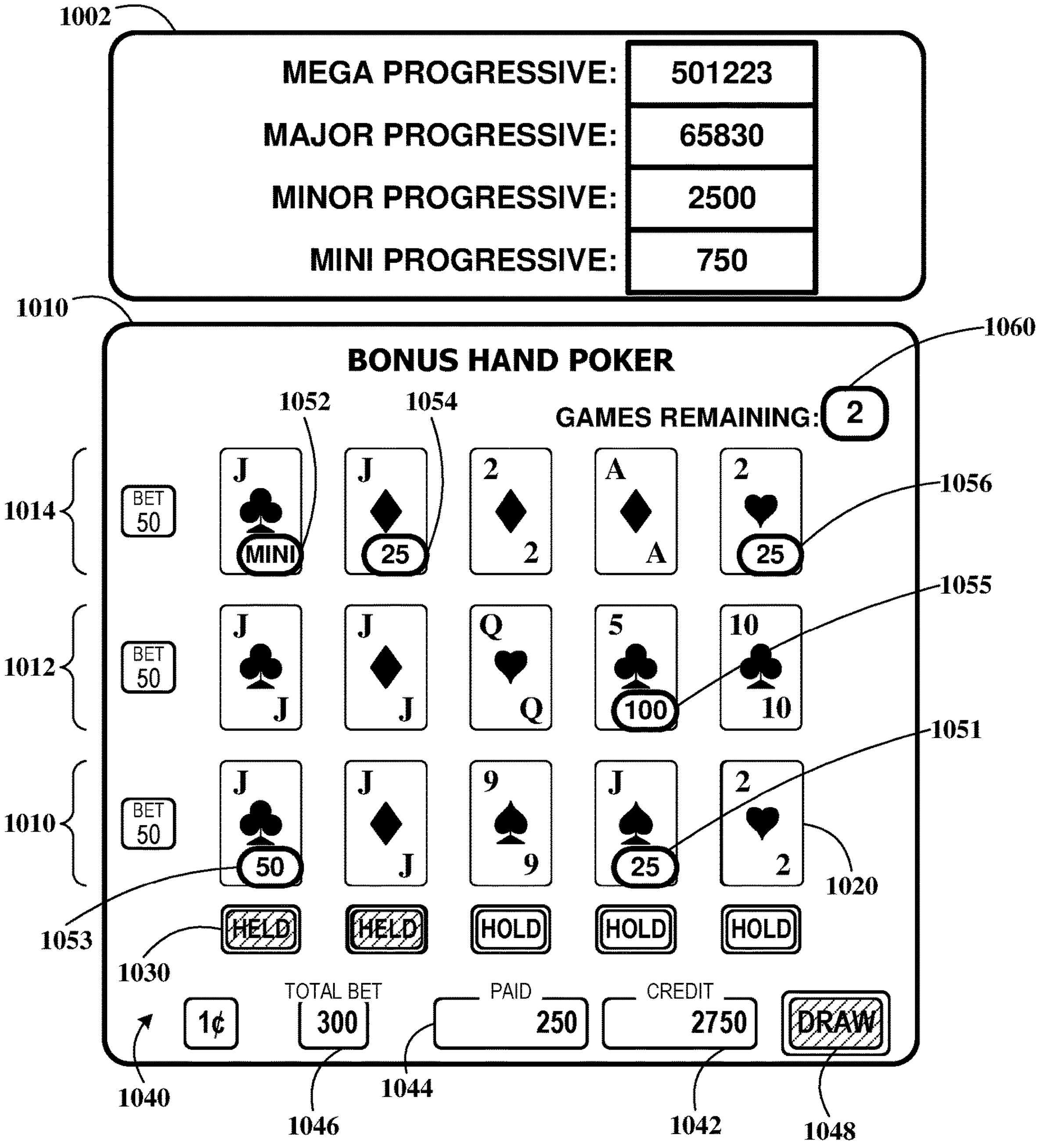

Referring to FIG. 10E, cards 1020 are dealt to the first poker hand 1010 in the second poker gaming event. Referring to FIG. 10F, cards have been held and replacement cards have been drawn to the complete the final poker hands for the first poker hand 1010, second poker hand 1012, and third poker hand 1014. However, as no additional bonus items 1051-1056 were received in the second poker gaming event, the number of remaining spins in the bonus spin meter 1060 is decremented.

Figure 10G:
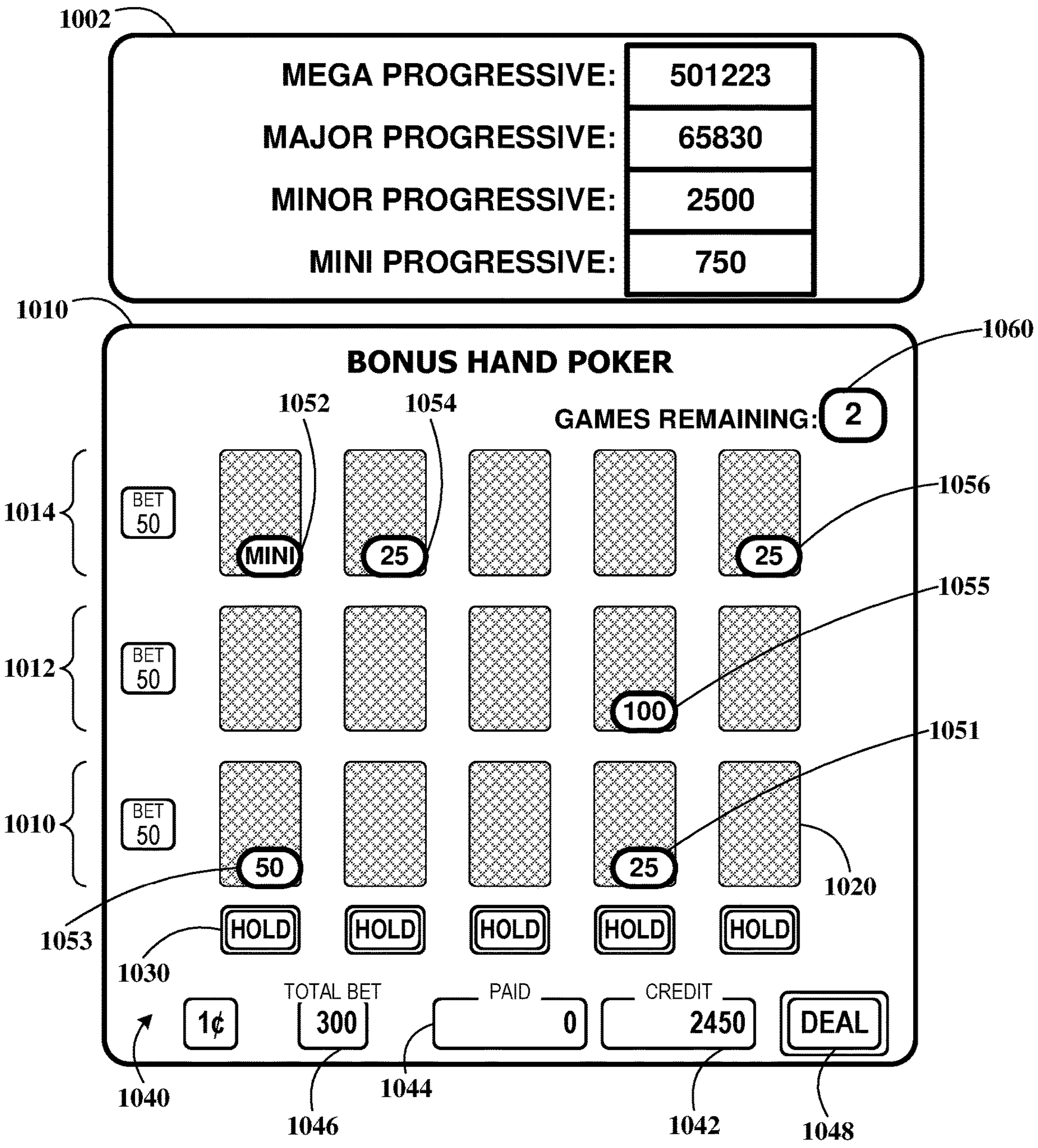
Figure 10H:
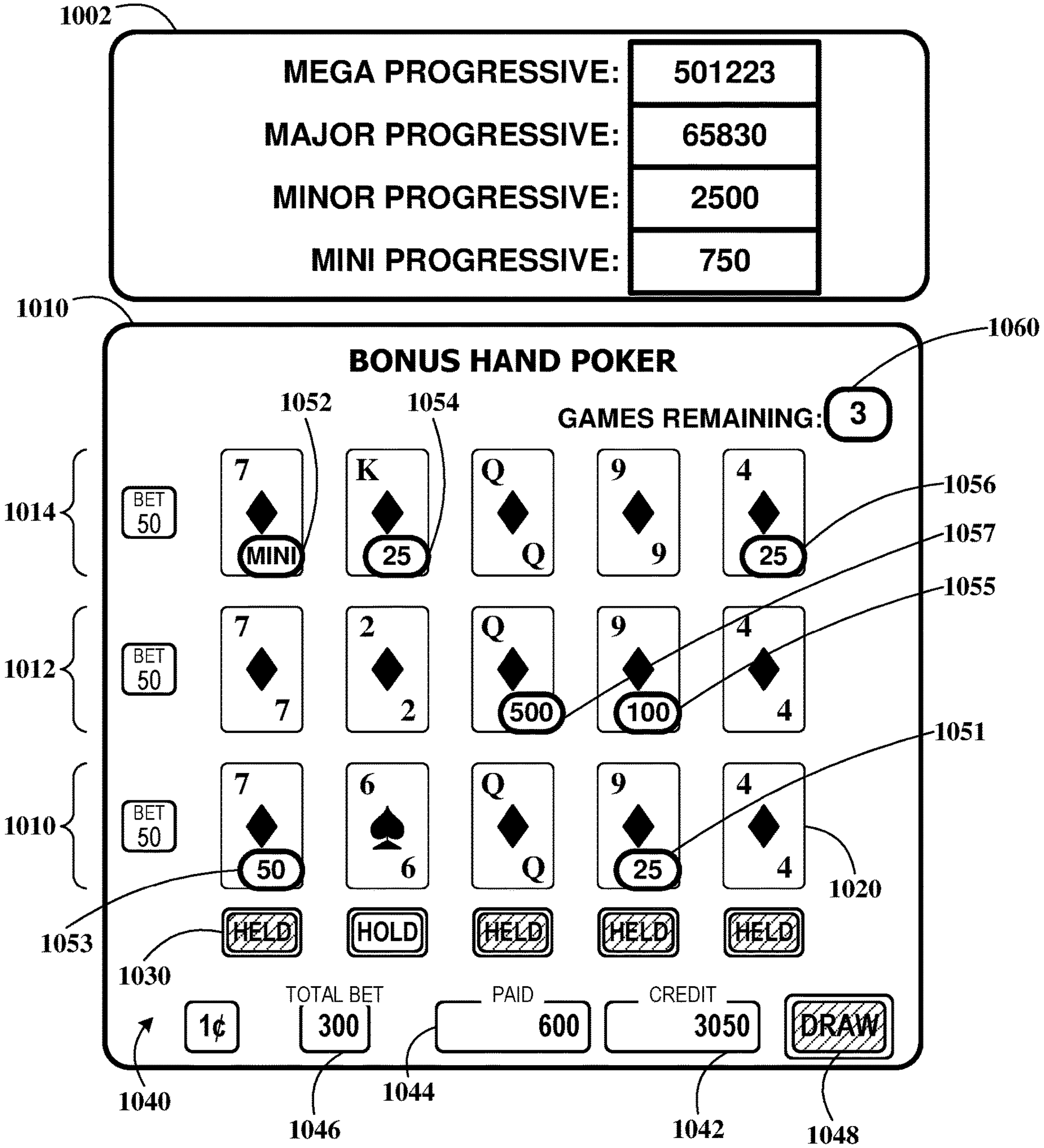

Referring to FIG. 10G, the player has placed another wager on a third poker gaming event, but since the bonus period has not yet ended, the bonus items 1051-1056 are locked in their respective card positions during the third poker gaming event. Referring to FIG. 10H, the result of the third poker gaming event is shown on the game display 1010 and a seventh bonus item 1057 was received. Receiving this new bonus item extends the bonus period by resetting the number of remaining games in the bonus period to three on the bonus spin meter 1060.

Figure 10I:
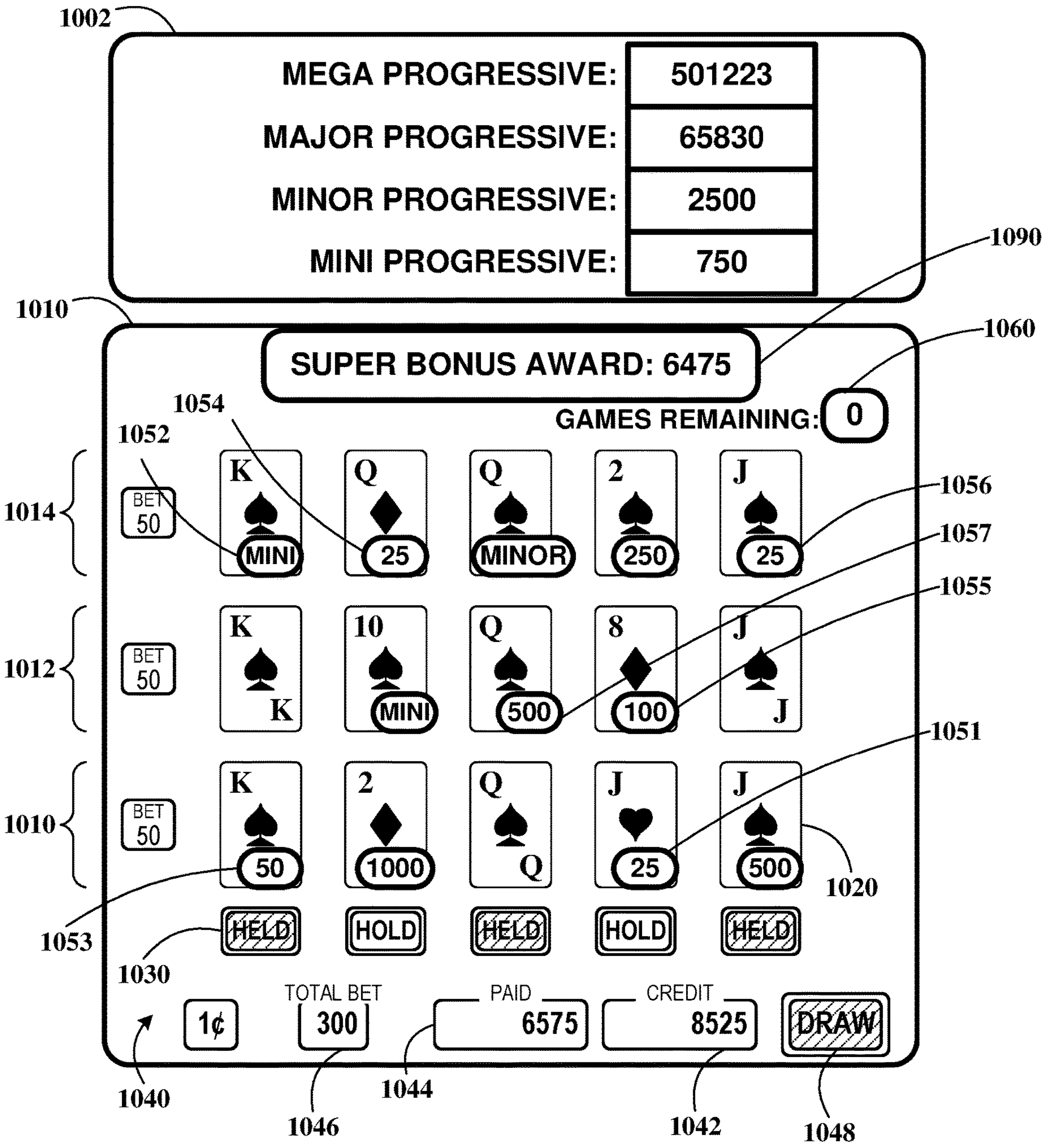

Referring to FIG. 10I, a number of additional poker gaming events have been played during which the player received a number of additional bonus items. However, as the number of remaining games on the bonus spin meter 1060 is now at zero, the bonus period is over and the player in provided all of the awards on the bonus items that were received during the bonus period. In this case, the player wins a large number of credits as shown on the Paid meter 1044. Since the bonus period is now over, the locked bonus items will be removed when the next poker gaming event is initiated.

FIG. 11 is a flow diagram showing a method of operating a gaming device according to embodiments of the invention. Referring to FIG. 11, flow 1100 begins at process 1110 where a signal is received indicating that a wager has been placed on a first gaming event, and the first gaming event is initiated. As discussed above, the first gaming event may be a poker gaming event, or may be a different type of game of chance. In process 1115, the game outcome for the first gaming event is determined. In process 1120, the outcome of the first gaming event is evaluated, and any awards associated with the first gaming event are provided to the player. In process 1125 it is determined if a bonus trigger is satisfied. In some embodiments, this determination includes whether a minimum number of bonus items are received on a game grid based on the outcome of the first gaming event. If the bonus event has not been triggered, flow 1100 returns to process 1110 to await placement of another wager on a different gaming event.

If a bonus event was triggered, as determined in process 1125, flow 1100 proceeds to process 1130 where the received bonus items on the bonus grid are locked relative to the card or game symbol position in the game grid with which they are associated. This begins the bonus period. In process 1135, it is determined if a wager has been received to initiate the next gaming event. Once the next gaming event has been triggered (in this case the second gaming event), flow 1100 proceeds to process 1140 to deduct or reduce the bonus interval (shown on a bonus spin meter or the like) remaining in the bonus period. In process 1145, the game outcome for the next gaming event is determined.

In optional process 1150, it is determined if something in the bonus event has reset or increased the bonus interval. For example, as discussed above, receiving one or more additional bonus items may cause the bonus interval to reset. If the bonus interval is to be reset or increased as determined in optional process 1150, flow 1100 proceeds to optional process 1155 to reset or increase the bonus interval. Any awards are then paid for the current gaming event in optional process 1160 before returning to process 1135 to wait for additional gaming events to be wagered on and initiated.

If optional process 11500 is not utilized or if it is determined in process 1150 that the bonus interval is not to be reset or increased, flow 1100 proceeds to process 1170 where it is determined if the bonus interval is finished. For example, if the number of remaining games in the bonus period shown on a bonus spin meter has reached zero. If the bonus interval has not finished, flow 1100 proceeds to process 1180 where any awards associated with the current game outcome are provided before returning to process 1135 to wait for additional gaming events to be wagered on and initiated. If, on the other hand, the bonus interval is finished as determined in process 1170, flow 1100 proceeds to process 1190 where awards associated with the received bonus items and any evaluation of the current gaming event are provided to the player.

Figure 12:
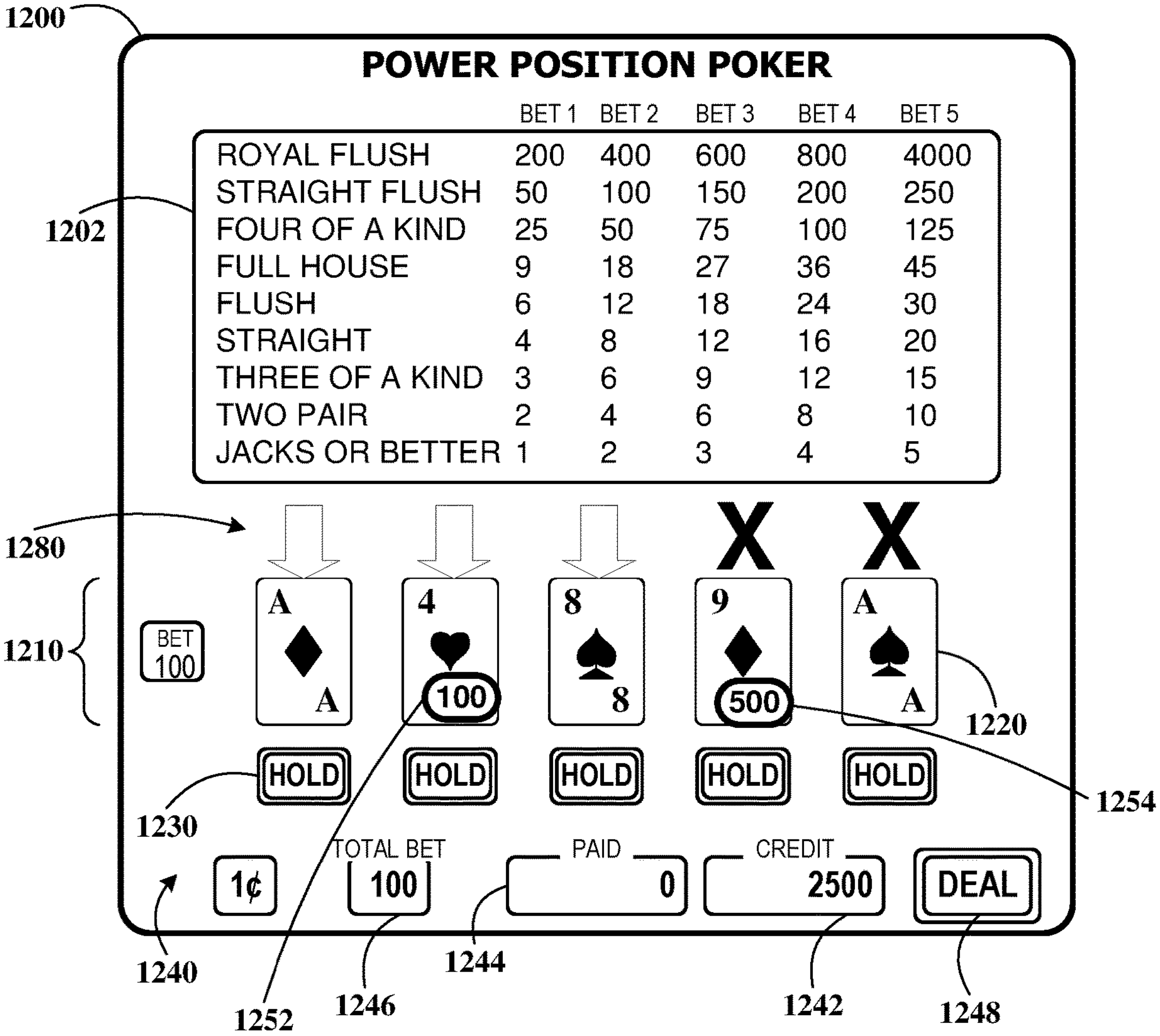
FIG. 12 is a detail diagram of a gaming device display according to embodiments of the invention.

FIG. 12 is a detail diagram of a gaming device display according to embodiments of the invention. Referring to FIG. 12, a gaming display 1200 of a gaming device includes a game play area showing a game grid of card positions that allow for presentation of virtual playing cards 1220 in poker hands 1210, a game paytable 1202, and a user interface or operations area 1240. The user interface area 1240 may include various meters and buttons, such as a "Credit" meter 1242, a "Paid" indicator 1244, a "Total Bet" meter or indicator 1246, multiple "Hold" buttons 1230 associated with the card positions of the poker hand 1210, and a "Deal" or "Draw" button 1248. In other poker games, or other types of games of chance, the game play area and/or the player interface area 1240 may be different. In this embodiment, sub-symbol items 1252, 1254 can be associated with the playing cards 1220 or the card positions in the game grid, where the cards are displayed in a poker hand 1210. In this embodiment, however, the player has to place a side wager or bonus bet to activate each of the card positions and be eligible to receive awards associated with bonus items that are received in those particular card locations. As shown in FIG. 12, the player has placed an additional side wager to activate the first card position, the second card position, and the third card positions as indicated by the activation indicators 1280, but has not placed a sufficient side wager to activate the fourth or fifth card position. Thus, when the player receives the sub-symbol item 1252 in the second card position, the player is awarded 100 bonus credits since the second card position is activated. The other sub-symbol item 1254 received on the fourth card 1220, however, is not awarded to the player since the fourth card position has not been activated.

Figure 13:
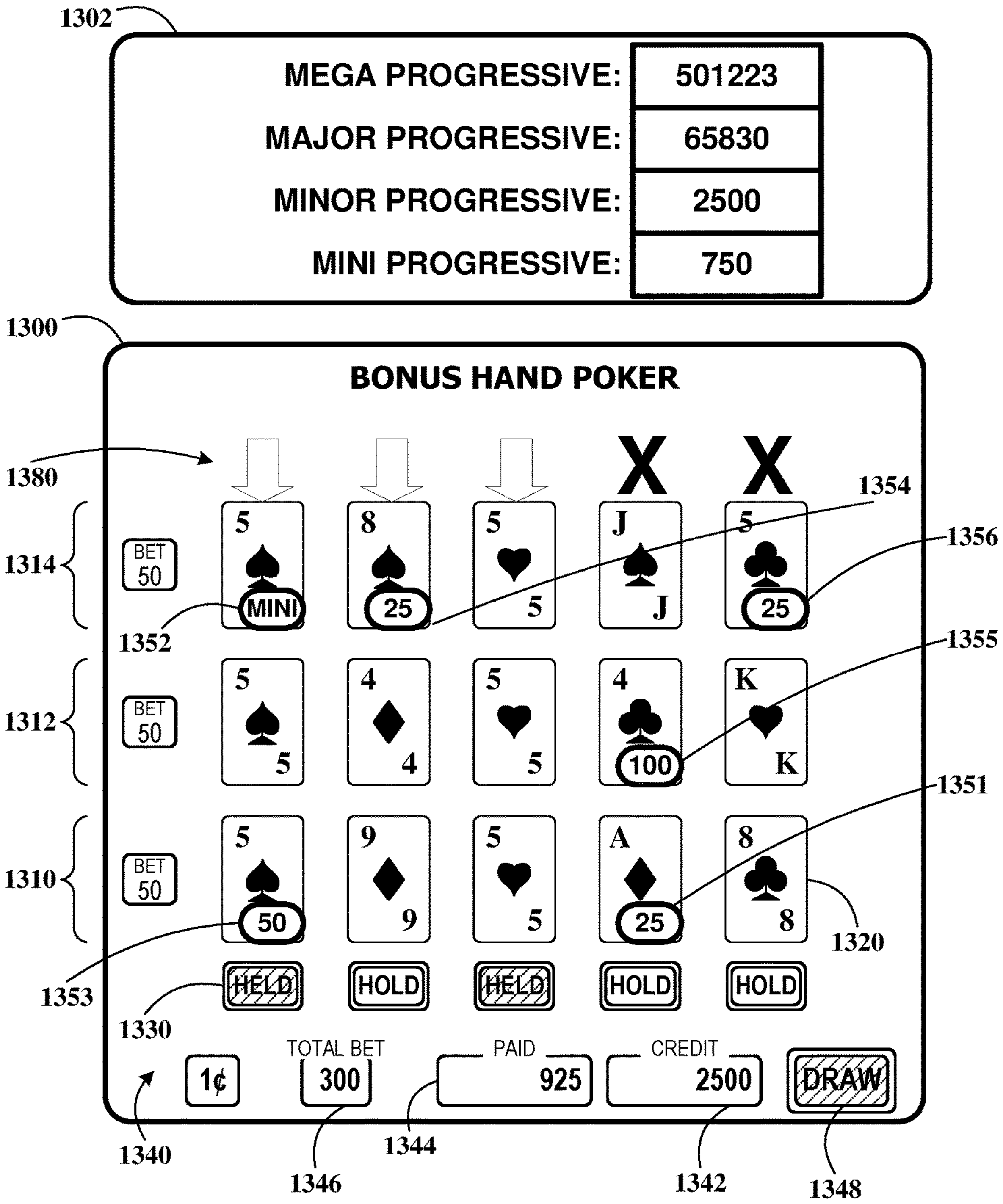
FIG. 13 is a detail diagram of a gaming device display according to embodiments of the invention.

FIG. 13 is a detail diagram of a gaming device display according to embodiments of the invention. FIG. 13 illustrates an example embodiment that uses similar rules to the example embodiment illustrated in FIG. 12 except that the poker game shown in FIG. 13 is a multi-hand poker game where 3 poker hands are played during a single game event. Here, six or more bonus items need to be received in the 15 card positions to trigger the bonus event. In other embodiments, more or less poker hands (such as five hands, ten hands, 50 hands, 100 hands, etc.) could be played and/or more or less bonus items may need to be received to trigger the lock and improve bonus feature.

Referring to FIG. 13, a gaming display 1300 of a gaming device includes a game play area showing a game grid of card positions that allow for presentation of virtual playing cards 1320 in three poker hands 1310, 1312, 1314, and a user interface or operations area 1340. The user interface area 1340 may include various meters and buttons, such as a "Credit" meter 1342, a "Paid" indicator 1344, a "Total Bet" meter or indicator 1346, multiple "Hold" buttons 1330 associated with the card positions of the poker hands 1310, 1312, 1314, and a "Deal" or "Draw" button 1348. In other poker games, or other types of games of chance, the game play area and/or the player interface area 1340 may be different. In this embodiment, the first poker hand 1310 is the hand where the initial cards 1320 are dealt. Thereafter, these initially dealt cards 1320 can be held where the held cards are replicated in the second poker hand 1312 and third poker hand 1314, and then replacement cards and drawn for each non-held card in the first poker hand 1310 and for the remaining card positions in the second poker hand 1312 and third poker hand 1314. As shown in FIG. 13, the player has placed an additional side wager to activate the first card column, the second card column, and the third card column as indicated by the activation indicators 1380, but has not placed a sufficient side wager to activate the fourth or fifth card column. Thus, when the player receives the sub-symbol items 1352, 1353, 1354 in the first or second card columns, the player is awarded 825 bonus credits since these card columns are activated. Sub-symbol items 1351, 1355, 1356, however, are not awarded to the player since the fourth and fifth card columns have not been activated.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out above and in the appended claims.

The invention claimed is:

1. A gaming device comprising:

a display including a video screen having a poker game play grid having a plurality of card positions and a plurality of activation indicators respectively associated with each of the plurality of card positions, where each activation indicator is associated with a displayed state, the displayed state including an active state and an inactive state;

a player interface including at least one button, the button configured to generate a signal in response to being activated;

a memory configured to store a virtual deck of cards and a credit amount;

a wager input device structured to receive physical items associated with currency values; and a processor operable to:

receive a signal indicating receipt of a physical item associated with a currency value;

increase the credit amount stored in the memory based on the currency value associated with the received physical item;

receive a primary game initiation signal including a total wager amount, the total wager amount including a base wager amount and a side wager amount, where the total wager amount deducted from the credit amount stored in the memory;

update the displayed states of the activation indicators on the display based on the side wager amount;

randomly deal an initial poker hand from the virtual deck of cards to the card positions in the poker game play grid on the display;

randomly determine if a bonus sub-symbol is to be associated with each of the card positions in the poker game play grid on the display, each bonus sub-symbol associated with a random credit value;

lock the one or more bonus sub-symbol relative to their respective card position on the poker game play grid associated with the card having the bonus sub-symbol;

receive signals indicating cards to be held in the initial poker hand;

randomly provide replacement cards from the virtual deck of cards to replace any cards in the initial poker hand that were not held to form a final poker hand on the display;

evaluate the final poker hand for poker awards;

determine a bonus award by summing the credit values associated with each bonus sub-symbol that appears in a card position that is respectively associated with an activation indicator that is displayed in the active state; and increase the credit amount stored in the memory by any poker awards and bonus awards.

2. The gaming device of claim 1, wherein the poker game play grid on the video screen includes five card positions and five activation indicators.

3. The gaming device of claim 2, wherein the activation indicators include a first activation indicator, a second activation indicator, a third activation indicator, a fourth activation indicator, and a fifth activation indicator, where the side wager amount to place the first activation indicator in the active state is N credits, where the side wager amount to place the first activation indicator and the second activation indicator in the active state is 2×N credits, where the side wager amount to place the first activation indicator, the second activation indicator, and the third activation indicator in the active state is 3×N credits, where the side wager amount to place the first activation indicator, the second activation indicator, the third activation indicator, and the fourth activation indicator in the active state is 4×N credits, and where the side wager amount to place the first activation indicator, the second activation indicator, the third activation indicator, the fourth activation indicator, and the fifth activation indicator in the active state is 5×N credits.

4. The gaming device of claim 3, wherein the base wager amount to play the poker game is N credits.

5. The gaming device of claim 3, wherein the base wager amount to play the poker game is 5×N credits.

6. The gaming device of claim 1, wherein the processor is further operable to keep the bonus sub-symbols associated with activation indicators that are in the active state locked to their respective symbol positions after the final poker hand is displayed and unlock any the bonus sub-symbols associate with activation indicators that are in the inactive state after the final poker hand is displayed when the number of card positions that are associated with a bonus sub-symbol and associated with activation indicators that are in the active state is greater than a predetermined threshold number.

7. The gaming device of claim 6, wherein prior to determining the bonus award, the processor is further operable to initiate a bonus game by maintaining the locked bonus sub-symbols in their respective card positions on the poker game play grid and randomly determining whether to mark one or more additional bonus sub-symbols in the card positions that do not include a previously locked bonus sub-symbol and are associated with activation indicators that are in the active state.

8. The gaming device of claim 7, wherein the bonus game includes multiple rounds of randomly determining whether to mark one or more additional bonus sub-symbols.

9. The gaming device of claim 8, wherein the multiple rounds continue until a new bonus sub-symbol is not received during a round of the bonus game.

10. The gaming device of claim 8, wherein the multiple rounds continue for a predetermined number of rounds for the bonus game.

11. The gaming device of claim 8, wherein a number of remaining rounds is displayed on a bonus spin meter.

12. The gaming device of claim 11, wherein the number of remaining rounds is reset on the bonus spin meter to a predetermined starting number when a new bonus sub-symbol is received during a round of the bonus game.

13. A gaming device comprising:

a display including a video screen configured to display a poker game play grid showing at least a first poker hand, a second poker hand, and a third poker hand, where each of the first poker hand, the second poker hand, and the third poker hand include a respective plurality of card positions that are aligned in vertical columns, and where the video screen is further configured to display a plurality of activation indicators respectively associated with each of the aligned vertical columns of card positions, where each activation indicator is associated with a displayed state, the displayed state including an active state and an inactive state;

a player interface including at least one button, the button configured to generate a signal in response to being activated;

a memory configured to store a virtual deck of cards and a credit amount;

a wager input device structured to receive physical items associated with currency values; and a processor operable to:

receive a signal indicating receipt of a physical item associated with a currency value;

increase the credit amount stored in the memory based on the currency value associated with the received physical item;

receive a primary game initiation signal including a total wager amount, the total wager amount including a base wager amount and a side wager amount, where the total wager amount deducted from the credit amount stored in the memory;

randomly determine if a bonus sub-symbol is to be associated with each of the card positions in the poker game play grid on the display, each bonus sub-symbol associated with a modifier value;

randomly deal cards from the virtual deck of cards to the first poker hand on the poker game play grid of the display;

receive signals indicating cards to be held from the dealt cards in the first poker hand;

copy any cards held in the first poker hand to associated card positions in the second poker hand and the third poker hand;

randomly provide replacement cards from the virtual deck of cards to replace any cards that were not held in the first poker hand;

randomly draw cards to complete any empty card spots in the second poker hand and the third poker hand;

evaluate the first poker hand, the second poker hand, and the third poker hand for poker awards;

determine a bonus award by using the modifier values of each bonus sub-symbol that appears in a card position that is respectively associated with an activation indicator that is displayed in the active state; and increase the credit amount stored in the memory by any poker awards as modified by the bonus award.

14. The gaming device of claim 13, wherein the modifier value of each of the bonus sub-symbols is a random credit value.

15. The gaming device of claim 13, wherein the modifier value of each of the bonus sub-symbols is randomly either a credit value or a progressive meter indicator.

16. The gaming device of claim 13, wherein the modifier value of each of the bonus sub-symbols is randomly either a credit value or a multiplier value.

17. A gaming device comprising:

a display including a video screen having a poker game play grid having a plurality of card positions and a plurality of activation indicators respectively associated with each of the plurality of card positions, where each activation indicator is associated with a displayed state, the displayed state including an active state and an inactive state;

a player interface including at least one button, the button configured to generate a signal in response to being activated;

a memory configured to store a virtual deck of cards and a credit amount;

a wager input device structured to receive physical items associated with currency values; and a processor operable to:

receive a signal indicating receipt of a physical item associated with a currency value;

increase the credit amount stored in the memory based on the currency value associated with the received physical item;

receive a primary game initiation signal including a total wager amount, the total wager amount including a base wager amount and a side wager amount, where the total wager amount deducted from the credit amount stored in the memory;

update the displayed states of the activation indicators on the display based on the side wager amount;

randomly deal an initial poker hand from the virtual deck of cards to the card positions in the poker game play grid on the display;

randomly determine if a bonus sub-symbol is to be associated with each of the card positions in the poker game play grid on the display, each bonus sub-symbol associated with a modifier value;

lock the one or more bonus sub-symbol relative to their respective card position on the poker game play grid associated with the card having the bonus sub-symbol;

receive signals indicating cards to be held in the initial poker hand;

randomly provide replacement cards from the virtual deck of cards to replace any cards in the initial poker hand that were not held to form a final poker hand on the display;

evaluate the final poker hand for poker awards;

determine a bonus award by using the modifier values associated with each bonus sub-symbol that appears in a card position that is respectively associated with an activation indicator that is displayed in the active state; and increase the credit amount stored in the memory by any poker awards as modified by any bonus awards.

18. The gaming device of claim 17, wherein the modifier value of each of the bonus sub-symbols is a random credit value.

19. The gaming device of claim 17, wherein the modifier value of each of the bonus sub-symbols is randomly either a credit value or a progressive meter indicator.

20. The gaming device of claim 17, wherein the modifier value of each of the bonus sub-symbols is randomly either a credit value or a multiplier value.

* * * * *